(12) United States Patent
Rau et al.

(10) Patent No.: US 6,292,436 B1
(45) Date of Patent: Sep. 18, 2001

(54) UNDERWATER CABLE ARRANGEMENTS, INTERNAL DEVICES FOR USE IN AN UNDERWATER CABLE, AND METHODS OF CONNECTING AND INTERNAL DEVICE TO A STRESS MEMBER OF AN UNDERWATER CABLE

(75) Inventors: Brien G. Rau, Jefferson; Andre' W. Olivier, River Ridge, both of LA (US)

(73) Assignee: Input/Output, Inc., Stafford, TX (US)

(*) Notice: Subject to any disclaimer, the term of this patent is extended or adjusted under 35 U.S.C. 154(b) by 0 days.

(21) Appl. No.: 09/161,271

(22) Filed: Sep. 28, 1998

Related U.S. Application Data
(60) Provisional application No. 60/060,603, filed on Oct. 1, 1997.

(51) Int. Cl.[7] ............................................. G01V 1/38
(52) U.S. Cl. ................................. 367/149; 114/245
(58) Field of Search .............................. 367/149, 76, 20, 367/153, 154

(56) References Cited

U.S. PATENT DOCUMENTS

| | | | |
|---|---|---|---|
| H1650 | * 6/1997 | Olson | 29/868 |
| 2,923,916 | 2/1960 | Woodworth | 340/17 |
| 3,371,311 | 2/1968 | Cholet et al. | 340/17 |
| 3,660,809 | 5/1972 | Pearson | 340/8 S |
| 4,011,540 | 3/1977 | Farr | 340/7 R |
| 4,093,946 | 6/1978 | Fowler | 340/310 R |
| 4,309,734 | 1/1982 | Warren | 361/58 |

(List continued on next page.)

FOREIGN PATENT DOCUMENTS

| | | |
|---|---|---|
| 4422234 | 8/1995 | (DE) . |
| 0 241 608 | 10/1987 | (EP) . |
| 0330784 | 9/1989 | (EP) . |
| 0390987 | 10/1990 | (EP) . |
| 0552769 | 7/1993 | (EP) . |
| 0560674 | 9/1993 | (EP) . |
| 0669540 | 8/1995 | (EP) . |
| 2579768 | 10/1986 | (FR) . |
| 2143687 | 2/1985 | (GB) . |
| 2261286 | 5/1993 | (GB) . |
| 2 301 328 | 12/1996 | (GB) . |
| 744405 | 6/1980 | (SU) . |
| WO 93/03402 | 2/1993 | (WO) . |
| WO9711394 | 3/1997 | (WO) . |
| WO9711395 | 3/1997 | (WO) . |

OTHER PUBLICATIONS

Technology Opportunity, "Contactless Magnetic Slip Ring", NASA, Ames Research Center, (CTO–017, 3/96).

"DigiSCAN™—An Extensible Solution to Cable Positioning and Control", DigiCOURSE Seismic Systems, 1992 DigiCourse, Inc.

"WG–24 Digital Streamer System for Multicable, Multichannel Marine Seismic Exploration", Copyright 1992, Western Atlas International, Inc.

*Primary Examiner*—Christine Oda
*Assistant Examiner*—Victor J. Taylor
(74) *Attorney, Agent, or Firm*—Leydig, Voit & Mayer, Ltd.

(57) ABSTRACT

An internal device for use in an underwater cable may comprise a body having an outer periphery, body being mountable inside the cable with the cable surrounding the outer periphery of the body. The body may include a cutaway portion, a slot, or a dovetail joint. An underwater cable arrangement may comprise an underwater cable and an internal device disposed in the cable with the cable surrounding the device. The underwater cable may include a stress member connected to the internal device by an interference fit or the internal device may include a slot for receiving the stress member. A method of connecting a stress member of an under water cable to an internal device includes forming an interference fit between a region of increased diameter of the stress member and the internal device.

17 Claims, 35 Drawing Sheets

U.S. PATENT DOCUMENTS

| | | | |
|---|---|---|---|
| 4,375,089 | 2/1983 | Thigpen et al. | 367/20 |
| 4,390,974 | 6/1983 | Siems | 364/76 |
| 4,471,534 | 9/1984 | Fowler | 33/363 N |
| 4,481,611 | 11/1984 | Burrage | 367/19 |
| 4,509,170 | 4/1985 | Hollinger et al. | 370/85 |
| 4,553,247 | 11/1985 | Harris | 375/4 |
| 4,631,711 | 12/1986 | Fowler | 367/149 |
| 4,635,237 | 1/1987 | Benestad et al. | 367/20 |
| 4,636,992 | 1/1987 | Cretin et al. | 367/20 |
| 4,641,372 | 2/1987 | Kelly et al. | 455/601 |
| 4,694,436 | 9/1987 | Gelfand | 367/20 |
| 4,703,355 | 10/1987 | Cooper | 358/149 |
| 4,711,194 | 12/1987 | Fowler | 114/245 |
| 4,843,865 | 7/1989 | Fowler | 73/1 E |
| 4,851,831 | 7/1989 | Stern | 340/870.16 |
| 4,912,684 | 3/1990 | Fowler | 367/76 |
| 5,010,653 | 4/1991 | Fowler | 33/356 |
| 5,031,159 | 7/1991 | Rouquette | 367/125 |
| 5,049,878 | 9/1991 | Stern | 340/870.4 |
| 5,058,080 | 10/1991 | Siems et al. | 367/79 |
| 5,105,548 | 4/1992 | Fowler | 33/356 |
| 5,142,507 | 8/1992 | Rouquette | 367/134 |
| 5,170,566 | 12/1992 | Fowler et al. | 33/356 |
| 5,200,930 | 4/1993 | Rouquette | 367/76 |
| 5,201,128 | 4/1993 | Olivier et al. | 33/355 R |
| 5,214,617 | 5/1993 | Rouquette | 367/124 |
| 5,247,292 | 9/1993 | Nakanishi et al. | 340/825.13 |
| 5,301,096 | 4/1994 | Klontz et al. | 363/37 |
| 5,329,071 | 7/1994 | Vatne et al. | 181/110 |
| 5,329,605 | 7/1994 | Wargotz | 385/107 |
| 5,359,575 | 10/1994 | Williams et al. | 367/127 |
| 5,489,897 | 2/1996 | Inoue | 340/870.39 |
| 5,493,288 | 2/1996 | Henneuse | 340/854.4 |
| 5,504,685 | 4/1996 | Wapner | 364/443 |
| 5,529,011 | 6/1996 | Williams, Jr. | 114/245 |
| 5,579,286 | 11/1996 | Skorheim | 367/154 |
| 5,619,474 | 4/1997 | Kuche | 367/17 |
| 5,691,687 | 11/1997 | Kumagai et al. | 336/120 |
| 6,016,286 * | 1/2000 | Olivier et al. | 367/17 |
| 6,091,670 * | 7/2000 | Olivier et al. | 367/76 |

* cited by examiner

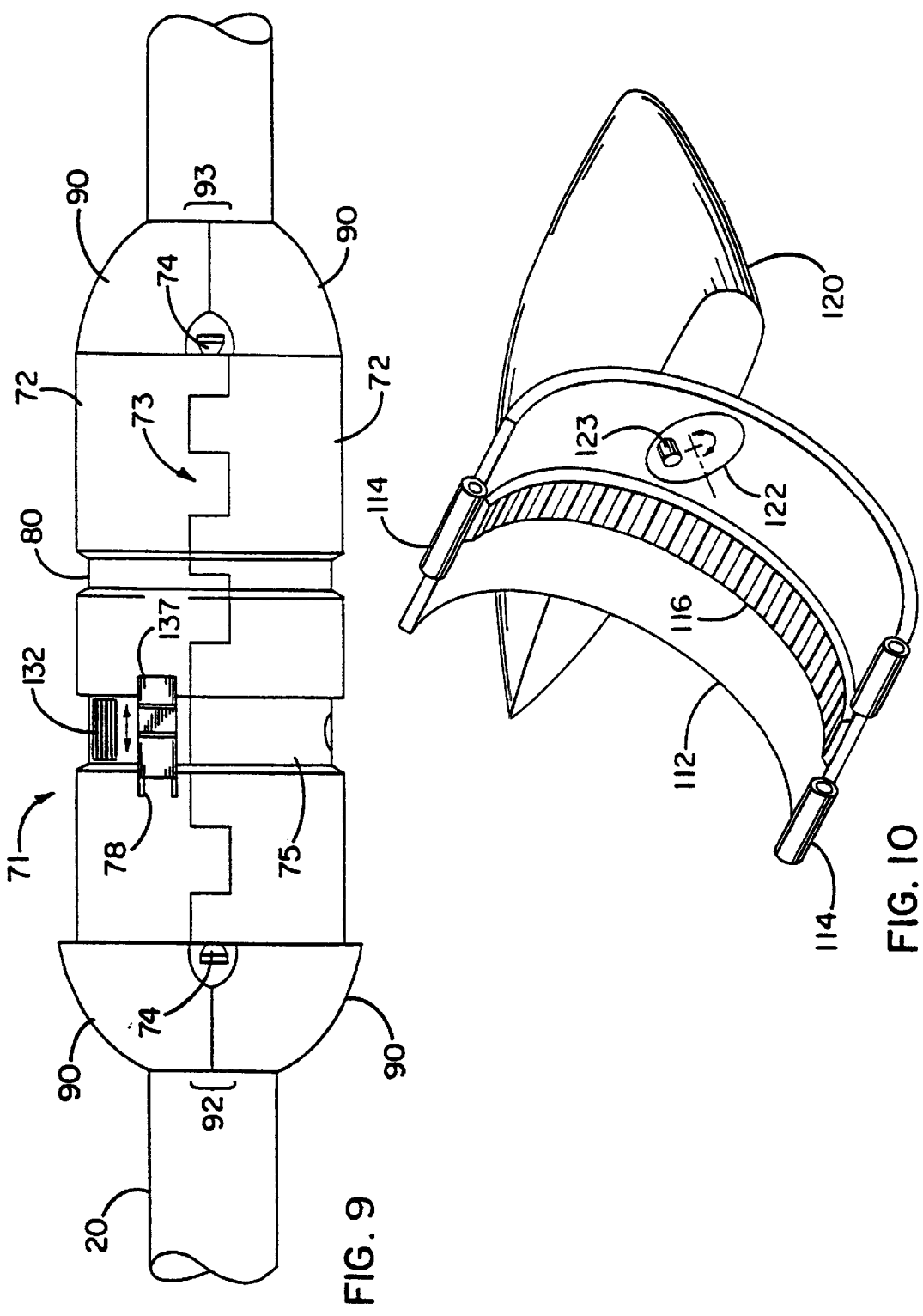

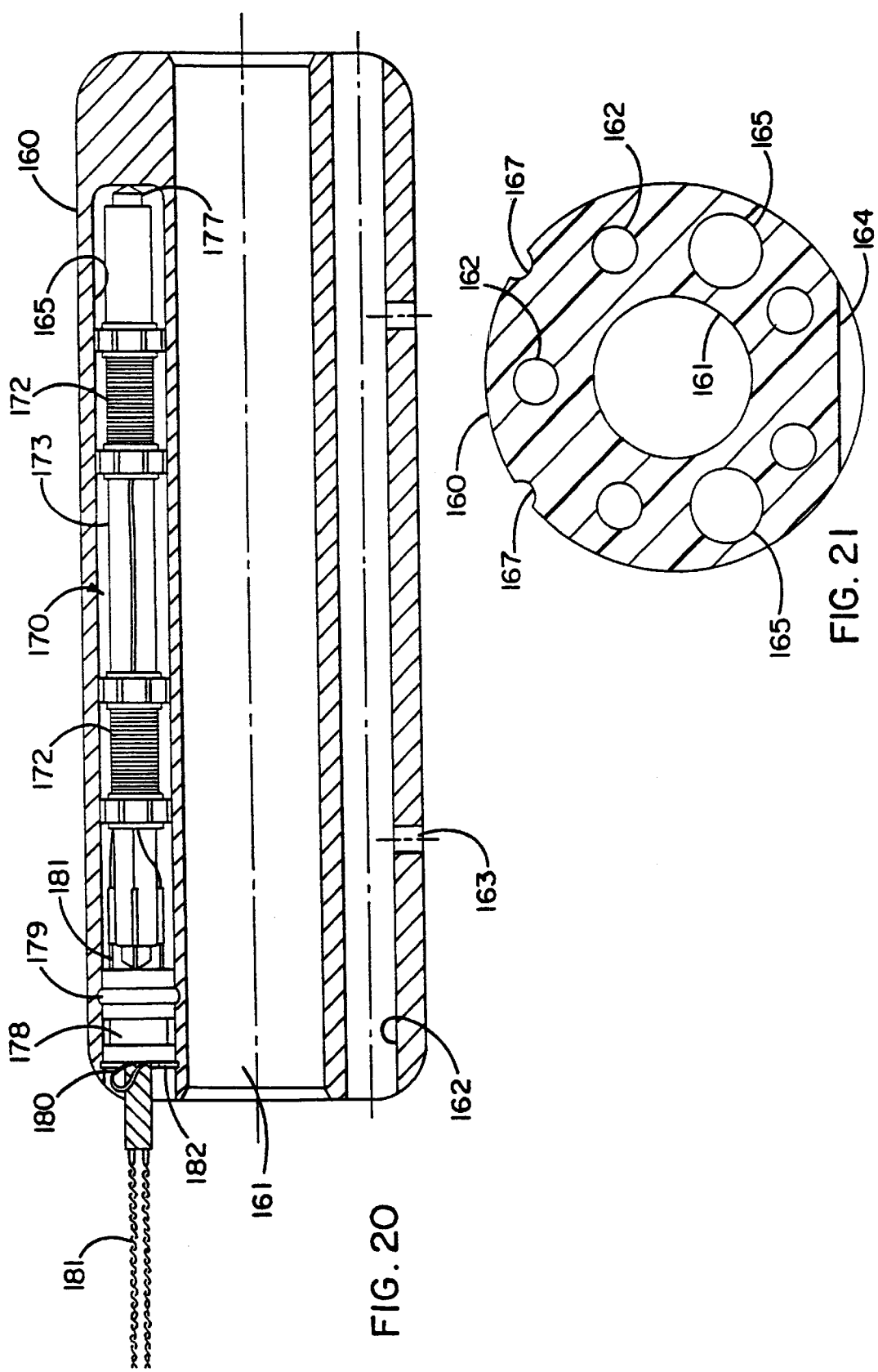

UNDERWATER CABLE ARRANGEMENTS, INTERNAL DEVICES FOR USE IN AN UNDERWATER CABLE, AND METHODS OF CONNECTING AND INTERNAL DEVICE TO A STRESS MEMBER OF AN UNDERWATER CABLE

This application claims the benefit of U.S. Provisional Patent Application No. 60/060,603, filed on Oct. 1, 1997, and claims the benefit of priority of U.S. Provisional Application No. 06/060,603, filed Oct. 1, 1997.

REFERENCE TO RELATED APPLICATIONS

This application incorporates by reference the following applications:

U.S. Provisional Application No. 60/004,203, filed on Sep. 22, 1995, entitled "Electrical Power Distribution and Communication System for an Underwater Cable";

U.S. Provisional Application No. 60/004,209, filed on Sep. 22, 1995, entitled "Acoustic Ranging Device for an Underwater Cable";

U.S. Provision Application No. 60/004,493, filed on Sep. 22, 1995, entitled "Support Device For An Underwater Cable";

U.S. Provisional Application No. 60/004,494, filed on Sep. 22, 1995, entitled "Depth Control Device for Underwater Cables";

U.S. Provisional Application No. 60/005,500, filed on Sep. 22, 1995, entitled "Heading Sensor Device for an Underwater Cable"; and International Application No. PCT/US96/15128, filed on Sep. 20, 1996, entitled "Electrical Power Distribution and Communication System for an Underwater Cable".

BACKGROUND OF THE INVENTION

1. Field of the Invention

This invention relates to an underwater cable arrangement capable of being used, for example, in seismic testing, as well as to various internal and external devices capable of being used with an underwater cable.

2. Description of the Related Art

In marine seismic exploration, an underwater cable, commonly referred to as a streamer cable, is towed through the water by a vessel such as a surface ship. An array of hydrophones is mounted within the cable, and an acoustic source or gun is fired to force an impulse of compressed air into the water, creating a bubble. The collapse of the bubble generates acoustic pulses that radiate through the water and into the earth. Reflections of the pulses off geologic structures are picked up by the hydrophones, and data representing the detected reflections are transmitted to the towing vessel. By analyzing the reflections, it is possible to discover subsea formations of oil or gas.

Various devices requiring electric power for their operation are mounted on the exterior of the underwater cable. For example, in order to accurately control the depth of the cable as it is being towed through the water, depth control mechanisms, commonly referred to as "cable-leveling birds", are attached to the cable at intervals along its length. The depth control mechanisms are equipped with adjustable diving planes, the angles of attack of which can be varied by motors in the depth control mechanisms so as to maintain the cable at a desired depth. Another type of external device frequently mounted on an underwater cable is an acoustic ranging device, which together with other acoustic devices is used to determine the locations with respect to the towing vessel of various points along the underwater cable to permit the exact shape of the cable during towing to be determined. Yet another type of commonly used external device is a magnetic heading sensor (also referred to as a magnetic compass), which determines the heading of the underwater cable at the point where the heading sensor is attached to the underwater cable.

It is possible to connect such external devices with a source of power aboard the towing vessel by means of wires passing through the skin of the cable, but the necessity of forming holes in the skin for the wires can lead to leakage of water into the interior of the cable, which is highly undesirable. Therefore, the external devices are usually self-powered by their own internal batteries. However, batteries have a number of serious drawbacks. First, the batteries have a limited life span and must be replaced every one to three months. Not only is the replacement of the batteries time-consuming, there is also the risk of exposing electric circuitry within the external device to sea water during replacement. In addition, lithium primary batteries, which are used because of their longer operating life compared to other batteries, are expensive, and spent batteries must be retained for proper disposal and not randomly discarded. Furthermore, each time the cable is reeled in to replace batteries in the external devices, it is subjected to stresses which frequently result in damage to the cable. Therefore, it is preferable to reel in the cable as infrequently as possible.

Another shortcoming of conventional external devices used with underwater cables is that the entire device must be removed from the cable before the cable is rolled up onto a reel on the deck of a towing vessel in order to prevent damage to the external devices and the cable. When the cable is to be redeployed, the external devices must be reattached to it. In rough seas, it can be extremely difficult and often dangerous for workers to remove the external devices from or reattach them to the cable on the deck of the towing vessel. Furthermore, onboard storage space, often a precious commodity, must be provided for the external devices on board the towing vessel. In addition, the reeling in or paying out of the underwater cable must be stopped during removal or reattachment of the external devices, so deployment and retrieval of the cable are time consuming.

SUMMARY OF THE INVENTION

The present invention provides an underwater cable arrangement including an underwater cable having one or more internal devices mounted in the cable.

The present invention also provide various internal devices for installation in an underwater cable.

The present invention additionally provides methods for connecting a stress member of an underwater cable to an internal device.

According to one aspect of the present invention, an internal device, which is used in an underwater cable having a stress member, may comprise a body having an outer periphery, central bore, a passage, and a cutaway portion. The body is mountable inside the cable with the cable surrounding the outer periphery of the body. The passage extends in a lengthwise direction of the body outside of the central bore and is capable of receiving a stress member of the underwater cable. The cutaway portion is formed in the outer periphery of the body at each end of the body adjoining an end of the passage.

In many embodiments, the lengthwise end of the passage are spaced from the lengthwise ends of the internal device. The cutaway portions cutaway the regions of the internal device adjoining the ends of the passage to permit increased movement of the stress members. Such an arrangement lowers the stresses applied to the internal device as well as those applied to the stress members.

According to another aspect of the present invention, an arrangement for use in an underwater cable comprises an underwater cable and an internal device. The underwater cable includes a stress member extending in a lengthwise direction of the cable. The internal device has an outer periphery and a central bore. The internal device is disposed inside the cable with the cable surrounding the outer periphery of the internal device. The stress member is disposed radially outward of the central bore and is connected to the internal device by an interference fit.

According to another aspect of the invention, a method of connecting a stress member of an underwater cable to an internal device for use in the cable comprises inserting an object into the stress member of the underwater cable to create a region of increased diameter in the stress member. The method further comprises forming an interference fit between the region of increased diameter of the stress member and the internal device and positioning the internal device inside the cable with the cable surrounding the outer periphery of the internal device.

In many embodiments, the stress member passes through a pocket formed in the internal device. A portion of the stress member in the pocket is locally enlarged in diameter by the insertion of a retaining member into the stress member to create the interference fit between the enlarged portion of the stress member and the ends of the pocket. The interference fit prevents relative axial movement of the internal device and the stress member. If it is desired to adjust the location of the internal device or disconnected from the stress member, the retaining member can be removed from the internal device to prevent free movement of the internal device with respect to the stress member.

According to another aspect of the present invention, an internal device, which is used in an underwater cable having a stress member, may comprise a body having an outer periphery and a slot formed in the outer periphery of the body. The body is mountable inside the cable with the cable surrounding the outer periphery of the body. The slot has first and second lengthwise ends and a non-linear region between the ends and is capable of receiving the stress member of the underwater cable.

According to another aspect of the present invention, an underwater cable arrangement comprises an underwater cable and an internal device. The underwater cable includes a stress member extending in a lengthwise direction of the cable. The internal device has an outer periphery and a slot formed in the outer periphery. The internal device is disposed in the cable with the cable surrounding the outer periphery of the device. The slot has first and second lengthwise ends and a non-linear region between the ends, and the stress member of the cable is disposed in the slot.

In many embodiments, the slot includes a non-linear region which prevents the stress member from being pulled out of the slot by a radial force. However, the slot enables the internal device to be connected to a stress member in a pre-existing underwater cable without it being necessary to disconnect the stress member from other members. These embodiments simplify assembly, retrofitting, and repair of an underwater cable.

According to another aspect of the invention, an internal device, which is used in an underwater cable, comprises a tubular body including an outer periphery. The body is mountable inside the cable with the cable surrounding the outer periphery of the body. The body further includes first and second arcuate sections and a dovetail joint extending in a lengthwise direction of the sections. The dovetail joint detachably connects the first and second arcuate sections to each other.

In many embodiments, the dovetail joint greatly simplifies assembly and disassembly of the underwater cable because the internal device can be installed around a stress member or a wire bundle, for example, which is already connected to other members. The sliding dovetail joint enables the internal device to be detached without having to disconnect the stress member or the wire bundle from the other members.

Embodiments of the internal device can be used for various purposes within an underwater cable. For example, they can be used as coil support devices for supporting a coil within an underwater cable, as spacers which maintain the shape of an underwater cable, or a reinforcing members for reinforcing an underwater cable in locations where external device are mounted on the underwater cable.

The external devices can perform a wide variety of functions, including but not limited to sensing the heading of the cable, performing acoustic ranging, and controlling the depth or the position of the cable in the water.

In many embodiments, the external devices mounted on an under water cable are capable of being powered primarily or entirely by inductive coupling between a coil within the underwater cable and a coil in the external device. Therefore, it is not necessary to have any wires connecting the external device with the interior of the underwater cable, and the external devices do not require their own internal batteries as a primary source of power. Batteries can be omitted from the external device, or can be used merely as a backup in cases the supply of power from the coil within the cable is interrupted. Therefore, the load on any batteries in the external device is small, and the batteries can be used for long periods without requiring replacement. Therefore, the underwater cable can be operated for long periods without having to be retrieved on board a towing vessel, resulting in increased operating efficiency and reduced wear and tear on the cable.

In many embodiments, all or a portion of an external device can be left attached to the underwater cable when the cable is wound around a reel or drum for storage. The ability to leave the external devices attached to the cable during storage greatly reduces the amount of labor and the time required for deploying or retrieving the cable, resulting in greatly increased operating efficiency. The external devices may also be structured such that all or a portion of the devices can be quickly and easily mounted on and detached from the underwater cable when desired without the meed for any tools.

In many embodiments, a coil support device is capable of supporting a coil within an underwater cable such that substantially no bending stresses are applied to a core of the coil during operation of the underwater cable, even when the cable is bent, such as when it passes over a roller on a deck of a towing vessel, or is subject to impacts. Therefore, even a coil having a fragile ferrite coil can be protected from damage.

BRIEF DESCRIPTION OF THE DRAWINGS

FIG. 9 is a plan view of the depth control device with the wing unit removed.

FIG. 10 is a perspective view of one section of the wing unit.

FIG. 20 is a schematic longitudinal cross-sectional view of an embodiment of a coil support device according to the present invention.

FIG. 21 is a transverse cross-sectional view of the embodiment of FIG. 20 with the internal coils removed.

DESCRIPTION OF PREFERRED EMBODIMENTS

Figure 1:
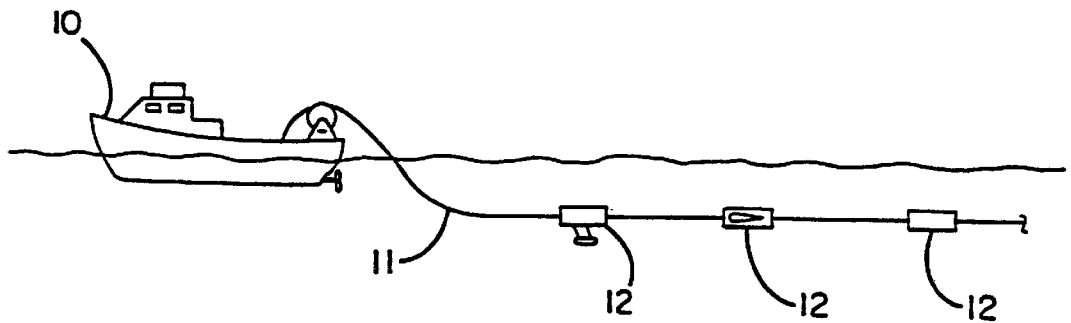
FIG. 1 is a schematic elevation of an underwater cable arrangement according to the present invention equipped with a plurality of external devices.

FIG. 1 schematically illustrates an example of an underwater cable arrangement according to the present invention. The arrangement includes an underwater cable 11 being towed through the water by a towing vessel 10, such as an ordinary surface vessel, although the cable 11 can also be towed by an underwater vessel or by an aircraft. One or more external devices 12 are attached to the underwater cable 11 at intervals along its length. For simplicity, only three external devices 12 are illustrated, but there is no restriction on the number or type of devices which are attached to the cable 11. In addition, although only a single cable 11 is shown, the towing vessel 10 may tow a plurality of cables simultaneously.

Figure 2:
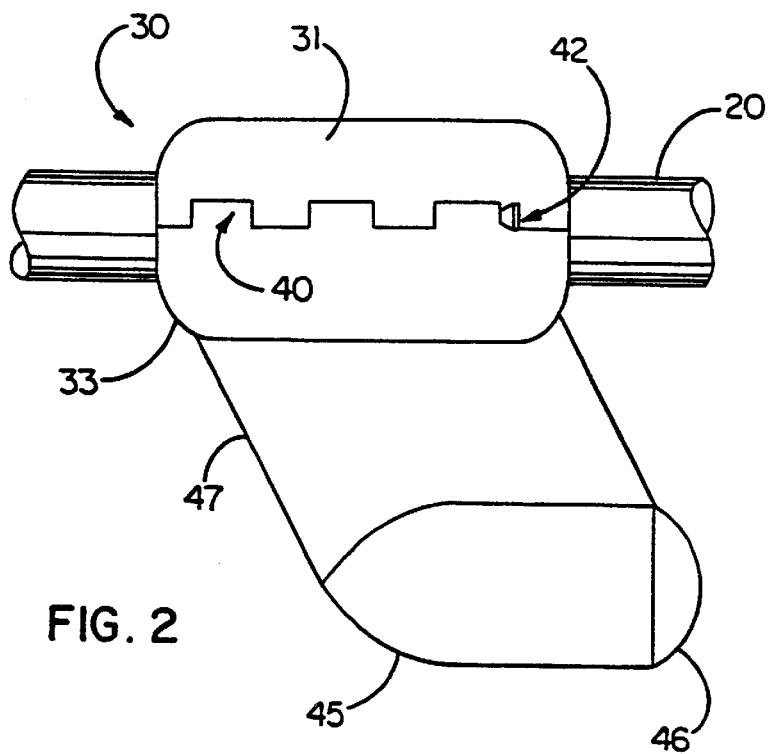
FIG. 2 is a schematic elevation of an embodiment of an external device according to the present invention mounted on the underwater cable of FIG. 1.
Figure 3:
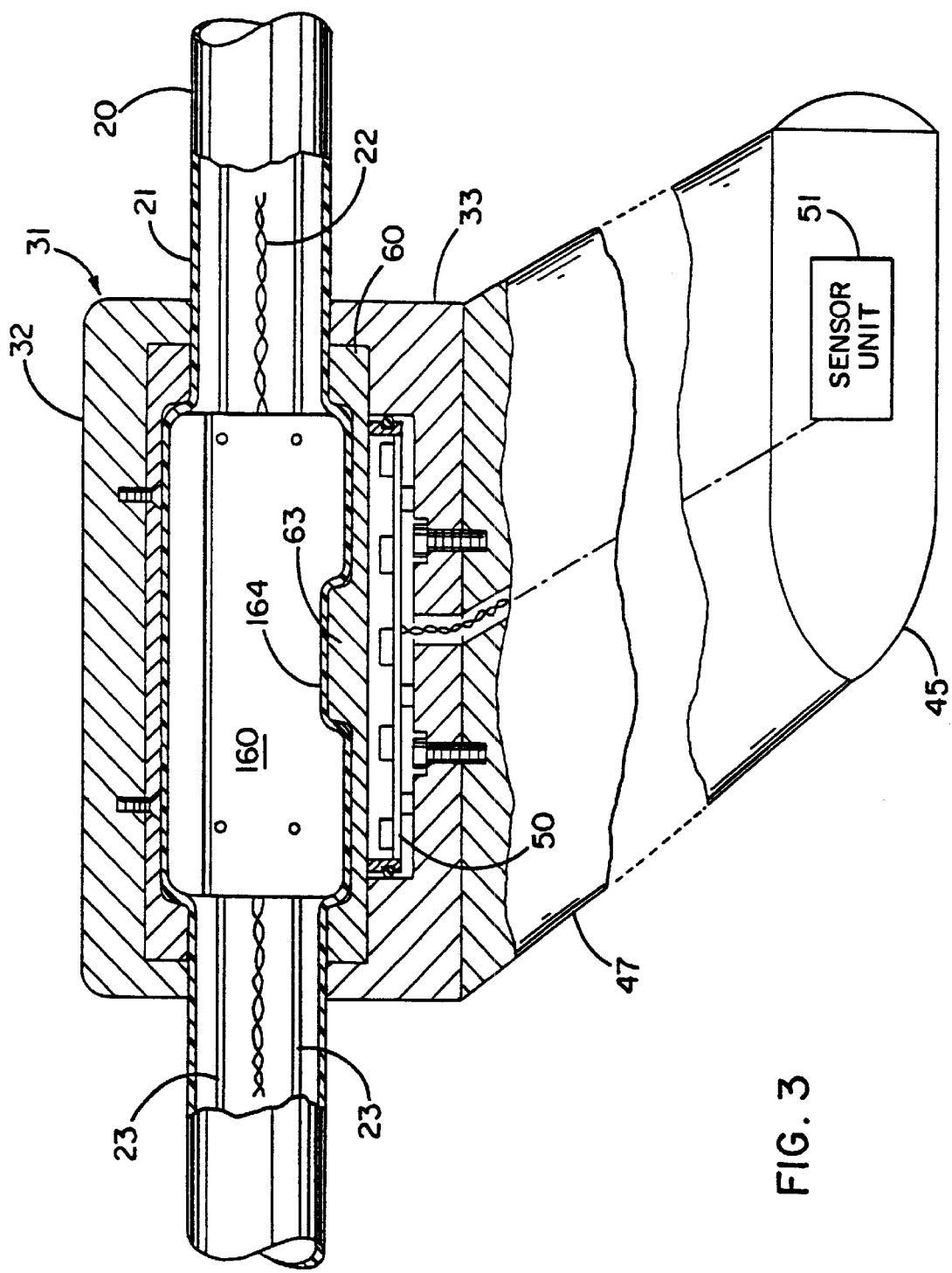
FIG. 3 is an enlarged cut-away side elevation of the external device of FIG. 2.
Figure 4:
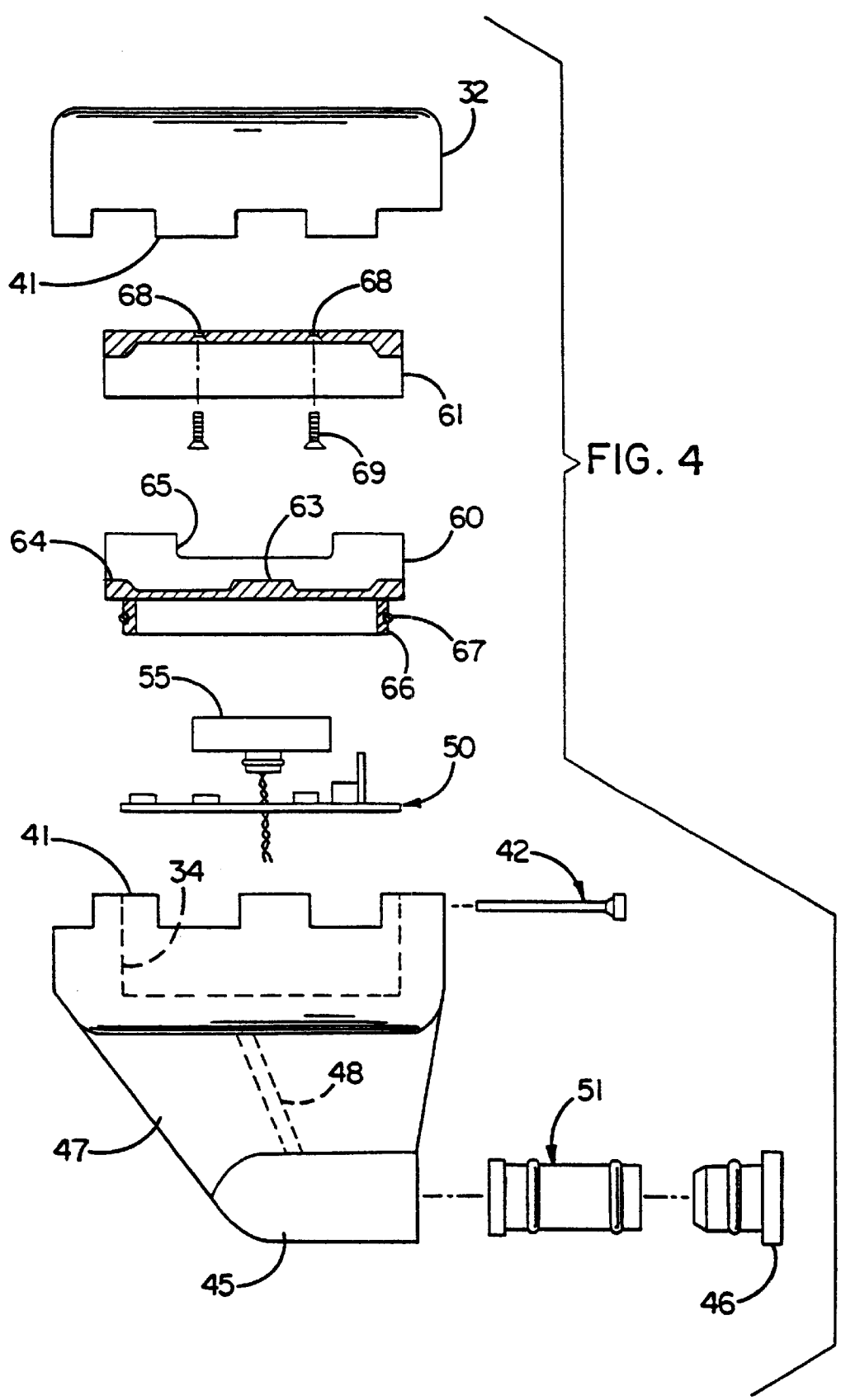
FIG. 4 is an exploded side view of the eternal device of FIG. 2.

FIGS. 2 through 6 illustrate a first embodiment of an external device 30 which can be mounted on an underwater cable 20. FIGS. 2 and 3 show the external device 30 as it would appear when being towed through the water by the cable 20 to the left in the figures. The external device 30 includes a body in the form of a pod 45 for housing an electrically powered member of the external device 30, such as a sensor unit 51, a clamping portion 31 which can be releasably clamped around the cable 20 to secure the external device 30 to the cable 20, and a streamlined connecting portion 47 extending between the clamping portion 31 and the pod 45. The pod 45 is displaced from the clamping portion when it is desired to space the sensor unit 51 or other electronics in the eternal device 30 from the underwater cable 20 to reduce magnetic interference between the two. (Magnetic interference includes both electromagnetic interference and the magnetic effect of permeable materials in the cable.) However, when magnetic interference is not a consideration, the clamping portion 31 and the pod 45 may be combined into a single body. The connecting portion 47 is preferably shaped to produce as little flow noise as possible as it is being towed through the water by the cable 20 since the noise can affect the hydrophones and various acoustic devices mounted on the cable 20. It may be swept backwards as shown in FIG. 2 to produce water shedding and resist entanglement. Preferably all the components in contact with the water are shaped to minimize cavitation and maintain low Reynolds numbers. Preferably the external device 30 has close to neutral buoyancy in sea water.

FIG. 3 illustrates the underwater cable 20 on which the external device 30 is mounted. The cable 20 need not be of any particular structure, but frequently it will comprise a flexible, water-tight skin 21 surrounding a wire bundle 22 for transmitting electric power and/or data between the towing vessel and electric components within the cable 20 as well as within the external device 30. In many cases, the cable 20 will contain one or more longitudinally extending stress members 23, such as wires, rods, ropes, or chains, for resisting tensile loads applied to the cable 20. The number, shape, and location of the stress members 23 may vary depending upon the manufacturer of the cable 20. Sometimes, the cable 20 may be filled with a liquid, such as a kerosene-based oil, for adjusting the buoyancy of the cable 20 to a desired value.

Electric power and/or data signals are transmitted between the interior of the cable 20 and the external device 30 by one or more internal coils 170 disposed inside the cable 20 (see FIG. 5) and one or more corresponding external coils 55 disposed in the external device 30 and inductively coupled with the internal coils 170. The internal coils 170 are electrically connected to the wire bundle 22 within the cable 20. Preferably, each of the internal coils 170 in the cable 20 is supported by a coil support device 160 according to the present invention which can prevent the internal coils 170 from being damaged during use of the cable 20. The structure of the coil support device 160 will be described in detail further on. In this embodiment, the coil support device 160 supports two internal coils 170, and the external device 30 is equipped with two external coils 55, each of which corresponds to one of the internal coils 170 in the coil support device 160. Each external coil 55 is mounted in a recess 36 formed in the lower section 33 of the clamping portion 31.

The shape of the pod 45 can be selected in accordance with the type of device which it is intended to house. Preferably, the exterior of the pod 45 is streamlined to reduce drag and noise as the pod 45 passes through the water. In this embodiment, the pod 45 has a cylindrical bore which opens onto the rear end of the pod 45, and the electrical device which it houses is a magnetic heading sensor (also referred to as a compass) that is removably received within the hollow center of the pod 45. An example of a suitable heading sensor is a Model 321 Optical Digital Compass manufactured by Digicourse of Harahan, La. However, the type of electronic device which is housed in the pod 45 is not critical. The open end of the bore can be sealed in a fluid-tight manner by a removable cover equipped with one or more sealing members, such as O-rings. The heading sensor 51 within the pod 45 is electrically connected with the interior of the clamping portion 31 by wires passing through a passage 48 extending through the connecting portion 47.

The clamping portion 31 is formed from a plurality of sections which are shaped to surround the cable 20 and grasp the cable 20 sufficiently tightly to prevent relative movement between the external device 30 and the cable 20. Preferably the clamping portion 31 can be readily detached from the cable 20 to enable the external device 30 to be removed from the cable 20 as the cable 20 is being reeled onto the towing vessel. In the present embodiment, the clamping portion 31 comprises first and second sections 32 and 33 pivotably connected with each other by hinges 40 so that the sections can be pivoted with respect to each other between an open and a closed position. Preferably, at least one of the hinges 40 employs a retractable quick-release hinge pin 42 of any suitable material (such as stainless steel, for example) which can be retracted without the use of tools to permit the clamping portion 31 to be opened. Examples of suitable hinges and hinge pins are described in U.S. Pat. No. 5,529, 011.

In addition to the electronic device in the pod 45, additional electrical devices may be housed in one or both sections 32, 33 of the clamping portion 31. In this embodiment, an electronics board 50 is housed in a recess 34 formed in the lower section 33. The electronics board 50 communicates with the external coils 55 via through holes 37 formed in the lower section 33 between the recess 34 for the electronics board 50 and the recesses 36 for the external coils 55. The electronics board 50 also communicates with the heading sensor 51 within the pod 45 through the passage 48 extending through the connecting portion 47. The electronics board 50 may contain a variety of components, such as a pair of accelerometers (such as a solid state piezoelectric accelerometer) for use in determining the roll angle of the cable 20 with respect to the horizon by sensing accelerations about two orthogonal axes, a suitable controller for controlling the operation of the heading sensor 51, and power supply circuitry for controlling the supply of power from the external coils 55 to the various electrical components within the external device 30.

If the sensor and electrical portions of the external device 30 are sufficiently small to fit entirely inside the clamping portion 31, the pod 45 and the connecting portion 47 may be omitted, in which case the external device 30 may remain attached to the cable 20 at all times and need not be removed when the cable 20 is being stored on the towing vessel 10. Alternatively, depending on its size, the entire external device 30 may be left attached to the cable 20 when the cable 20 is wound up for storage.

In this embodiment, the electrical devices within the external device 30 are powered entirely by the inductive link between the internal coils 170 within the cable 20 and the external coils 55 within the external device 30. Therefore, there is no need in the external device 30 for any batteries. It is possible to install rechargeable backup batteries on the external device 30 for powering the electrical devices in the external device 30 in the event of a temporary loss of power transmission from the cable 20. However, since the backup batteries are not needed during normal operation of the external device 30 and since they can be continually recharged, they can be small in size and do not require frequent replacement.

Figure 6:
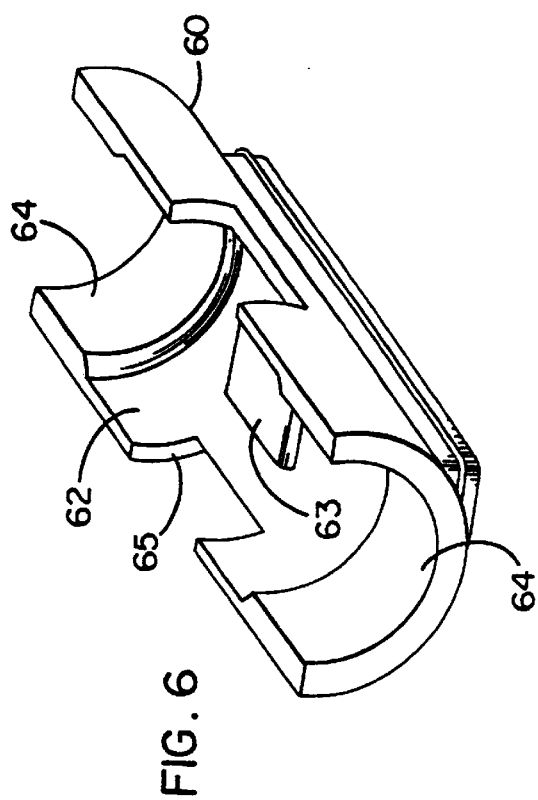
FIG. 6 is a perspective of one of the inserts of the external device of FIG. 2.

The first and second sections 32, 33 of the clamping portion 31 may directly grip the outer surface of the underwater cable 20. Alternatively, the sections 32, 32 may be equipped with removable inserts which grip the cable 20. In the present embodiment the first and second sections 32, 33 are equipped with a pair of semicylindrical inserts 60 and 61 which are secured to the interior of the sections 32, 33 and shaped so as to surround the coil support device 160 when the clamping portion 31 is closed around the cable 20. FIG. 6 illustrates the lower insert 60 in detail. The insert 60 is a generally semicylindrical tube having a semicylindrical recess 62 formed in its midportion which fits over the periphery of the coil support device 160. Land 64 formed at each end of the recess 62 have a smaller radius than the recess 62 so that the lands 64 will overlap the lengthwise ends of the coil support device 160 in the radial direction to prevent the axial movement of the coil support device 160 with respect to the inserts. When the pod 45 of the external device 30 houses a heading sensor, the fit between the recess 62 and the coil support device 160 is preferably such as to maintain a constant predetermined angle (such as 0 degrees) between the longitudinal axis of the cable 20 and the longitudinal axis of the clamping portion 31 of the external device 30, i.e., such as to prevent the clamping portion 31 from wobbling with respect to the coil support device 160 about the longitudinal axis of the cable 20. One of the inserts (the lower insert 60 in this embodiment) has a projection 63 extending radially inward from its inner periphery between its ends for engagement with a corresponding recess 164 formed in the outer periphery of the coil support device 160. Engagement between the projection 63 and the recess 164 prevents the rotation of the coil support device 160 about the axis of the cable 20 with respect to either the cable 20 or the external device 30. In addition, the presence of the projection 63 makes it easy to install the coil support device 160 so that the internal coils 170 are opposed to the external coils 55, because the clamping portion 31 can close only when the recess 164 is engaged with the projection 63. Preferably, the inserts are detachably connected to the upper (first) and lower (second) sections 32 and 33, of the clamping portion 31 so that different inserts can be used with the same external device 30. For example, by replacing a pair of the inserts with another pair having a different internal diameter, it is possible to use the same external device 30 with a cable 20 of a different diameter. In this embodiment, the upper insert 61 is secured to the upper section 32 of the clamping portion 31 by screws so as to move with the upper section 32 when the clamping portion 31 is opened and closed. The lower insert 60 is prevented from moving with respect to the lower section 33 by a rigid skirt 66 which extends from the lower surface of the lower insert 60 and fits into the recess 34 for the electronics board 50. A sealing member 67, such as an O-ring, may be mounted on the skirt 66 to seal the recess 34 in a fluid-tight manner and prevent water from entering the recess 34. The inserts 60 and 61, which may be either metallic or nonmetallic, are preferably made of a material which does not introduce any magnetic interference between the internal coils 170 in the cable 20 and the external coils 55 in the external device 30.

Figure 5:
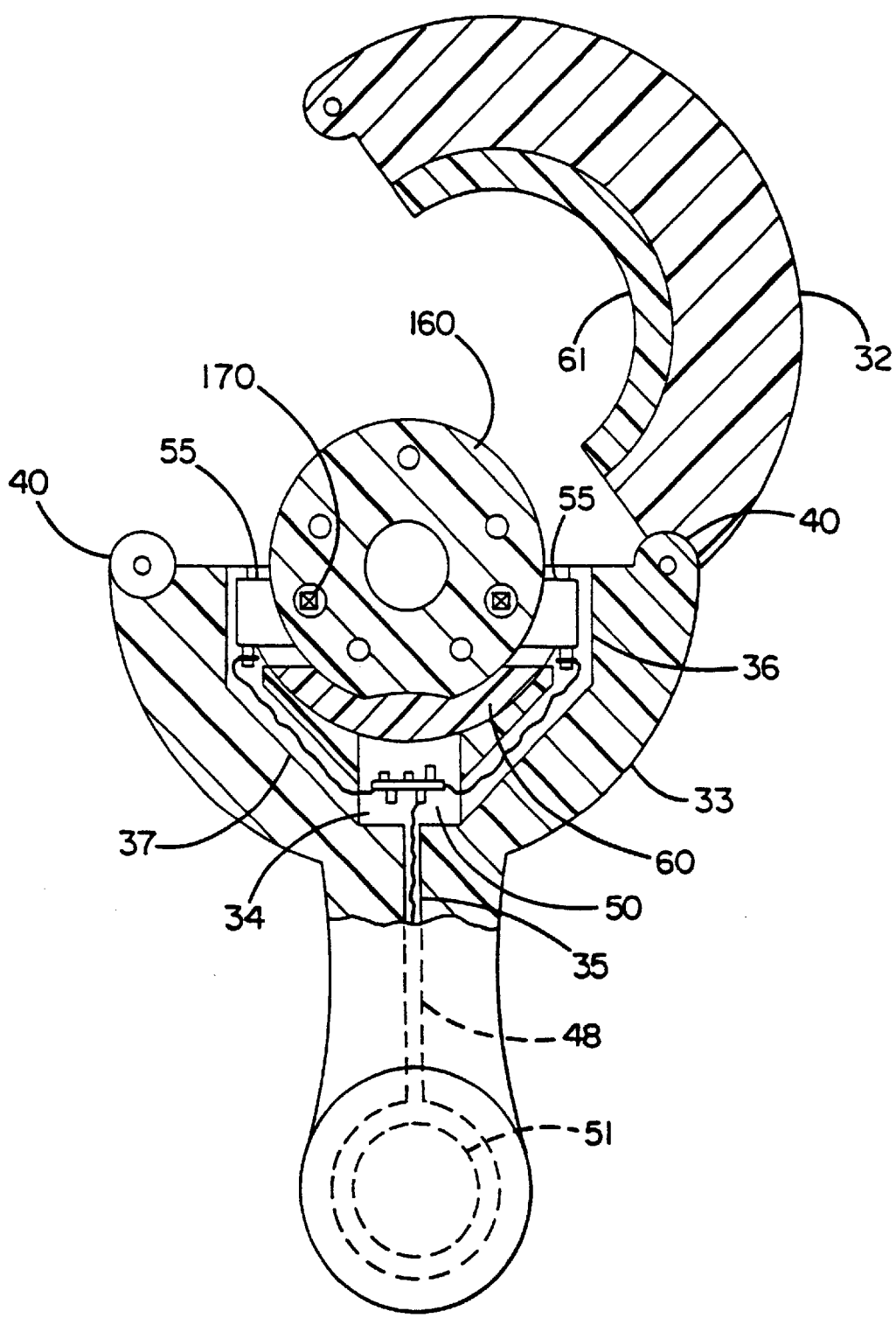
FIG. 5 is a broken away front elevation of the external device of FIG. 2.

To improve transmission between the internal and external coils 55, the separation between each internal coil 170 within the coil support device 160 and the corresponding external coil 55 in the external device 30 is preferably as small as possible. As shown in FIG. 6, the lower insert 60 in this embodiment is formed with a pair of windows 65 in opposite sides for receiving the external coils 55. As shown in FIG. 5, the external coils 55 of the external device 30 can be inserted through the windows 65 so as to directly abut the outer surface of the cable 20, thereby minimizing the distance between the internal and external coils 55.

The upper insert 61 in this embodiment is similar in shape to the lower insert 60 shown in FIG. 6 except that it does not include the projection 63, the windows 65, or the skit 66. However, if external coils 55 are disposed in the upper section 32 of the clamping portion 31, the upper insert 61 may also be equipped with windows.

The external coils 55 may have any shape which enables them to be inductively coupled to the internal coils 170. In this embodiment each external coil 55 has a ferromagnetic core wound with a winding and encapsulated in a resilient resin to protect the coil from the environment and to cushion it. The external coils 55 are shown as both located in the lower section 33 of the clamping portion 31. It is possible to dispose the external coils 55 in the upper section 32, or to have the two external coils 55 in different sections 32 and 33, but disposing both coils 55 in the lower section 33 has the advantage that wires for the external coils 55 do not need to pass between the two sections.

Figure 7:
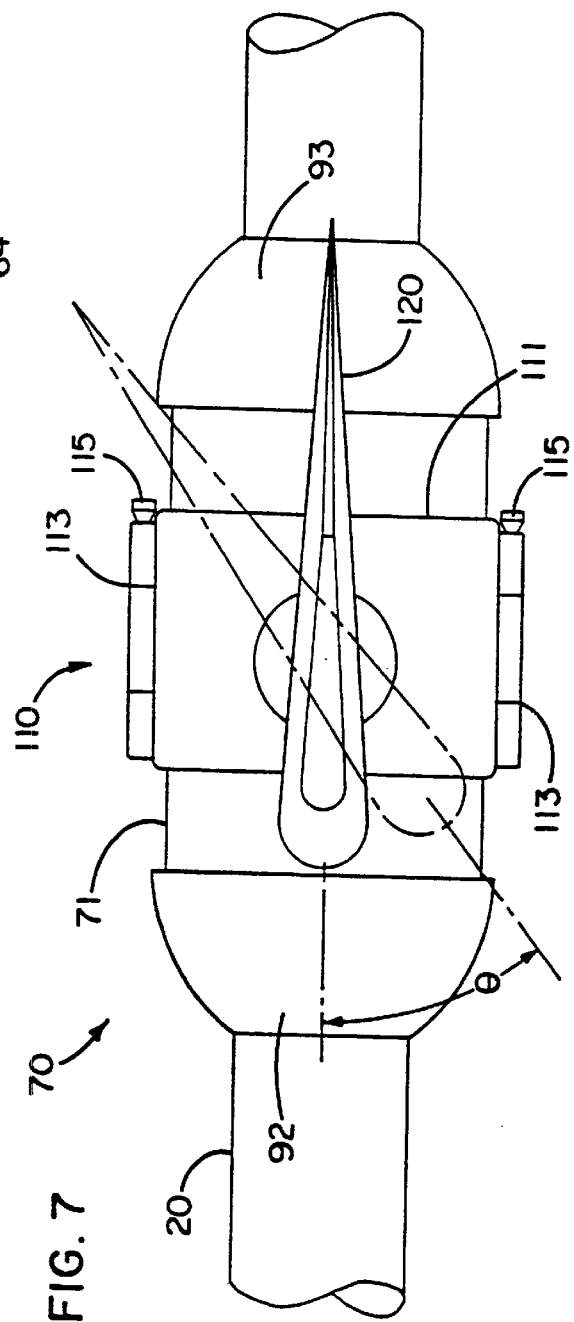
FIG. 7 is a side elevation of another embodiment of an external device according to the present invention in the form of a depth control device mounted on the cable of FIG. 1.

FIGS. 7 through 17 illustrate another example of an external device according to the present invention. This embodiment is a depth control device 70 which is capable of controlling the depth beneath the water surface of the underwater cable 20. In addition, it may be used to steer the cable 20 to control the horizontal position of the cable 20 within the water. FIG. 7 is a side elevation showing the depth control device 70 as it would appear when being towed through the water to the left in the figure.

As shown in these figures, the depth control device 70 includes an inner sleeve 71 which is clamped around and stationary with respect to the cable 20, and a wing unit 110 which is rotatably mounted on the inner sleeve 71 and is capable of rotating or being rotated with respect to the inner sleeve 71 around the longitudinal axis of the cable 20. The wing unit 110 is equipped with one or more wings 120 which can exert a force on the cable 20 to move the cable 20 in a desired direction. The inner sleeve 71, which is intended to remain on the cable 20 during storage, includes actuators 130 and 135 for controlling the position and attitude of the wings 120 of the wing unit 110 and may include various electrical components for sensing the position of the depth control device 70 and controlling the acuators for the wings 120.

The inner sleeve 71 may have any structure which enables it to support the wing unit 110 and to resist the stresses which are applied to the inner sleeve 71 during use and storage of the cable 20. In the present embodiment, it has a structure resembling that of the clamping portion of the previous embodiment. It includes two generally semicylindrical sections 72 which surround the cable 20 and are pivotably connected with each other by a pair of hinges 73 each having one or more removable hinge pins 74. When the hinge pin(s) 74 of one of the hinges 73 are retracted from the hinge sockets, the sections 72 can be swung open by pivoting about the other hinge 73 to enable the inner sleeve 71 to be removed from the cable 20. Semicylindrical inserts 100 and 102 similar to those used in the previous embodiment are secured to the interiors of the sections 72 of the inner sleeve 71 by screws, for example, and are shaped to engage with a coil support device 160 inside the cable 20 so as to prevent the inner sleeve 71 from rotation or axial movement with respect to the coil support device 160. For example, one of the inserts 100 may be formed with an inward projection 101 which engages with a corresponding recess in the coil support device 160. The inner sleeve 71 can be formed of a variety of materials, including but not limited to both metals and polymeric materials. A plastic having good impact resistance is particularly suitable.

Figure 13:
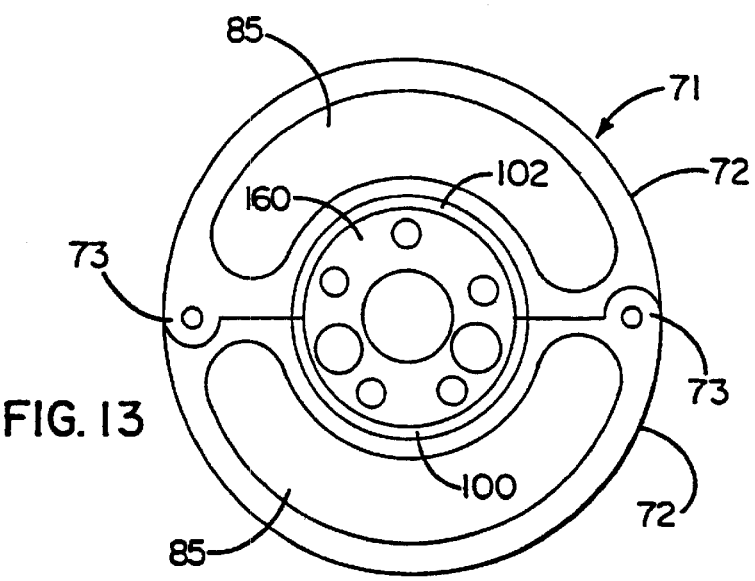
FIG. 13 is an end view of the inner sleeve of the depth control device.
Figure 14:
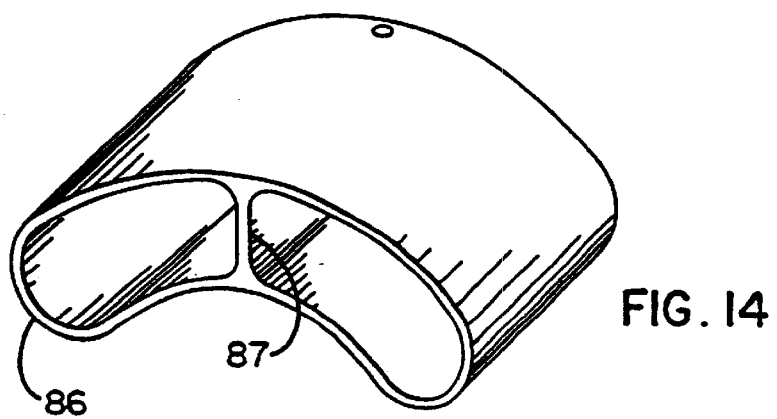
FIG. 14 is a perspective view of a lining for one of the cavities of the inner sleeve of FIG. 13.

Each of the sleeve sections 72 contains one or more internal cavities 85 for housing various components. In the present it, each sleeve section 72 contains two elongated cavities 85 each having a blind inner end and an outer end which opens onto an end surface of the sleeve section 72. As shown in FIG. 13, which is an end view of the sleeve sections 72, the cavities 85 are generally kidney shaped and extend in the circumferential direction around the hollow center of the inner sleeve 71. To give the inner sleeve 71 strength in the region of the cavities 85, each of the cavities 85 in this embodiment may be reinforced by a metal lining 86 of aluminum, for example. As shown in FIG. 14, each of the linings 86 is a tube having two open ends and a longitudinal stiffener 87. In the region of the cavities 85, the linings 86 may be the principal load bearings portions of the inner sleeve 71. The actuators 130 and 135 for operating the wings 120 and various electrical components can be disposed inside the lining 86 and thereby protected against forces applied to the inner sleeve 71 during use.

Figure 15:
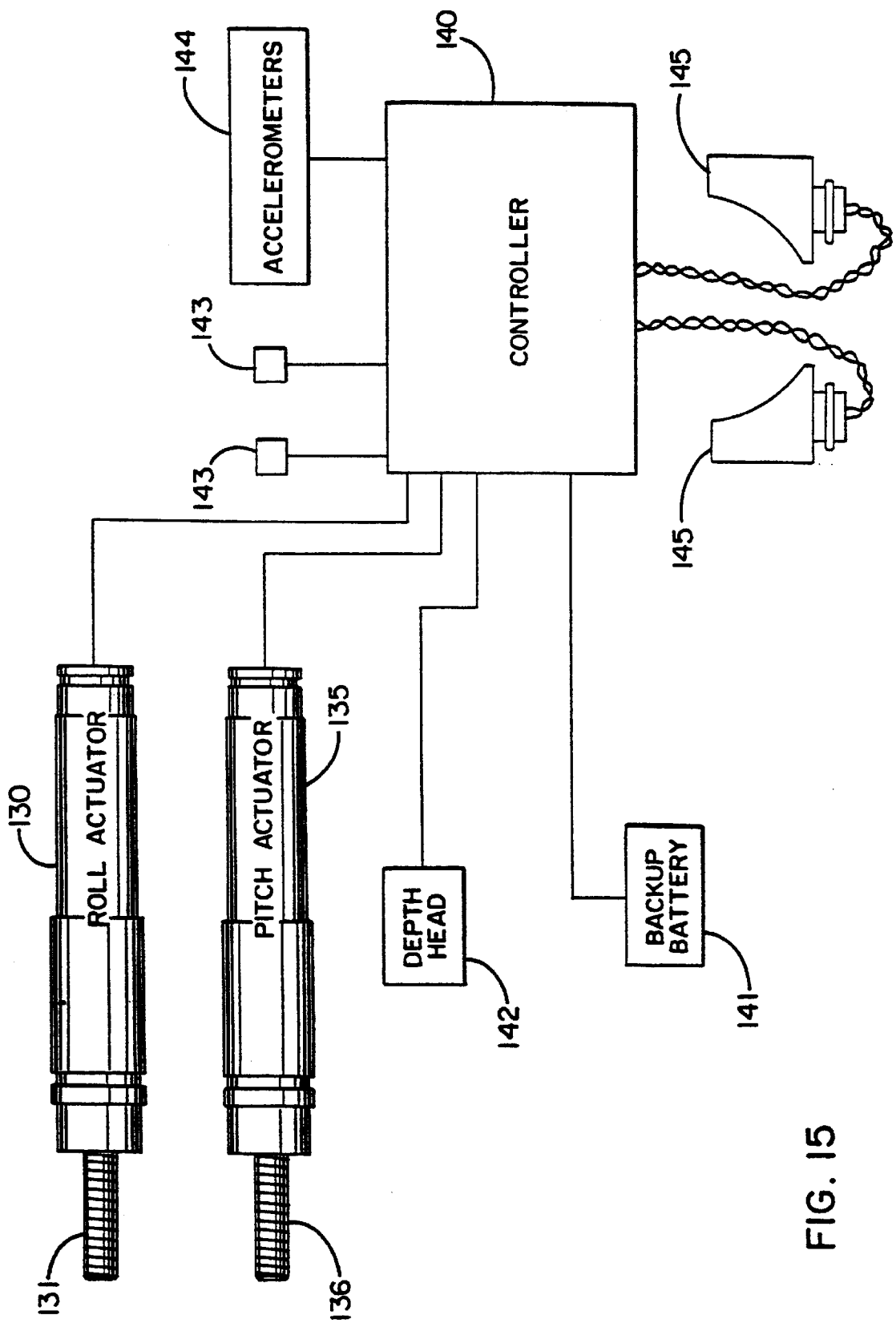
FIG. 15 is a block diagram of the electrical components of the depth control device of FIG. 7.
Figure 16:
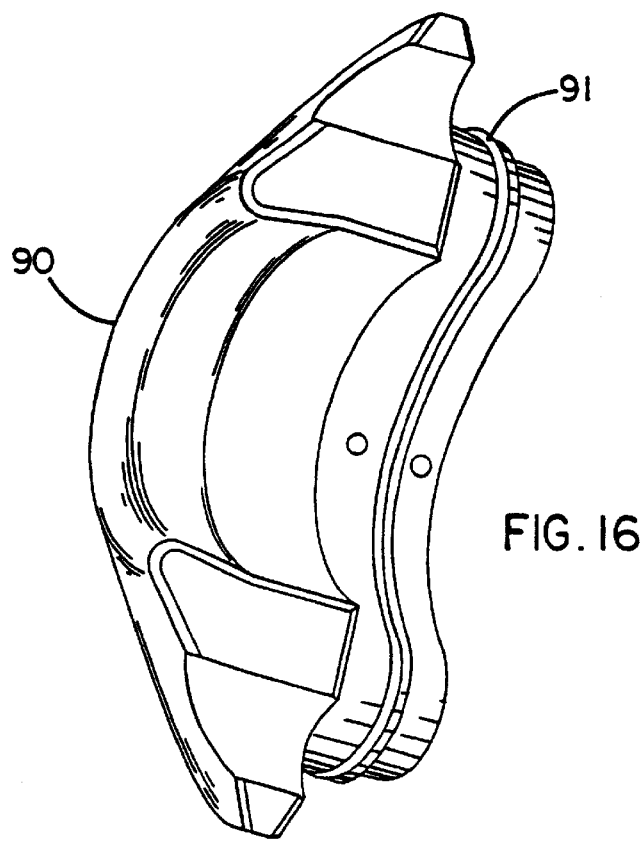
FIG. 16 is a perspective view of one of the closures for the inner sleeve.

As shown in FIG. 15, the inner sleeve 71 may house a variety of components. In the present embodiment, in addition to the actuators 130 and 135 for operating the wing unit 110, the inner sleeve 71 contains a depth sensor 142 (such as one employing a stain gage bridge) for measuring the depth of the depth control device 70, a backup battery 141 (such as a NiCad, NiMH, or Li-ion battery) for powering the depth control device 70 during temporary cutoffs of power transmission from the cable 20, a charger (not shown) for recharging the backup battery 141, wing position sensors 143 such as Hall effect sensors for sensing the roll and pitch angle of the wings 120 with respect to the inner sleeve 71 as well as the angle of attack, an attitude sensor 144 (such as a pair of accelerometers) for sensing the attitude of the inner sleeve 71 with respect to the horizontal, a controller 140 for controlling the actuators 130 and 135 based on inputs from the sensors, and one or more external coils 145 which are inductively coupled with one or more corresponding internal coils disposed within a coil support device 160 inside the cable 20 so that electric power and data signals can be transmitted between the cable 20 and the depth control device 70. During normal operation, all electric power for the depth control device 70 is provided by the external coils 145. When the transmission of power from the cable 20 is interrupted or the voltage falls below a predetermined level, the controller 140 automatically connects the electric components to the backup battery 141 to ensure continued operation. Because the depth control device 70 does not require batteries for normal operation, it does not require frequent battery replacement and can operate for long periods without maintenance.

Figure 17:
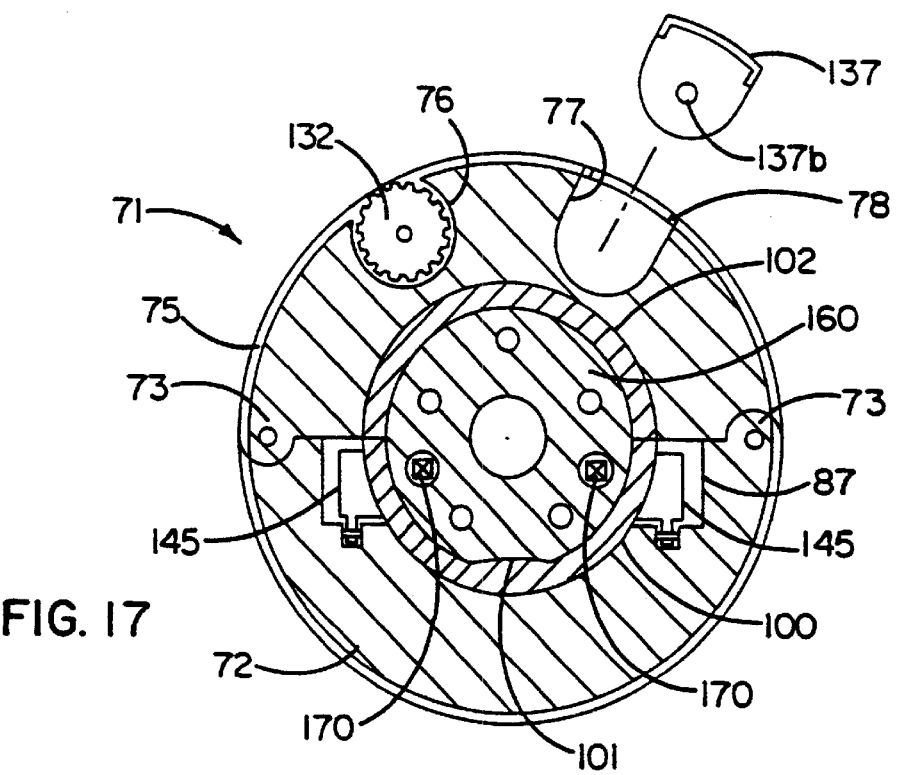
FIG. 17 is a transverse cross-sectional view of the inner sleeve along a plane passing through the first slot.

As shown in FIG. 17, which is a transverse cross-sectional view of the inner sleeve 71 taken through the first slot 75, like the external coils shown in FIG. 5, the external coils 145 of this embodiment are housed in cutouts 87 formed in the inner periphery of one of the sections 72 of the inner sleeve 71, directly opposing the corresponding internal coils 170 in the coil support device 160. The other electric components of the depth control device 70 are housed inside the cavities 85 within the inner sleeve 71. The leads of the external coils 145 extend through unillustrated passages in the inner sleeve 71 between the cutouts 87 and the cavities 85.

Figure 8:
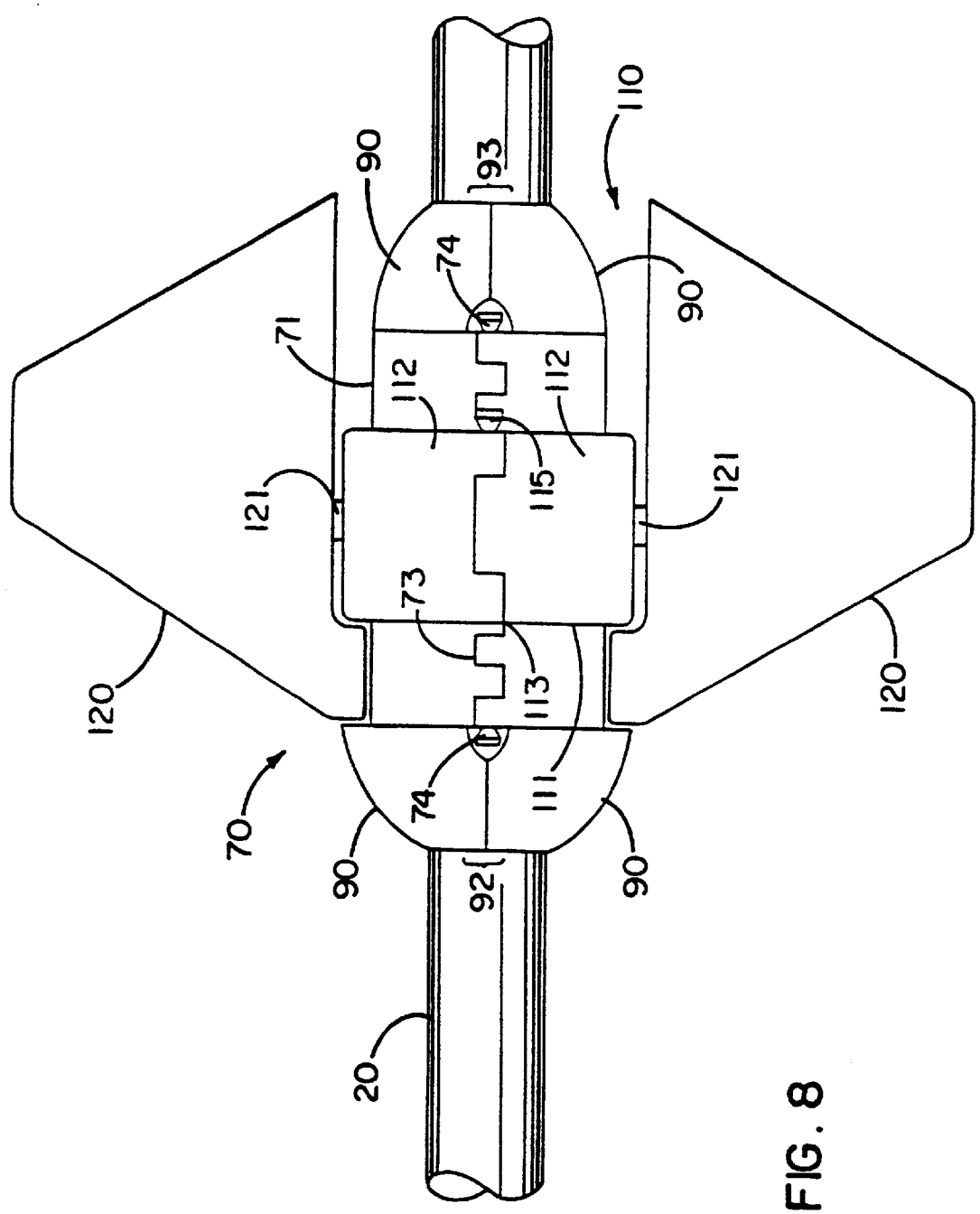
FIG. 8 is a plan view of the depth control device of FIG. 7.
Figure 11:
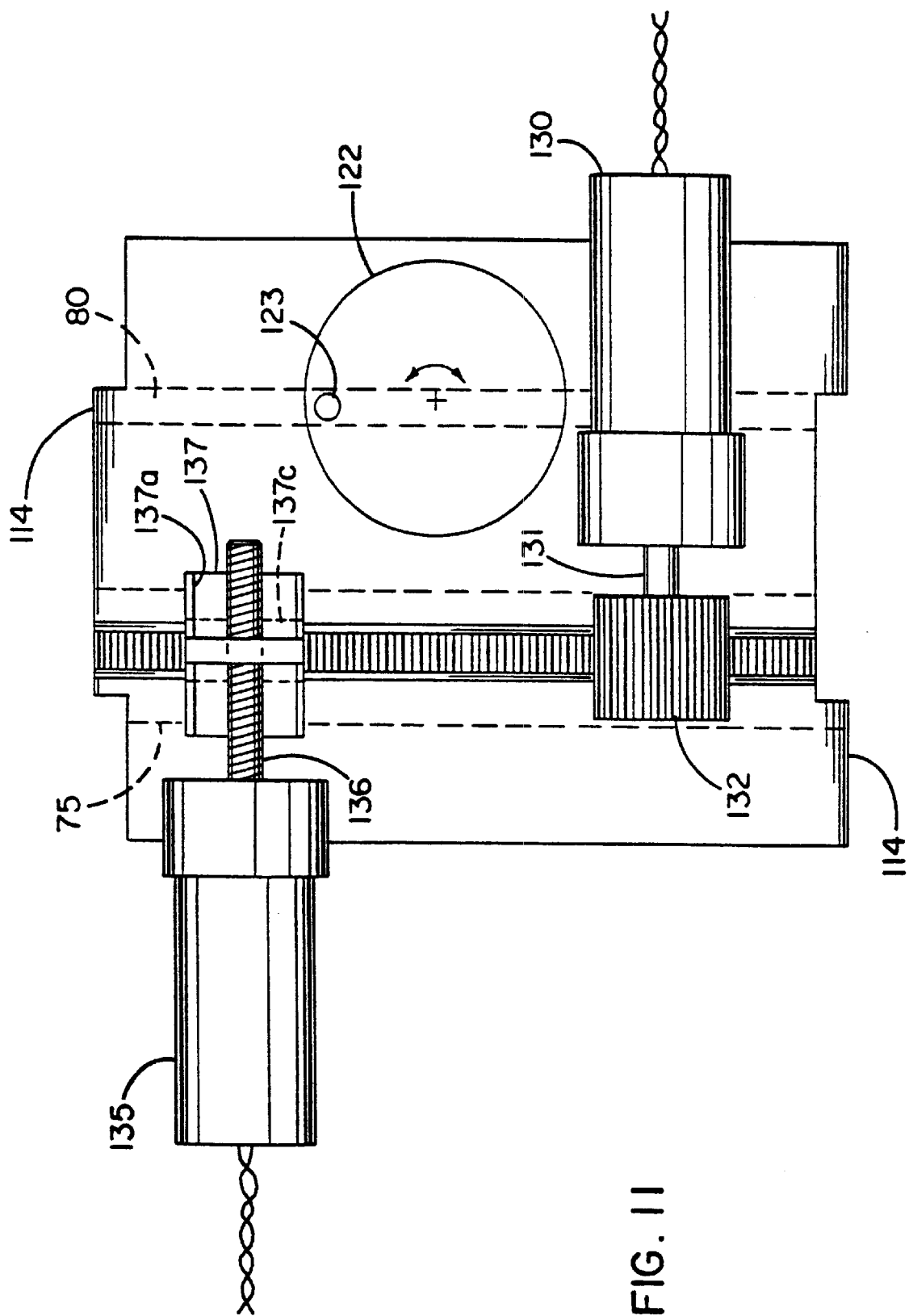
FIG. 11 is schematic elevation of the section of the wing unit of FIG. 10 showing the manner in which the wings are controlled by the roll and pitch actuators.
Figure 12:
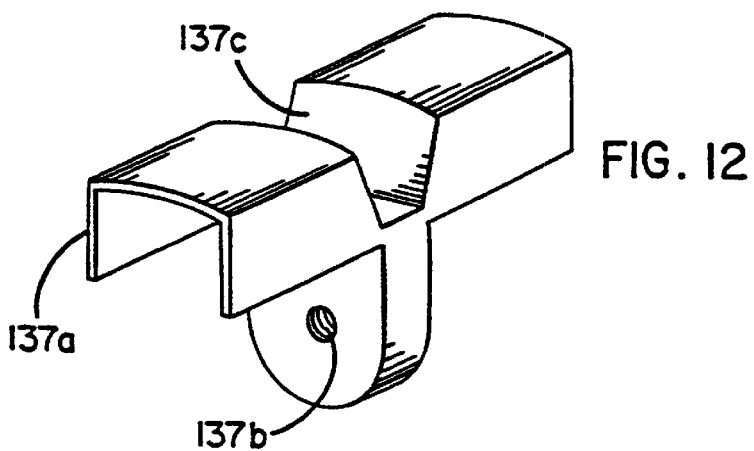
FIG. 12 is a perspective view of a shuttle for attachment to a pitch actuator.

The open outer ends of the cavities 85 in the inner sleeve 71 are sealed against the environment by suitable closures 90. FIG. 12 shows one of the closures 90 used in the present embodiment. The lengthwise inner end of each closure 90 is shaped to fit tightly into the outer end of one of the kidney-shaped cavities 85 in the inner sleeve 71. A sealing member 91 such as an O-ring can be mounted on the closure 90 to produce a fluid-tight seal of the cavity 85. The two closures 90 at each end of the inner sleeve 71 together extend substantially entirely around the periphery of the cable 20 and dine a bumper 92, 93 which protects the lengthwise ends of the inner sleeve 71 against impacts. As shown in FIG. 8, the bumper 92 formed by the closures 90 at the front end of the inner sleeve 71 preferably has a maximum outer diameter which is larger than the outer diameter of the front lengthwise end of the inner sleeve 71 so as to protect the radially inner portion of the leading edges of the wings 120 against impacts. Cutouts may be formed in the bumpers 92, 93 to permit the hinge pins 74 for the inner sleeve 71 to be inserted and removed so that the inner sleeve 71 can be opened and closed without removing the bumpers 92, 93. Preferably, the inner periphery of the bumpers 92, 93 fits snugly against the outer surface of the cable 20 to prevent foreign objects from entering between the outer surface of the cable 20 and the inner periphery of the inner sleeve 71. Preferably, the closures 90 are formed of a resilient materials, such as rubber, which can cushion the inner sleeve 71 against impacts.

Two circumferentially extending slots 75 and 80 are formed in the outer periphery of the inner sleeve 71 for rotatably supporting corresponding portions of the wing unit 110. Preferably, the slots extend around the entire periphery of the inner sleeve 71 to enable the wing unit 110 to rotate by 360 degrees with respect to the inner sleeve 71, although it is also possible for the slots to extend only partway around the circumference if a lesser degree of rotation of the wing unit 110 is adequate. The hinge pins 74 for the inner sleeve 71 are disposed radially inward of the slots 75 and 80 so as not to interfere with the rotation of the wing unit 110 within the slots.

The wing unit 110 includes a collar 111 which is mounted on the inner sleeve 71 so as to be capable of rotation with respect to the inner sleeve 71 about the longitudinal axis of the cable 20, and a pair of wings 120 mounted on the collar 111 in a manner such that the angle of attack of each wing 120 can be adjusted. Preferably, the collar 111 has a structure such that it can be readily detached from the inner sleeve 71 to enable the wings 120 to be removed from the cable as the cable 20 is being reeled onto the towing vessel. In the present embodiment, the collar 111 comprises two substantially semicylindrical sections which are pivotably connected to each other by a pair of hinges 113, each hinge 113 including one or more hinge pins 115. The hinge pins 115 of at least one of the hinges 113 is preferably of a type which can be partially or entirely retracted to disconnect the sockets 114 of the hinge 113 from each other and permit the collar 111 to open by pivoting of the collar sections 112 about the other hinge 113. An example of a collar having hinges of this type is described in U.S. Pat. No. 5,529,011. Such a collar is highly suitable because it can be quickly opened and closed without the use of any tools and because the hinge pins stay attached to the collar and cannot be lost.

A circumferentially extending spur-type ring gear sector 116 having internal teeth is formed on the inner surface on at least one of the collar sections 112. When the ring gear sector 116 is rotated about the longitudinal axis of the cable 20, the entire wing unit 110 is rotated to change the direction of the transverse force on the cable 20 produced by the wings 120. The farther the ring gear sector 116 extends around the circumference of the collar 111, the greater the directional range over which the force exerted by the wings 120 can be controlled. In the present embodiment, each of the collar sections 112 is formed with a ring gear sector 116, and when the collar sections 112 are joined to each other, the sectors 116 together form a ring gear extending substantially 360 degrees around the circumference of the cable 20. This permits the wing unit 110 to rotate a full 360 degrees around the longitudinal axis. However, the ring gear sectors 116 may extend for a smaller number of degrees around the circumference. The ring gear sectors 116 are slidably received in the first slot 75 of the inner sleeve 71. The width of the first slot 75 is greater than the width of the ring gear sectors 116 to enable the ring gear sectors 116 to translate back and forth within the first slot 75 in the longitudinal direction of the cable 20.

Each wing 120 is secured to a shaft 121 secured to the center of a disk, referred to as a pitch disk 122, rotatably mounted on one of the collar sections 112. A pin 123 which is spaced from the rotational center of the pitch disk 122 extends inward from each pitch disk 122 toward the center of the collar 111 and slidably engages with the second slot 80 in the inner sleeve 71. When the collar 111 is rotated about the longitudinal axis of the cable 20, the pin 123 can slide smoothly in the second slot 80 without producing rotation of the pitch disk 122 about its axis. When the collar 111 is made to translate with respect to the inner sleeve 71 in the longitudinal direction of the cable 20, the engagement between the second slot 80 and the pin 123 exerts a torque on the pin 123 about the rotational center of the pitch disk 122 and causes the pitch disk 122 to rotate and change the angle of attack (angle θ in FIG. 7) of the wings 120. Depending upon the range of longitudinal movement of the collar 111 (i.e., the amount by which the ring gear sectors 116 can move back and forth in the first slot 75), the pitch disk 122 may vary the angle of attack by as much as 180 degrees, although in general a much smaller range of variation of the angle is adequate. The range may be selected as desired. For example, it may be entirely positive, entirely negative, or it may include both positive and negative angles of attack, as in the present embodiment. Preferably, the angle of attack can also be set to 0 degrees when it is not necessary for the wings 120 to generate any lift.

The illustrated embodiment includes two wings 120, but the wing unit 110 may have a larger number of wings. For example, there may be two wings mounted on the collar 111 so that their angle of attack can be adjusted, and a third wing aligned with the longitudinal axis of the cable 20 to have a fixed, zero angle of attack can be mounted midway between the two adjustable wings.

The shape of the wings 120 can be selected in accordance with the expected operating conditions of the depth control device 70, such as the speed at which the cable 20 is expected to be towed through the water. For example, the shape can be chosen to minimize drag. Preferably the shape of the wings 120 is chosen to minimize flow noise which could interfere with the operation of hydrophones and acoustic devices mounted along the cable 20. The wings 120 may be entirely coplanar with each other or t may be dihedral wings.

The actuators for operating the wing unit 110 include one which will be referred to as a roll actuator 130 and another which will be referred to as a pitch actuator 135. The wing unit 110 can be rotated around the axis of the cable 20 by the roll actuator 130, which is drivingly connected to a spur gear pinion 132 which engages with the ring gear sectors 116 of the wing unit 110. As shown in FIG. 17, the pinion 132 is disposed in a recess 76 communicating with the inner surface of the first slot 75, with a portion of the pinion 132 extending radially into the first slot 75. When the wing unit 110 is mounted on the inner sleeve 71 with the ring gear sectors 116 disposed in the first slot 75, the pinion 132 engages with the ring gear sectors 116. The wing unit 110 can be made to translate in the longitudinal direction of the cable 20 by the pitch actuator 135, which is drivingly connected to a shuttle 137. FIG. 12 illustrates the structure of the shuttle 137. It includes a channel-shaped upper portion equipped with flanges 137a which are slidably received in axially extending slots 78 formed in the outer surface of the inner sleeve 71 adjoining the first slot 75. An internally threaded hole 137b is formed in the lower portion of the shuttle 137 for engagement with an external thread formed on the output shaft 136 of the pitch actuator 135. The engagement between the flanges 137a of the shuttle 137 and the slots 78 in the inner sleeve 71 prevents the shuttle 137 from rotating with the output shaft 136 of the pitch actuator 135 but permits the shuttle 137 to move with respect to the inner sleeve 71 in the longitudinal direction of the cable 20. In the present embodiment, as shown in FIG. 17, the shuttle 137 is received in a recess 77 adjoining the radial inner periphery of the first slot 75. When the output shaft 136 of the pitch actuator 135 is rotated, the output shaft 136 acts as a lead screw and causes the shuttle 137 to translate in the longitudinal direction of the cable 20. The shuttle 137 is engaged with the collar 111 of the wing unit 110 such that the wing unit 110 translates together with the shuttle 137 with respect to the inner sleeve 71 in the longitudinal translation of the cable 20 but such that the shuttle 137 does not interfere with the rotation of the wing unit 110 about the axis of the cable 20. In the present embodiment, the shuttle 137 is formed with a slot 137c in its upper surface which slidably receives the ring gear sector 116 and has a width greater than the width of the teeth of the ring gear sectors 116. When the ring gear sectors 116 rotate, the teeth of the ring gear sectors 116 can pass through the slot 137c without the shuttle 137 interfering with the rotation of the ring gear sectors 116. When the shuttle 137 translates in the longitudinal direction of the cable 20, one of the sides of the slot 137c pushes against a lateral surface of the ring gear sectors 116 and pushes the entire wing unit 110 in the longitudinal direction of the cable 20. The shuttle 137 may engage with the collar 111 in other ways. For example, the shuttle 137 may be formed with a pin which slidably engages with a circumferential slot formed in the inner periphery of the collar 111, such as the second slot 80.

Mechanisms other than a pinion 132 and a ring gear may be used to rotate the wing unit 110 about the longitudinal axis of the cable 20. For example, the pinion 132 may be replaced by a roller which is in rolling contact with the inner periphery of the collar 111 and which rotates the wing unit 110 by friction rather than by engagement of gear teeth.

The actuators 130 and 135 need not have any particular structure. In the present embodiment, each of the actors includes an electric motor (such as a permanent magnet DC motor) drivingly connected to an output shaft and an unillustrated position indicator (such as a shaft angle encoder) for sensing the rotational position of the output shaft. It may also include various other components, such as a gear box connected between the motor and the output shaft, and a torsional shock absorbing arrangement (such as a an Oldham coupling with a torsional damper insert) connected between the motor and the output shaft for preventing shocks which may be applied to the wings 120 during operation of the depth control device 70 from being transmitted to the motor. Actuators having a motor, a gear reduction unit, and an encoder combined win a single package are commercially available and may be used in the present invention.

The Hall effect sensors 143 are used to sense the position of the wings 120 with respect to the inner sleeve 71 in roll and pitch. A first one of the Hall effect sensors 143 generates a signal when the collar 111 is at a reference rotational position with respect to the inner sleeve 71, while a second one of the Hall effect sensors 143 generates a signal when the collar 111 is at reference position in the lengthwise direction of the inner sleeve 71. The reference position in the lengthwise direction corresponds to a predetermined reference angle of attack of the wings 120. Unillustrated magnetic member, such as magnetic pellets, may be mounted on the collar 111 or the wings 120 for sensing by the Hall effect sensors 143. By counting the number of rotations of the roll actuator 130 since the generation of an output signal by the first Hall effect sensor 143, the controller 140 can calculate the current rotational angle of the collar 111 and the wings 120 with respect to the reference rotational position. Based on the angle with respect to the horizontal determined by the output of the attitude sensor 144, the controller 140 can determine the current roll angle of the wings 120 about the longitudinal axis of the cable 20 with respect to the horizontal. Similarly, by counting the number of rotations of the pitch actuator 135 since the generation of an output signal by the second Hall effect sensor 143, the controller 140 can calculate the angle of attack of the wings 120.

Many other types of position sensors for sensing the position of the wings 120 other than Hall effect sensors can be used, such as optical or mechanical sensors.

When the roll actuator 130 is operated, the pinion 132 rotates with the output shaft 131 of the actuator, and the engagement between the ring gear sectors 116 and the pinion 132 causes the entire wing unit 110 to rotate about the longitudinal axis of the cable 20, thereby adjusting the angles of the rotational axes of the wings 120 with respect to the vertical. When the pitch actuator 135 is operated, the shuttle 137, which is slidably mounted on the inner sleeve 71, is made to translate in the longitudinal direction of the cable 20 by the rotation of the output shaft 136 of the pitch actuator 135. The engagement between the shuttle 137 and the ring gear sectors 116 causes the entire wing unit 110 to translate in the longitudinal direction of the cable 20. As the wing unit 110 translates, the engagement between the eccentric pin 123 mounted on the pitch disk 122 and the second slot 80 of the inner sleeve 71 exerts a force on the pin 123 which causes the pitch disk 122 to rotate about its axis. The rotation of the pitch disk 122 causes both wings 120 to rotate about their axes, thereby changing the angle of attack of the wings 120. Because the pinion 132 and the ring gear sectors 116 are spur gears, they can remain meshed with each other when the wing unit 110 is translating in the longitudinal direction of the cable 20. Thus, it is possible to operate the roll actuator 130 and the pitch actuator 135 either independently or at the same time.

The direction and magnitude of the force exerted on the cable 20 by the wings 120 can be adjusted by varying the angle of the axes of rotation of the wings 120 with respect to the vertical and/or the angle of attack of the wings 120. In order to exert a horizontal transverse force on the cable 20 to move it laterally, the roll actuator 130 can be operated to rotate the wing unit 110 until the axes of the wings 120 are substantially vertical. In order to exert a vertical force on the cable 20 to adjust the depth of the cable 20 in the water, the roll actuator 130 can be operated to rotate the wing unit 110 until the axes of the wings 120 are substantially horizontal. At an angle of the axes between the horizontal and vertical, the wings 120 can exert a transverse force on the cable 20 having both a horizontal and a vertical component. When the cable 20 is at a desired depth and horizontal location, the pitch actuator 135 can set the angle of attack of the wings 120 to zero so that the wings 120 exert no transverse force on the cable 20.

The controller 140 can control the operation of the depth control device 70 in a variety of manners. For example, based on the input signal from the attitude sensor 144, which indicates the roll angle of the inner sleeve 71 with respect to the horizontal, the Hall effect sensors 143, and the encoder for the roll actuator 130, the controller 140 can control the roll actuator 130 so as to maintain the roll angle of the wings constant with respect to the horizontal. In addition, based on the input signal from the depth sensor 142, the controller 140 can control the pitch actuator 135 to maintain the depth control device 70 at a constant depth.

The mechanism employed in the present embodiment for adjusting the rotation of the wing unit 110 and the angle of attack of the wings 120 is not limited to a depth control device 70 having a detachable wing unit and can be employed with any type of depth control device 70.

In most conventional depth control devices, the wings 120 are suspended like a pendulum below the cable 20 on which the device is mounted so that gravity will act on the wings 120 to maintain them in a horizontal position. In many cases, the depth control device includes a buoyant float disposed on the upper side of the cable 20, the force of buoyancy acting on the float to maintain the wings 120 horizontal. However, suspending the wings 120 beneath the cable 20 and/or using a float significantly increases the appendage drag of the depth control device as well as creates hydrodynamic noise which degrade the performance of acoustic components mounted on the cable 20. Furthermore, since the wings 120 are intended to remain horizontal, they cannot be oriented so as to steer the cable 20 horizontally.

In contrast, in a depth control device 70 according to the present invention, the wings 120 are mounted close to the cable 20 without the need for any appendages to connect them to the cable 20, so hydrodynamic drag and noise are much reduced. Because there are no appendages, the risk of entanglement of the depth control device 70 with objects in the water is also reduced. Furthermore, because the wings 120 can be rotated to any angle with respect to the horizontal, they can be used to exert a transverse force on the cable 20 in any desired direction.

Figure 18:
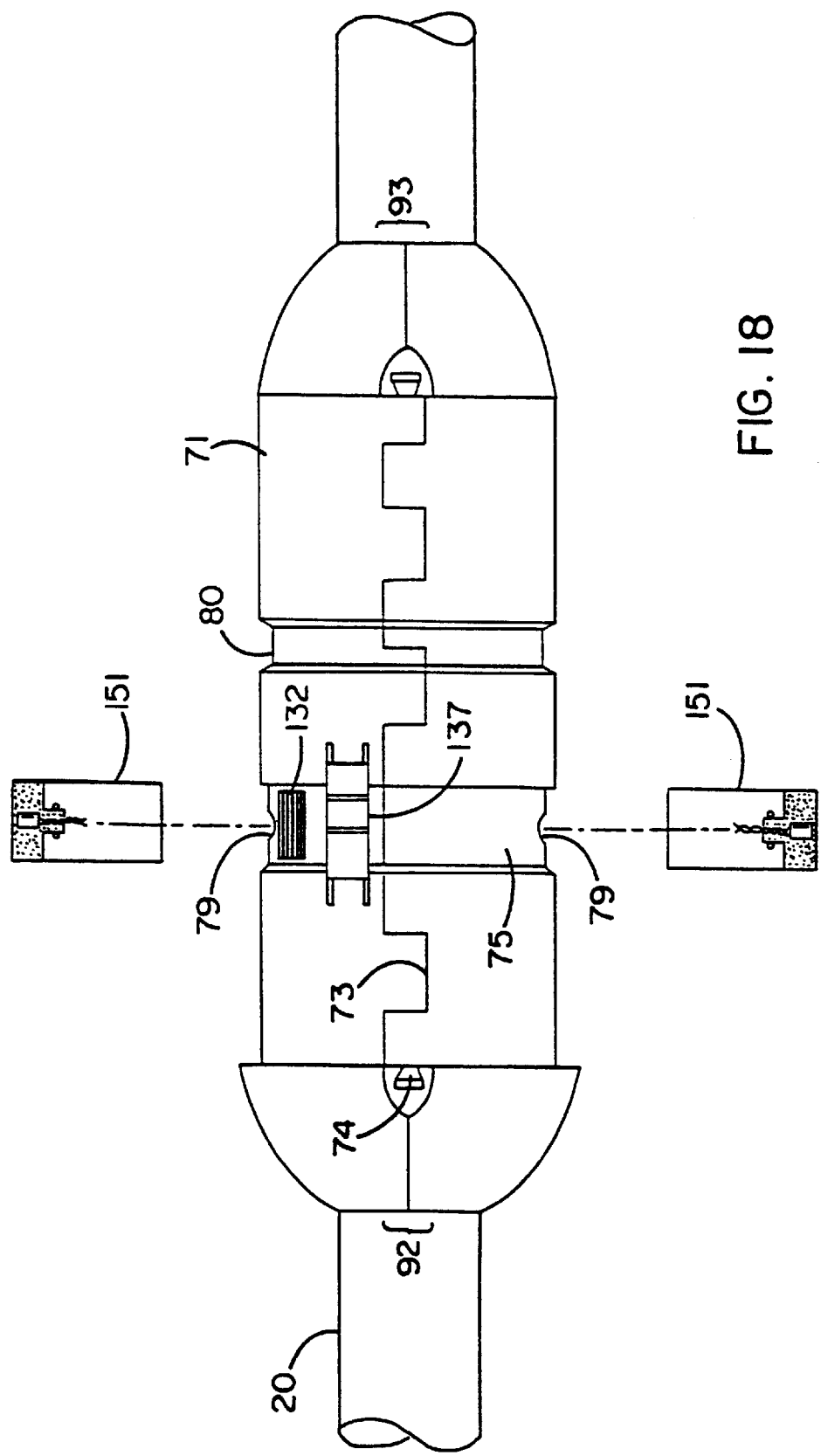
FIG. 18 is a partially exploded plan view of an embodiment of an external device according to the present invention equipped with an acoustic ranging device.
Figure 19:
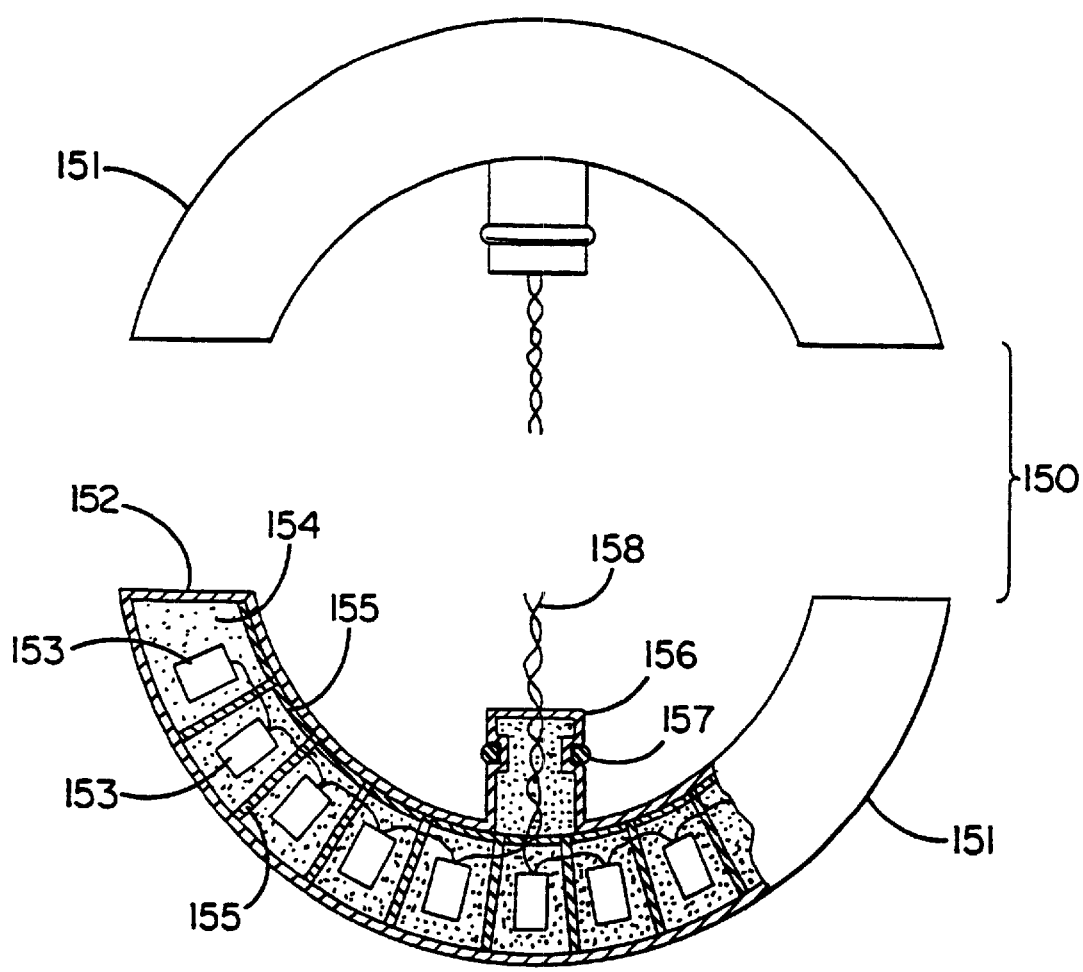
FIG. 19 is a partially cross-sectional front elevation of the acoustic transducer array of the ranging device of FIG. 18.

FIGS. 18 and 19 illustrate another embodiment of an external device according to the present invention. FIG. 18 is a side elevation of the external device as it would appear when being towed through the water to the left in the figure. The external device includes an inner sleeve 71, which may be identical to the inner sleeve 71 of the depth control device shown in FIG. 9. The wing unit of the previous embodiment has been replaced by a ring-shaped acoustic ranging device 150 which sits in the first slot 75 in the exterior of the inner sleeve 71.

Typically, a plurality of acoustic ranging devices are attached to an underwater cable at predetermined locations. The ranging devices may include transmitting and/or receiving. The ranging devices transmit and/or receive acoustic pulses through the water between each other. Data representing the times of transmission and the times of reception of acoustic pulses are usually transmitted by the ranging devices over a communications link through the cable to a controller aboard the towing vessel. The transit times of pulses between pairs of ranging devices and therefore the distances between pairs of locations on the cable, the towing vessel, or the seismic source, can be determined. From this collection of distances, the shape of the cable (and of hydrophones in the cable) can be estimated. An accurate estimation of the shape of the hydrophone array within the cable is need to form an accurate map of the geology under the ocean floor.

In the present embodiment, the ranging device 150 comprises a plurality of arcuate sections 151 which are mounted on the outer periphery of the inner sleeve 71. In the present embodiment, the ranging device 150 includes two substantially semicircular sections 151 which together define a split ring. Each of the sections 151 contains a plurality of cylindrical piezoelectric elements 153 having first and second radiating faces on their radially inner and outer ends. The piezoelectric elements 153 are did substantially radially with respect to the longitudinal axis of the cable 20. Preferably, the piezoelectric elements 153 are evenly spaced in the circumferential direction around the entire periphery of the cable 20 so that the radiation pattern created by the elements 153 will remain constant should the cable 20 rotate about its longitudinal axis. The number of elements 153 and their operating frequencies can be selected in accordance with the operating conditions. In the present embodiment, each of the sections 151 contains twelve piezoelectric elements 153 having a diameter of ⅜ inch and an operating frequency of 50–100 kHz. The radiating surfaces of the elements are recessed slightly below the outer surface of the inner sleeve.

Each of the sections 151 includes a housing 152 of a suitable materials, such as aluminum, to give the section 151 structural rigidity. The elements 153 inside the housing 152 are potted in a resilient potting materials 154 which acts as a pressure release boundary to mechanically cushion the elements 153 as well as protect them from the environment. The potting materials 154 preferably is selected to minimize the signal loss and preferably has an acoustic impedance which is approximately that of sea water. An example of a suitable potting materials is polyurethane. To reduce the effects of the elements 153 on each other, damping members 155, such as sheets of cork, may be imbedded in the potting materials 154 between adjoining elements 153 and along the radial inner surface of each section 151.

The circumferential ends of the sections 151 of the ranging device 150 are preferably shaped so that the inner sleeve 71 can be opened and closed with the ranging device 150 mounted on it. When the sections 151 of the ranging device 150 are disposed in the first slot 75 of the inner sleeve 71, the radial outer periphery of the sections 151 is preferably recessed with respect to the outer surface of the inner sleeve 71 adjoining the first slot 75. The pinion 132 and the shuttle 137 may be removed from the inner sleeve 71 if they would interfere with the insertion of the ranging device into the first slot 75.

Each of the sections 151 has a radially inwardly extending neck 156 which fits into a corresponding hole 79 formed in the first slot 75 of the inner sleeve 71. Lead wires 158 for the elements 153 pass through the necks 156 and are connected to suitable controller housed inside the cavities of the inner sleeve 71. Each of the necks 156 is fitted with a sealing member 157, such as a sealing ring, for sealing the hole 79 and protecting the interior of the inner sleeve 71 against the environment. When the ranging device 150 is detached from the inner sleeve 71, the holes 79 in the first slot 75 can be closed by suitable closures.

The piezoelectric elements 153 of the ranging device 150 can be controlled by suitable circuity disposed in the cavities of the inner sleeve 71. The elements 153 may be connected electrically in parallel in which case they are electrically equivalent to the transducer described in U.S. Pat. No. 5,031,159 entitled "Hydroacoustic Ranging System" which is incorporated by reference. The supporting electronics and signal processing may be as described in that patent and in U.S. Pat. No. 5,359,575 entitled "Underwater Pulse Tracking System" which is incorporated by reference.

During normal operation, the piezoelectric elements and electronic circuits 153 receive power from the external coils within the inner sleeve 71. Together with the inner sleeve 71, the ranging device 150 can remain mounted on the underwater cable 20 when the cable 20 is reeled in and stored aboard the towing vessel, since the housing 152 and the potting materials 154 can protect the piezoelectric elements 153 from damage. When it is desired to use the inner sleeve 71 as part of a depth control device, the sections 151 of the ranging device 150 can be removed from the first slot 75, the holes 79 in the first slot 75 can be sealed, and a wing unit like that of the previous embodiment can then be mounted on the inner sleeve 71. Since the ranging device 150 can remain attached to the cable 20 during storage, it is more efficient to use than a conventional ranging device which must be removed from the cable 20 before the cable 20 is wound up for storage. The device-specific electronics and other components are also exchanged.

The ranging device 150 shown in FIG. 19 is not limited to use with the inner sleeve 71 shown in FIG. 18 and may be mounted on an underwater cable 20 in any other desired manner. Furthermore, instead of being a split ring, it may be a continuous ring.

FIGS. 20 through 23 illustrate an embodiment of a coil support device 160 in detail. The coil support device 160 supports each of the internal coils 170 in a manner which protects the internal coils 170 against damage during operation of the cable 20, and particularly when the cable 20 is being deployed or reeled in.

As shown in these figures, the support device 160 has a generally cylindrical outer periphery similar to the cross-sectional shape of the cable 20. It includes a central bore 161 through which the wire bundle containing data communication lines and/or power transmission and distribution lines, for example, can pass. If desired, the central bore 161 may be reinforced by a reinforcing tube or similar member disposed along its inner periphery. When the cable 20 is of a type employing a plurality of stress members, a plurality of longitudinally-extending holes 162 may be formed around the central bore 161 through the entire length of the support device 160 for the stress members to pass through. Alternatively, one or more stress members may pass through the central bore 161. The stress members will usually be rigidly secured to the support device 160 by a bonding agent, for example. For this purpose, a plurality of radial holes 163 are formed between the outer surface of the support device 160 and the holes 162 for the stress members 162 for inserting a bonding agent into holes 162. However, mechanical devices, such as stoppers or pins, can also be used to secure the stress members to the support device 160.

The central bore 161 and the holes 162 for the stress members need not have any particular shape, but they are preferably shaped to avoid stress concentrations when the support device 160 is subjected to bending or crushing loads. For ease of manufacture, they are circular in the illustrated embodiment.

Each of the internal coils 170 is received in a longitudinally extending pocket 165 formed in the coil support device 160. The angular positions of the pockets 165 with respect to the longitudinal axis of the support device 160 are preferably selected so that the internal coils 170 will be as close as possible and preferably directly opposite to the corresponding external coils in the external device. However, the angle between the pockets 165 is not restricted to a particular value. In the illustrated embodiment, the two pockets 165 are spaced from each other by approximately 145° for use with an external device having external coils which are similarly spaced, but if the support device 160 is used with a different external device, the angular spacing may be a different value. The cross-coupling between the internal coils 170 in different pockets 165 can generally be minimized by increasing the angular spacing between the pockets 165. Thus, in the case of two pockets 165, cross-coupling can be minimized if the pockets 165 are spaced 180° from one another.

The pockets 165 may have any cross-sectional shape which enables them to house the internal coils 170. In this embodiment, the internal coils 170 are generally cylindrical, and the pockets 165 have a circular transverse cross-section.

The number of pockets 165 and internal coils 170 can be selected based on the number of external coils in the external device to which the internal coils 170 are to be coupled and on whether the support device 160 and the external device are capable of relative rotation about the longitudinal axis of the cable 20. When the external device and the coil support device 160 are prevented from rotating with respect to each other, it is generally sufficient to have a single internal coil 170 in the support device 160 for each external coil in the external device. However, when the external device is mounted on the cable 20 in a manner such that it can rotate about the longitudinal axis of the cable 20, it may be advantageous to have a different number of coils in the support device 160 and the external device (either a greater number in the support device 160 or in the external device) so that regardless of the relative rotational positions of the support device 160 and the external device, at least one of the internal coils in the support device 160 will be close enough to one of the external coils in the external device for good inductive coupling. In the present embodiment, the external device is prevented from rotation with respect to the coil support device 160, so there is a single pocket 165 in the coil support device 160 for each of the external coils in the external device.

The support device 160 is preferably made of a lightweight, impact resistant materials which will not break or plastically deform during operation of the cable 20. Polymers such as polyurethanes, polyacetals, polyetherimides, etc. particularly suitable. The illustrated support device 160 is made from Ultem 1000, which is a trademark of G.E. Plastics for an amorphous thermoplastic polyetherimide. Metals may be used for portions of the support device 160, such as for reinforcement, but since metals may interfere with the magnetic circuit between the internal and external coils, the extent of their use is preferably limited. If metals are used, they are preferably of a nonmagnetic materials such as titanium and disposed radially inwards of the internal coils 170. There is no restriction on the length of the support device 160, but preferably it is at least as long as the internal coils 170 which it supports.

Many conventional underwater cables employ metals in stress members. If metals are employed for the stress members, preferably the portions of the stress members passing through the support device 160 are nonmagnetic. Alternatively, the portions of the stress members within the support device 160 can be nonmetals, with metals used for other sections of the stress members outside of the support device 160.

The outer peripheral surface of the support device 160 may be formed with one or more grooves 167 extending between opposite lengthwise ends of the support device 160. These grooves 167 provide fluid communication between opposite lengthwise ends of the support device 160 to prevent a pressure differential from developing between the opposite sides. The grooves 167 also prevent pockets of air from being trapped between the outer surface of the support device 160 and the inner surface of the skin of the cable 20, thereby ensuring a smooth fit between the support device 160 and the skin.

When it is desired to prevent relative rotational movement of the coil support device 160 and the external device, an engaging portion, such as a recess 164, may be formed in the outer periphery of the support device 160 for engagement with some portion of the external device. In the present embodiment, the recess 164 comprises a flat extending between two points on the outer periphery of the support device 160 and sized so as to engage with the projection on an insert of the external device. In addition to preventing relative rotation of the support device 160 and the external device, the recess 164 makes it easy to install the support device 160 so that the internals coils 170 are directly opposed to the external coils, because the external device can be closed around the cable 20 only when the recess 164 is engaged with the projection on the insert of the external device.

Each of the internal coils 170 includes a metallic core 171 of a magnetic materials, such as a ferrite rod, a support member in the form of a hollow sheath 173 which surrounds the core 171 and extends along the core 171 in the lengthwise direction, and one or more windings 172 which are wrapped around the sheath 173 and magnetically coupled with the core 171. The windings 172 are inductively coupled with corresponding windings of an external coil in the external device. The sheath 173 serves not only to support and protect the core 171 but also to support the windings 172 of the internal coil 170. The sheath 173 is preferably made of a non-magnetic, non-conducting material which will not interfere with transmission of signals between the internal coil 170 and the external device. Plastics are particularly suitable for forming the sheath 173. In the present embodiment, the sheath 173 is made of a molded plastic. The sheath 173 may be formed with pairs of external flanges between which the windings 172 can be wound around the sheath 173. The core 171 may have any desired cross section. In the present embodiment, it has a circular transverse cross section, but many other shapes are possible.

The core 171, especially when made of ferrite, tends to be very brittle and can not resist any substantial bending stresses. Therefore, the sheath 173 is designed to support the core 171 to minimize the level of bending stresses in the core 171. For this reason, the sheath 173 preferably has a greater bending stiffness than the core 171 so that when the support device 160 is subjected to impacts (such as when a portion of the cable 20 containing the support device 160 is dropped on the deck of the towing vessel), substantially all inertial forces are resisted by the sheath 173 with virtually no bending stresses being applied to the core 171.

Figure 27A:
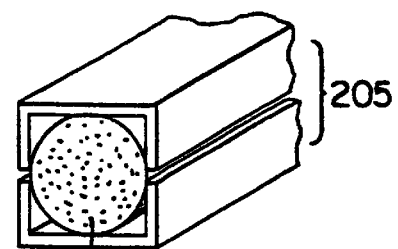
FIGS. 27A through 27C are cut-away perspective views of other examples of sheaths which can be used to support the core of the internal coil.
Figure 27B:
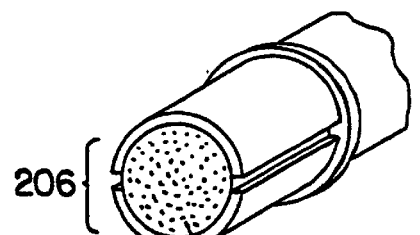
Figure 27C:
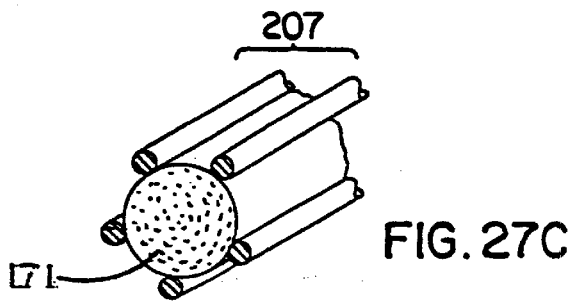

It is not necessary for the sheath 173 to extend entirely around the circumference of the core 171, but the shape of the sheath 173 is preferably such that the sheath 173 can resist inertial loads applied in any direction normal to the longitudinal axis of the core 171 so as to prevent the load from generating bending stresses in the core 171. FIGS. 27A through 27C illustrate examples of other possible shapes of the sheath 173. In FIG. 27A, a sheath 205 comprises a pair of C-shaped channels which fit closely around a core 171. In FIG. 27B, a sheath 206 comprises a plurality of arcuate sectors which closely surround a core 171 and are separated from each other by a gap in the circumferential direction. In FIG. 27C, a sheath 207 is in the form of a cage comprising a plurality of rods spaced from each other in the circumferential direction of a core 171 and extending in the lengthwise direction of the core 171. In each case, the bending modulus of the sheath can be selected so that the sheath preferably has greater stiffness in bending than the core 171 and can prevent bending stresses from being applied to the core 171. As can be seen, the sheath can have any shape which enables it to support the core 171 and minimize the application of bending stresses to the core 171.

The core 171 may be secured to the inside the sheath 173, such as by a bonding agent or an interference fit, but preferably the core 171 is mounted within the sheath 173 in a manner enabling the core 171 to be easily inserted and replaced. In the present embodiment, the sheath 173 fits relatively loosely around the core 171 so that the core 171 can easily slide into and out of the sheath 173. The core 171 is prevented from inadvertently coming out of the sheath 173 by suitable members such as rubber stoppers 177 which detachably fit into the ends of the sheath 173.

Each sheath 173 is supported in the corresponding pocket 165 by a plurality of cushioning members 175 in a manner such that the sheath 173 is spaced from the inner periphery of the pocket 165 at all times during the use of the cable 20. The cushioning members 175 can be any members which are capable of supporting the sheath 173 in a spaced relationship with respect to the inner periphery of the pocket 165 and which are sufficiently deformable that when the support device 160 is subjected to deformation and the walls of the pockets 165 deform, the sheath 173 will not be contacted by the inner walls of the pocket 165, thereby allowing the sheath 173 and the core 171 to remain straight and substantially unstressed during bending of the support device 160 in any direction. Furthermore, the cushioning members 175 preferably act to cushion the sheath 173 and the core 171 to reduce the level of accelerations experienced by the core 171 during impacts.

Figure 23:
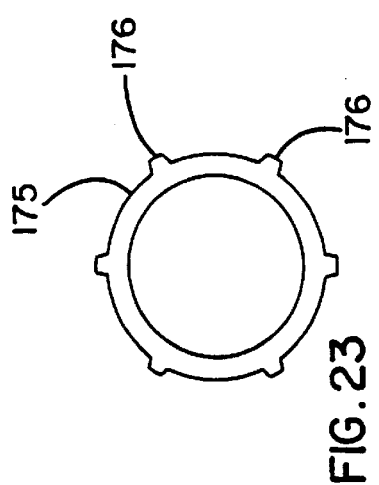
FIG. 23 is an enlarged plan view of one of the cushioning members of the coil of FIG. 22.

FIG. 23 is a plan view of one of the cushioning members 175. It comprises a ring of a resilient materials, such as rubber, having a plurality of projections 176 on its outer periphery for contacting the inner periphery of the pocket 165 and for deforming when the support device 160 undergoes bending. The inner diameter of the cushioning member 175 is large enough to receive the sheath 173, while the outer diameter at the projections 176 is selected to give a desired fit between the cushioning members 175 and the pocket 165. In order to reduce vibration of the internal coil 170 within the pocket 165, it may be desirable for the cushioning members 175 to fit snugly over the sheath 173, and for the projections 176 of each cushioning member 175 to fit snugly against the inner periphery of the pocket 165. At the same time, the tightness of the fit between the cushioning members 175 and the pocket 165 is preferably such that the internal coil 170 can be easily inserted into and removed from the pocket 165. Examples of other possible cushioning members include but are not limited to deformable rings with holes cut in them to increase their deformability, springs which suspend the sheath 173 inside the pocket 165, and a sheet of rubber or other resilient material wrapped around the sheath 173.

Figure 24:
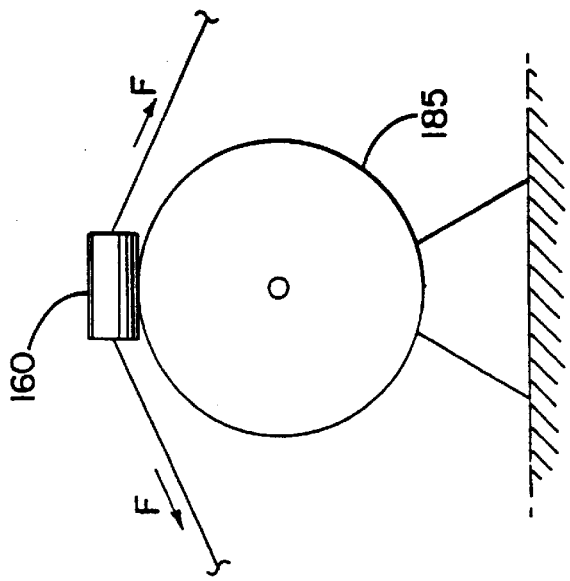
FIG. 24 is a schematic view showing an example of the forces acting on a coil support device as it passes over a roller on the deck of a towing vessel.

During operation of the cable 20, the support device 160 will tend to be subjected to the highest loads when the cable 20 is being deployed or reeled in. These loads may be of various types. The support device 160 will be subjected to high bending loads when passing over a roller on the afterdeck of a towing vessel as the cable 20 is being deployed or reeled in. Other significant forces can be applied to the support device 160 when the cable 20 is wrapped around a storage reel for storage after passing over the roller, at which time the support device 160 may be subjected not only to bending moments but also to crushing loads from portions of the cable 20 wrapped over the support device 160. The support device 160 my also be subjected to impacts if the cable 20 is dropped against the deck of the towing vessel. Given the values of the expected loads to be applied to the support device 160, the stiffness of the support device 160 and the spacing of the walls of each pockets 165 from the sheath 173 of the internal coil 170 disposed inside the pocket 165 can be selected such that the sides of the pocket 165 will not come into contact with the sheath 173 at any time during the use of the cable 20. FIG. 24 illustrates an example of a bending load applied to the coil support device 160 when passing over a roller on the deck of a towing vessel. With the support device 160 resting against a steel roller 185 having a diameter of 18 inches (the typical diameter of a roller on the afterdeck of a towing vessel), a tensile load of 4500 pounds may be applied to the support device 160 at an angle of 25 degrees, for example, with respect to the longitudinal axis of the support device 160. Under these conditions, the walls of the pockets 165 of the support device 160 preferably do not contact the sheaths 173 of the internal coils 170 and the cores 171 are not subjected to any significant bending stress. Furthermore, the coil support device 160 is preferably able to withstand a drop of 1 meter, for example, onto a hard surface without any damage to the core 171 of a coil 170 contained inside it. An example of a crushing load which the coil support device 160 can preferably withstand without damage to internal coils 170 disposed inside it is a 4500 pound crushing load applied with a 3-inch diameter metal cylinder oriented at an angle of 20 degrees with respect to the axis of the coil support device 160.

One or more additional cushioning members may be provided to protect the lengthwise ends of the core 171 against impacts. In the present embodiment, the stoppers 177 which prevent the core 171 from coming out of the sheath 173 serve this function and act as elastic bumpers for the lengthwise ends of the core 171.

The ends of the windings 172 of the internal coil 170 may be connected to the exterior of the pocket 165 in any suitable manner. The illustrated internal coil 170 includes a stopper 178 which seals the open end of the pocket 165 in a fluid-tight manner. The stopper 178 includes an electrically insulating body and a sealing member 179, such as an O-ring, which is mounted on the body and forms a seal against the inner wall of the pocket 165. The stopper 178 is molded around a plurality of external leads 181 which can be electrically connected to a wire bundle or other member within the cable 20. The inner ends of the leads 181 are electrically connected to the ends of the windings 172 of the internal coil 170 by soldering, for example. A loop 180 is secured to the outer end of the stopper 178 to assist a user in removing the internal coil 170 from the pocket 165 without pulling on the leads. The ideal coil 170 may be retained within the pocket 165 in any desired manner. In the present embodiment, a detachable retaining ring 182 (such as a C-ring) fits into a groove formed in the open end of the pocket 165 adjoining the outer end of the support device 160 to resist the longitudinal movement of the internal coil 170.

Figure 25:
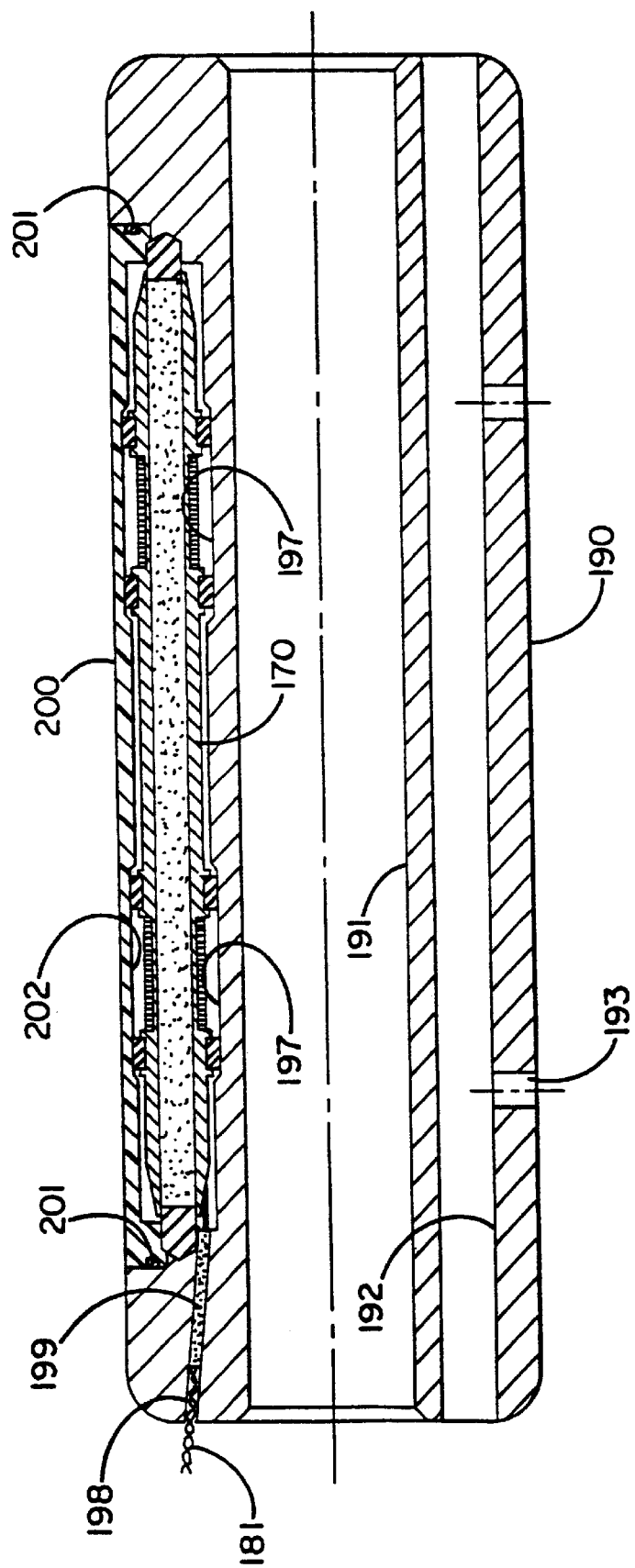
FIG. 25 is a longitudinal cross-sectional view of another embodiment of a coil support device according to the present invention.
Figure 26:
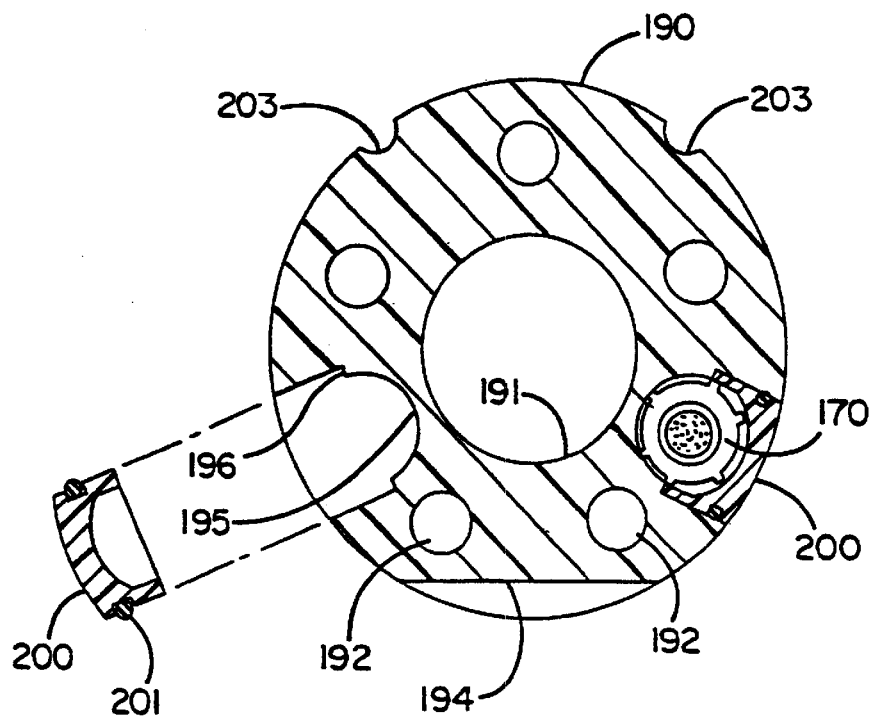
FIG. 26 is a partially exploded transverse cross-sectional view of the embodiment of FIG. 25.

FIGS. 25 and 26 illustrate another embodiment of a coil support device 190 according to the present invention. Like the previous embodiments, this support device 190 has a generally cylindrical outer periphery and a cylindrical central bore 191 through which a wire bundle of a cable 20 can pass. The support device 190 may be formed of the same materials usable for the previous embodiments. Longitudinal holes 192 for stress members for the cable 20 may be formed in the support device 190 between its opposite lengthwise ends when the coil support device 190 is to be used with a cable 20 having multiple stress members, and radial holes 193 for the injection of a bonding agent extend between the longitudinal holes 192 and the outer periphery of the support device 190.

Figure 22:
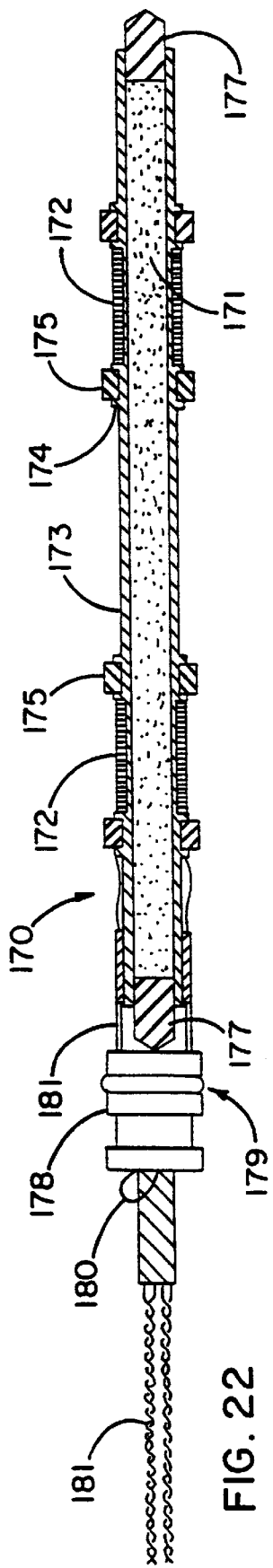
FIG. 22 is a longitudinal cross-sectional view of one of the internal coils.

The support device 190 includes one or more pockets 195, each of which is sized to house a internal coil 170, which may be the same in structure as the internal coil 170 of FIG. 22. In contrast to the pockets 165 of the embodiment of FIG. 20, each of the pockets 195 of this embodiment opens onto the outer peripheral surface of the support device 190 and is equipped with a detachable cover 200 for closing the pocket 195.

Each pocket 195 extends in the lengthwise direction of the support device 190 and has a generally rectangular periphery when viewed in plan. The pockets 195 may have any transverse cross-sectional shape which enables them to house the internal coils 170. In this embodiment, each pocket 195 has a radially inner portion with a semicircular transverse cross-section and a radially outer portion with parallel sides and a roughly rectangular transverse cross section. A ledge 196 for limiting the position of the cover 200 in the radial direction of the support device 190 adjoins the semicircular portion.

Each cover 200 is preferably capable of sealing the pocket 195 in a fluid-tight manner. In the present embodiment, each cover 200 is equipped with a sealing member in the form of a polymeric sealing ring 201 mounted on a groove extending around the periphery of the cover 200. The sealing ring 201 is pressed into sealing contact with the walls of the pocket 195 when the cover 200 is inserted into the pocket 195.

The shape of the pockets 195 may vary along their lengths. In the present embodiment, as shown in FIG. 25, each pocket 195 and the interior surface of each cover 200 include two recessed portions 197 and 200, respectively, for receiving the cushioning members 175 of the internal coils 170, with the recessed portions 197 and 200 being separated by lands. The lands overlap the cushioning members 175 in the radial direction of the support device 190, so they resist the lengthwise movement of the cushioning members 175 and assist in the positioning of the internal coil 170 within the pocket 195.

The dimensions of the pocket 195 can be selected in accordance with the desired tightness of fit between the cushioning members 175 and the pocket 195. For example, the dimensions of the pocket 195 can be such that the projections 176 of the cushioning members 175 are pressed snugly against the interior surface of the pocket 195 and the cover 200 or are even somewhat compressed when the internal coil 170 is disposed inside the pocket 195 and the cover 200 is closed.

The ends of the windings 172 of each internal coil 170 communicate with the outside of the pocket 195 through a connecting hole 198 extending between a lengthwise end of the pocket 195 and a lengthwise end surface of the support device 190. Leads 181 which are electrically connected to the wire bundle or other member on the exterior of the support device 190 pass through the connecting hole 198 and are electrically connected to the ends of the windings 172 of the internal coil 170 by soldering, for example. If it is desired to seal the pockets 195 against fluid, each of the connecting holes 198 may be filled with a suitable sealing materials 199. For example, they may be filled with a potting materials or a bonding agent after the leads 181 have passed through them. The sealing materials 199 may also be used to anchor the leads in the holes 198 to prevent stresses from being transmitted by the leads to the windings 172 of the internal coils 170.

As in the preceding embodiment, the cushioning members 175 preferably support the core 171 and the sheath 173 of each coil 170 so that the sheath 173 does not come into contact with the inner surface of the pocket 195 or the cover 200 at any time during the use of the cable 20 so that the core 171 will not experience any bending stresses. The coil support device 190 is also preferably capable of protecting the coil 170 from crushing loads and impacts just as can the coil support device 160 of FIG. 25.

An underwater cable, which may be several miles in total length, is generally formed from a plurality of unitary segments which can be connected in series to form a cable of the desired length. A cable segment employing a support device according to the present invention can be assembled in the following manner. The stress members are arranged on a flat surface, and each stress member is passed through a corresponding hole in the support device. The support device is then moved along the stress members to a desired location and then bonded to the stress members. In the present embodiment, bonding can be performed by inserting a bonding agent through the radial holes extending between holes for the stress members and the outer surface of the support device. Other unillustrated components such as are typically used in an underwater cable may be positioned along the stress members in a similar manner in suitable locations. A wire bundle is then passed through the central bore of the support device, and the leads of the internal coils 170 are spliced to the appropriate wires in the wire bundle. After the internal coils 170 and other components have been electrically connected to the wire bundle, the entire assembly is pulled through the inside of an empty cable skin, which is typically 50–100 meters long. Both ends of the skin are terminated with a bulkhead fitting. A vacuum is applied to one of the fittings to suck air out of the cable segment, and a buoyancy adjusting fluid, if used, is introduced into the skin through the other fitting. In this manner, the skin can be completely filled with the buoyancy adjusting fluid. The skin of the cable segment is flexible, so it can be adjusted to a desired diameter and specific gravity by varying the pressure of the buoyancy adjusting fluid. When a suitable diameter has been reached, both fittings are then sealed. The cable segment is now ready for connection to another cable segment, either directly or though the intermediary of a streamer electronics module (SEM), to assemble the entire cable.

Figure 28:
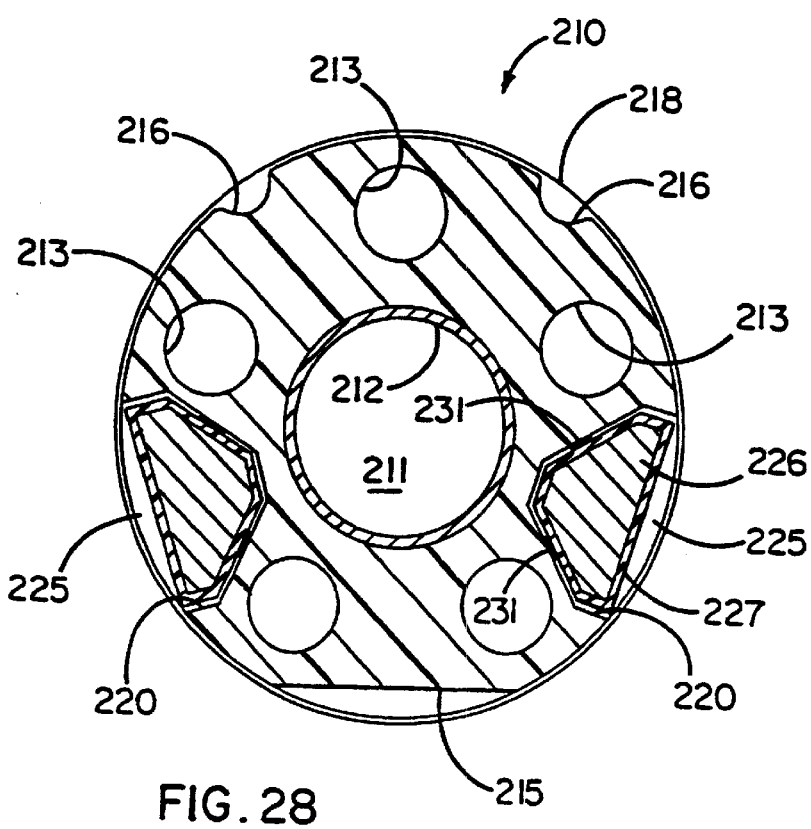
FIG. 28 is a transverse cross-sectional view of another embodiment of a coil support device according to the present invention.
Figure 29:
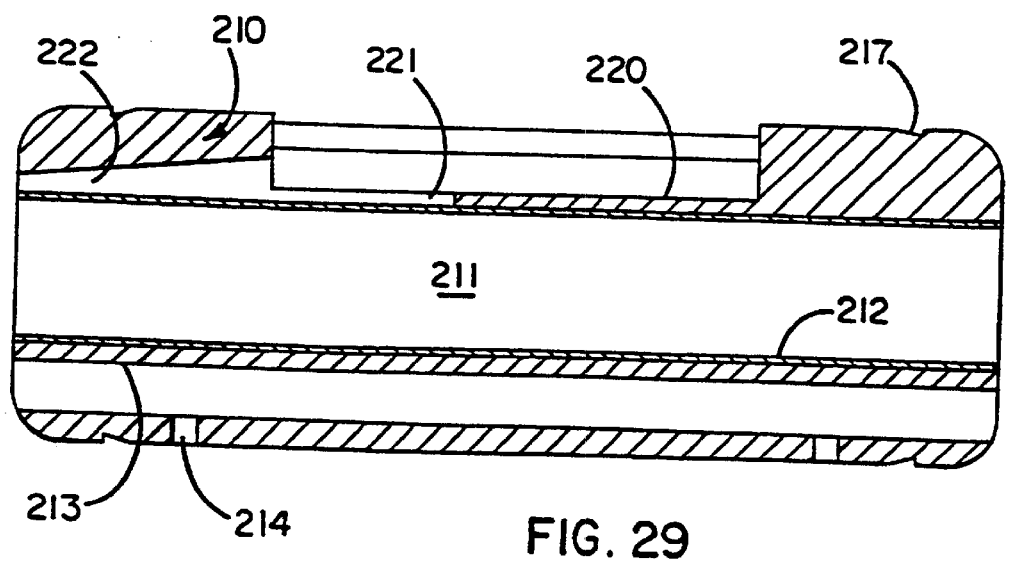
FIG. 29 is a longitudinal cross-sectional view of the coil support device of FIG. 28 with the internal coils removed.
Figure 30:
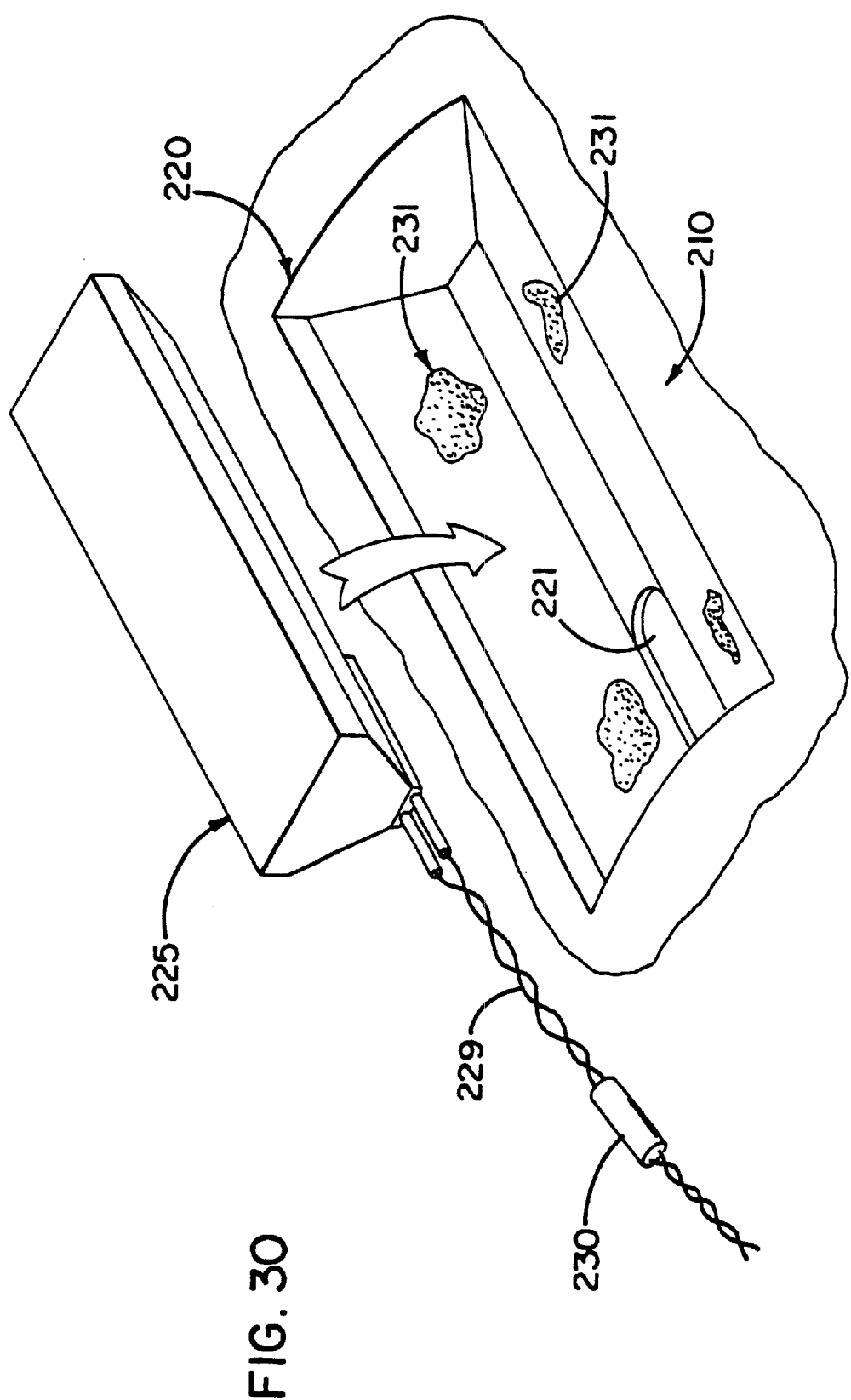
FIG. 30 is a perspective view showing the installation of an internal coil in one of the pockets of the support device of FIG. 28.

FIGS. 28 through 30 illustrate another embodiment of a coil support device for use in the present invention. The overall structure of this embodiment is similar to that of the preceding embodiments. Like those embodiments, this coil support device 210 is a generally cylindrical member having a central bore 211 through which the wire bundle can pass and a plurality of longitudinally-extending holes 213 formed around the central bore 211 through the entire length of the support device 210 for receiving the stress members. A recess 215 is formed in the outer periphery of the support device 210 for engaging with a corresponding projection of a member of an external device which surrounds the support device 210, and one or more longitudinally-extending grooves 216 are formed in the outer surface of the support device 210 for equalizing the fluid pressure at opposite ends of the support device 210 and preventing air from being trapped between the support device 210 and the skin of the cable. A reinforcing member, such as a metal reinforcing tube 212 made of titanium, may be secured to the interior surface of the central bore 211 by a bonding agent, a press fit, or other convenient method to increase the bending stiffness of the support device 210.

The support device 210 is formed with one or more pockets 220 for housing internal coils 225. In contrast to the pockets of the preceding embodiments, these pockets 220 are not sealed with respect to the exterior of the coil support device 210. Each pocket 220 has an opening in its radially outer portion through which one of the internal coils 225 can be installed in the pocket 220. By not closing the opening with a cover, as in the embodiment of FIG. 20, the internal coils 225 can be disposed extremely close to the external coils, resulting in good inductive coupling.

The internal coils 225 in this have a somewhat different structure from the internal coils 170 of the preceding embodiments. Each internal coil 225 comprises an elongated ferrite core 226 and one or more unillustrated windings wrapped around the midportion of the coil. The core 226 has a generally trapezoidal transverse cross section with the base of the trapezoid (the side having the greatest length) facing away from the longitudinal axis of the support device 210 and towards the open side of the pocket 220. One or more leads 229 are connected to the ends of the winding of the coil 225. The leads 229 may be connected to leads 229 of the other coil 225 or to the wire bundle passing through the center of the support device 210. To provide greater strength and to protect the coil 225 from the environment, the core 226 and the winding are encapsulated in a resin 227 using standard techniques to obtain a waterproof package, with only the leads 229 extending to the outside of the package.

The leads 229 of the internal coils 225 may be connected to the wire bundle or to other members outside the support device 210 in any desired manner. For example, holes for the leads may be formed directly between the pockets 220 for the coils 225 and the bore 211 at the center of the support device 210. However, as the central bore 211 is frequently rather small in diameter and the inside thereof is difficult to access by hand, in the present embodiment, electrical connections between the coils 225 and external wiring are made through an axial end surface of the support device 210. As shown in FIG. 29, each pocket 220 is connected with an axial end surface of the support device 210 through a corresponding axially extending hole 222. The coil leads 229 pass through the hole 222 and are connected to the wire bundle on the outside of the support device 210. The hole 222 decreases in area from the pocket 220 towards the axial end of the support device 210, and a stopper 230 which is larger than the outer end of the hole 222 but smaller than the inner end of the hole 222 communicating with the pocket 220 may be secured to the leads 229 and disposed inside the hole 222. When a tensile force is applied to the ends of the leads 229 on the outside of the support device 210, the interference between the stopper 230 and the small end of the hole 222 prevents the tensile force from being transmitted to the coil 225. The stopper 230 may be of any desired structure. In this embodiment, the stopper 230 comprises a polymeric bead which is molded around the leads 229. The outer ends of the leads 229 on the exterior of the support device 210 may be spliced to external wiring such as the wire bundle which passes through the center of the support device 210. Other methods, such as cementing the leads 229 to the interior of the hole 222, can be used to prevent external forces from being transmitted to the coil 225 by the leads 229, but use of a stopper 230 is particularly advantageous because it enables the coil 225 to be readily removed from the pocket 220 for replacement. A slit 221 extending down to the reinforcing tube 212 is formed in the bottom surface of the pocket 220 at the end of the pocket 220 adjoining hole 222 for receiving the leads 229 where they exit from the encapsulating resin 227 on the bottom side of the coil 225.

Each internal coil 225 is supported in its pocket 220 by a cushioning member 231 which supports the coil 225 in the pocket 220 without the coil 225 coming into firm contact with the walls of the pocket 220. Preferably each internal coil 225 is supported by the cushioning member 231 so as to be spaced from all sides of the pocket 220. Desirable characteristics of the cushioning member 231 are that it be electrically nonconductive, non-flammable, insoluble in substances which it may contact during use, such as water or the buoyancy adjusting fluid, and nonhardenable over time in the temperature range in which it is to be employed, such as from −5° to 85° C., or when exposed to ultraviolet light. It preferably provides shock proofing of the internal coil. In particular, if the pockets 220 are open to the outer surface of the support device 210, the cushioning member 231 is preferably resist to breakdown by the buoyancy adjusting fluid which typically fills the cable. When the buoyancy adjusting fluid is a kerosene-based oil, which is highly corrosive to many polymers, a particularly suitable cushioning member 231 is an electrically insulating packing grease available from Ohio Industries under the trade name of Fuel Lube. This is a zinc soap with a plasticizer and castor oil base commonly used in the aircraft industry in valve packings and for lubricating hydraulic and fuel fittings.

The cushioning member 231 may partially or completely fill the interior of the pocket 220 surrounding the coil. It has been found that when a gel such as Fuel Lube is employed as a cushioning member 231, it is sufficient to place a small amount, such as a globule, in discrete locations on the side walls of the pocket 220, each globule forming a small pillow to support the coil. The use of small quantities in discrete locations is advantageous from the standpoint of ease of application. The thickness of the cushioning member 231 is not critical, and as little as 0.04 inches of Fuel Lube has been found to give good results.

The coil support device 210 of FIG. 28 is not restricted to use with a particular type of internal coil, and coils 170 like those shown in FIG. 22 can also be used, for example.

After the internal coils 225 have been installed in the pockets 220, the circumference of the support device 210 may be enveloped by a thin-walled materials to retain the internal coils 225 in the pockets 220 and to make the support device 210 easier to handle. For example, the support device 210 may be packaged in a shrink wrap 218 or wrapped with adhesive tape. Such a wrap member is nonmagnetic and extremely thin, so it does not affect the operation of the support device 210. When shrink wrap 218 is employed, the support device 210 may be equipped with a circumferentially extending groove 217 formed in its outer surface near each end for receiving the ends of the shrink wrap 218. These grooves 217 protect the ends of the shrink wrap 218 and prevent the shrink wrap 218 from being torn from the support device 210 during insertion of the support device 210 into an underwater cable 20.

Figure 31:
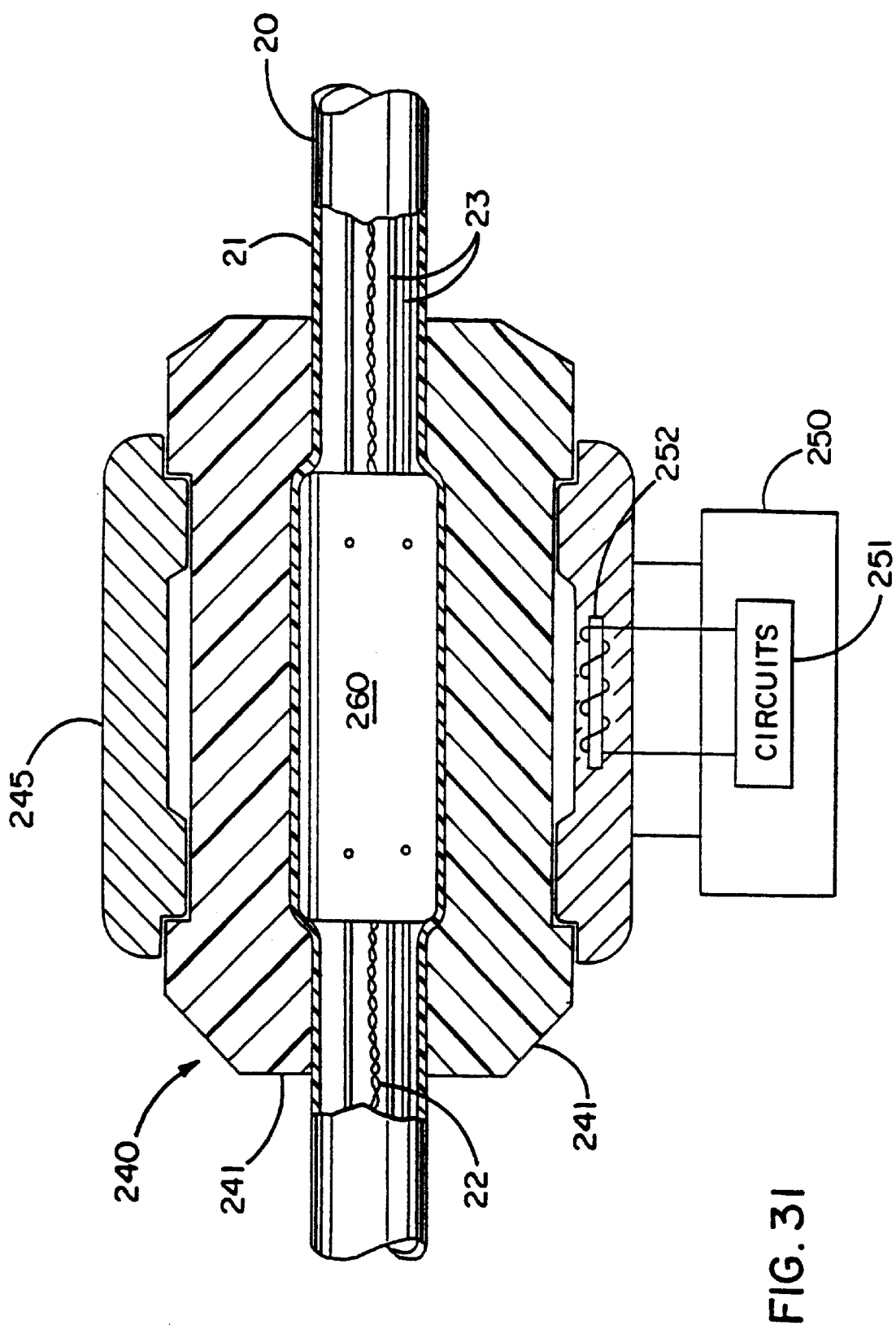
FIG. 31 is a broken-away side elevation of an embodiment of an external device according to the present invention which is free to rotate about the axis of an underwater cable on which it is mounted.
Figure 32:
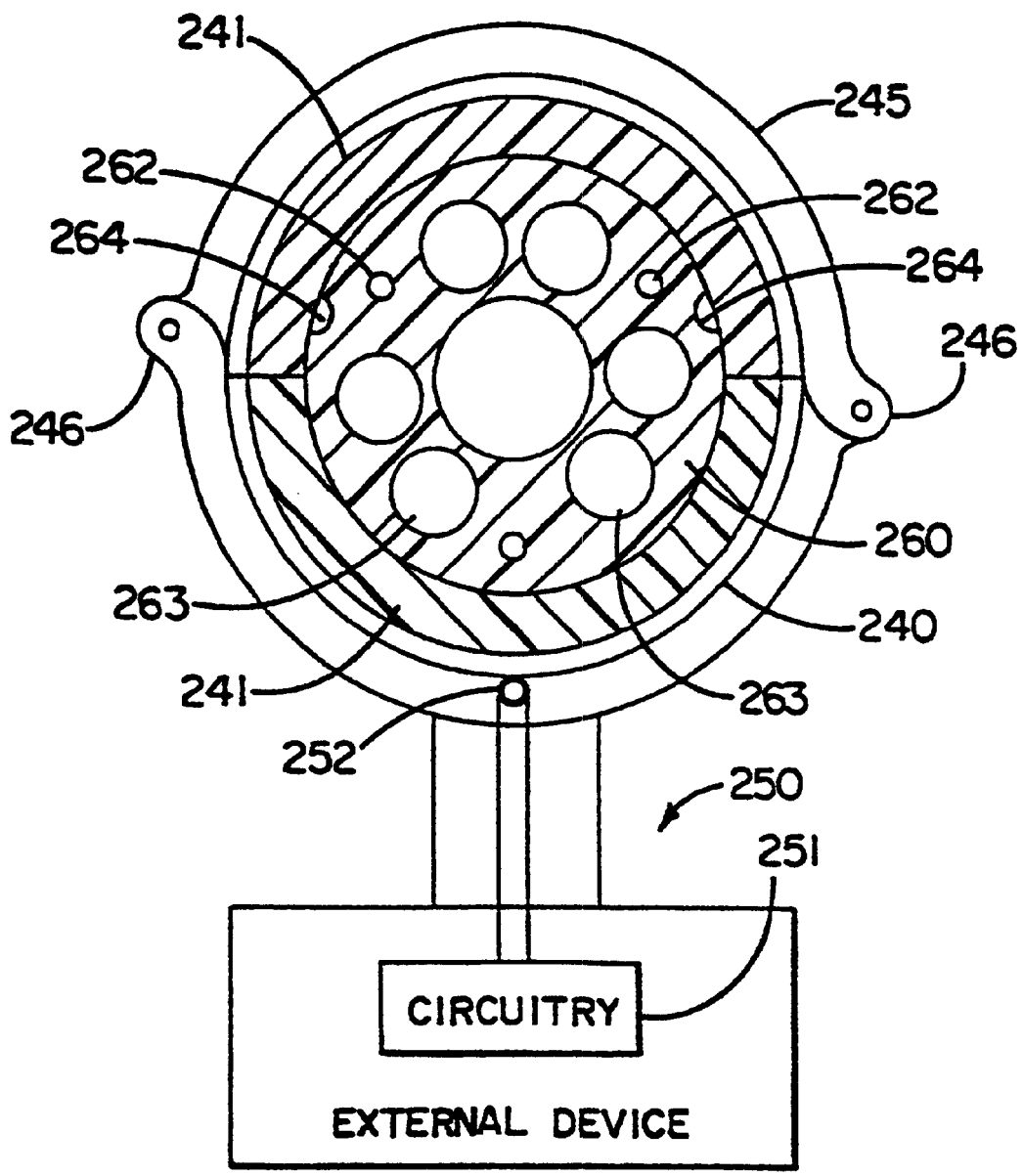
FIG. 32 is a partially cross-sectional end view of the embodiment of FIG. 31.

In the preceding embodiments, the external coils in the external device are maintained stationary with respect to the internal coils within the underwater cable, but the present invention is not restricted to such an arrangement. FIGS. 31 and 32 schematically illustrate an embodiment of an external device 250 according to the present invention which is pivotably mounted on the underwater cable 20 so that the external coil(s) 252 of the external device 250 are movable with respect to unillustrated internal coils within the cable 20.

The external device 250 may be rotatably mounted on the cable 20 in any desired manner. In the present embodiment, it is connected to the cable 20 by means of an inner collar 240 which is clamped around the cable 20 and an outer collar 245 which is rotatably mounted on the inner collar 240. The inner collar 240 may have any structure which enables it to remain in a constant position in the longitudinal direction of the cable 20. In the present embodiment, the inner collar 240 has a structure similar to the clamping portion of the embodiment of FIG. 3. It includes a plurality of arcuate sections 241 (such as two semicylindrical sections) which are joined to each other so as to extend around the entire circumference of the cable 20. The sections 241 may be secured to each other in any desired manner, such as by screws or by hinges, such as those described in U.S. Pat. No. 5,529,011 having removable hinge pins. The inner surface of the inner collar 240 may directly contact the outer surface of the cable 20, or it may be equipped with detachable inserts like those used in the preceding embodiments, which grip the coil support device 260 and thereby prevent the relative movement between the inner collar 240 and the coil support device 260 in the longitudinal direction of the cable 20. In the present embodiment, inserts have been omitted, and the inner periphery of the sections 241 of the inner collar 240 is shaped to surround the coil support device 260 and grip it so as to prevent the relative movement of the inner collar 240 and the coil support device 260 in the longitudinal direction of the cable 20. The inner periphery of the inner collar 240 may also be shaped to prevent other types of relative movement, such as to maintain the longitudinal axis of the coil support device 260 stationary with respect to the longitudinal axis of the inner collar 240. The inner collar 240 is intended to remain on the cable 20 when the cable 20 is stored on a drum, so it preferably is made of an impact resistant material. Furthermore, since it is disposed between the internal coils within the cable 20 and the external coils 252, it is preferably made of a materials which will not interfere with the inductive coupling of the coils. Plastics are particularly suitable for the inner collar 240.

The outer collar 245 can have any shape which enables it to rotate with respect to the inner collar 240 while supporting the external device 250. If the external device 250 is intended to be removed from the cable 20 before the cable 20 is wound around a drum, the outer collar 245 is preferably of a type which can be readily detached from the inner collar 240, so that the external device 250 can be detached from the cable 20 by removing the external device 250 and the outer collar 245 as a unit. For example, the outer collar 245 may include a plurality of arcuate sections pivotably connected with each other by hinges 246. An example of a particularly suitable structure for the outer collar 245 is a hinged structure as disclosed in U.S. Pat. No. 5,529,011, in which a collar has one or more hinges having hinge pins which can be retracted without the use of tools to enable the collar to be opened.

The external device 250 is not restricted to any particular type, so it is shown schematically in the drawings. The external device 250 is preferably rigidly secured to the outer collar 245, and may be integrally formed with one section of the outer collar 245, to enable the outer collar 245 and the external device 250 to be installed on or removed from the cable 20 as a single unit. The external coil(s) 252 for powering the external device 250 can be disposed in any location in which they can be inductively coupled to the internal coils in the coil support device 260. Preferably, the external coil(s) 252 are disposed as closed as possible to the internal coils. For example, as shown in FIGS. 31 and 32, external coils(s) 252 may be disposed inside the outer collar 245. As in the preceding embodiments, the electrical power for operating the external device 250 may be supplied entirely by the external coil(s) 252, so it is not necessary to provide the external device 250 with a battery for normal operation.

The internal coils are supported by a coil support device 260, which may be similar in structure to the above-described embodiments of coil support devices according to the present invention. The overall structure of the illustrated support device 260 is similar to the support device of FIG. 21. Since the external coil(s) 252 can move with respect to the internal coil(s), it is not necessary to prevent the rotation of the coil support device 260 with respect to the longitudinal axis of the cable 20. Therefore, a recess in the outer periphery of the support device 260 for engagement with a projection of an external device has been omitted, although such a recess may be provided without affecting the operation of the support device 260. The illustrated support device 260 has three longitudinal holes 262 for receiving stress members, but the number can be varied in accordance with the type of cable 20 with which it is to be used.

Since the external coil(s) 252 in the external device 250 are free to move with respect to the internal coil(s) in the coil support device 260, the number of internal and external coils is preferably selected so that regardless of the angle of rotation of the external device 250 with respect to the coil support device 260, there will always be good inductive coupling between one of the internal coils and one of the external coils 252. In the present embodiment, the external device 250 houses a single external coil 252, and the coil support device 260 has 6 pockets 263 for 6 internal coils formed around a central bore 261. The pockets 263 are located so that the angular separation, measured from the longitudinal axis of the support device 260, is constant around the circumference of the support device 260 between any two immediately adjoining pockets 263 or between a pocket 263 and an immediately adjoining longitudinal hole 262 for a stress member. Like the preceding embodiments, the coil support device 260 may include one or more longitudinal grooves 264 in its outer surface for equalizing the pressure on opposite ends of the coil support device 260

The structure of the internal and external coils is not critical and may be the same as in any of the preceding embodiments.

In the preceding embodiments, one or more internal coils are housed inside the coil support device 260, but a coil support device according to the present invention can also be used without a coil in order to position an external device with respect to a cable in which the coil support device is installed.

Figure 33:
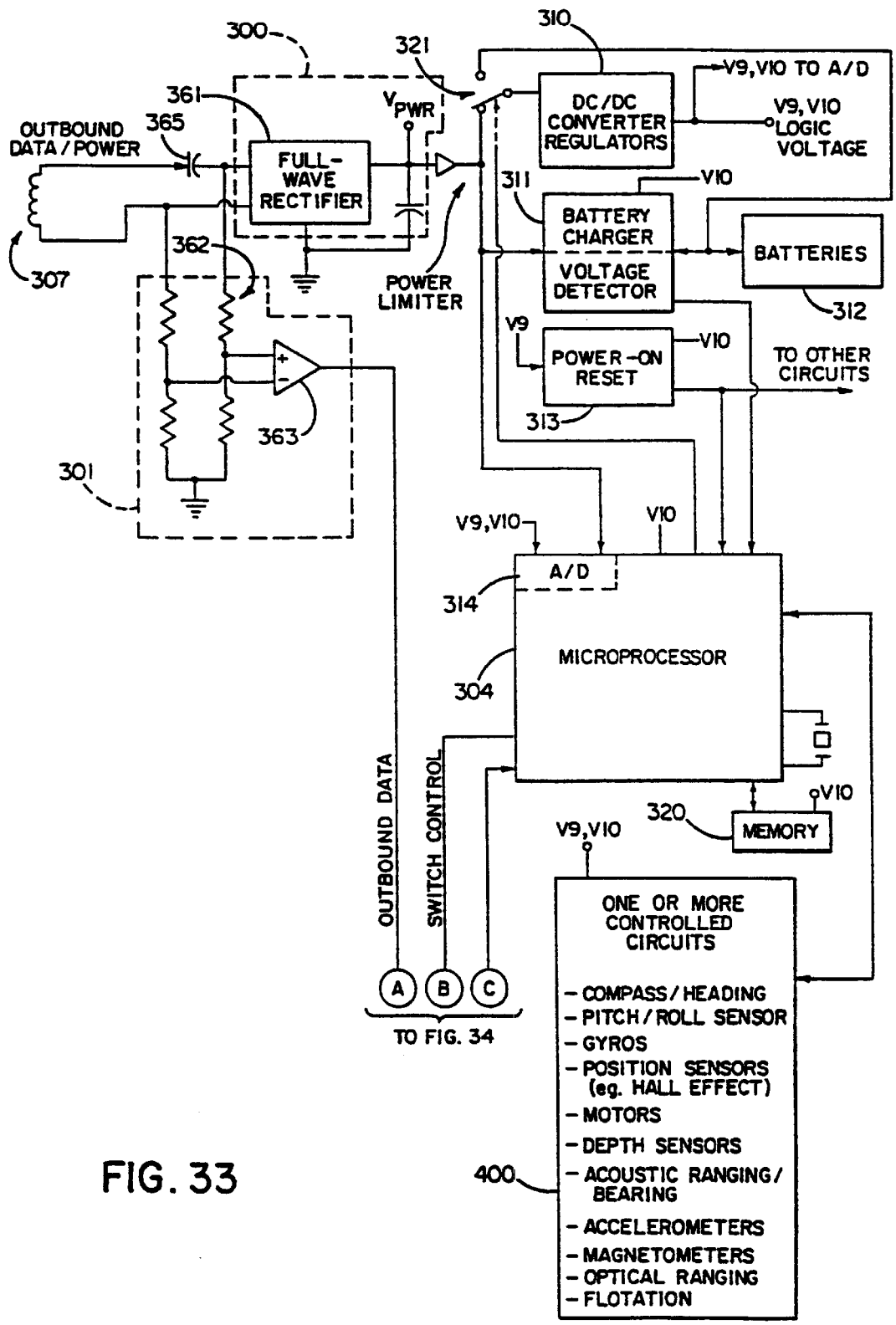
FIGS. 33 and 34 are block diagrams of an example of a control system for an external device according to the present invention.
Figure 34:
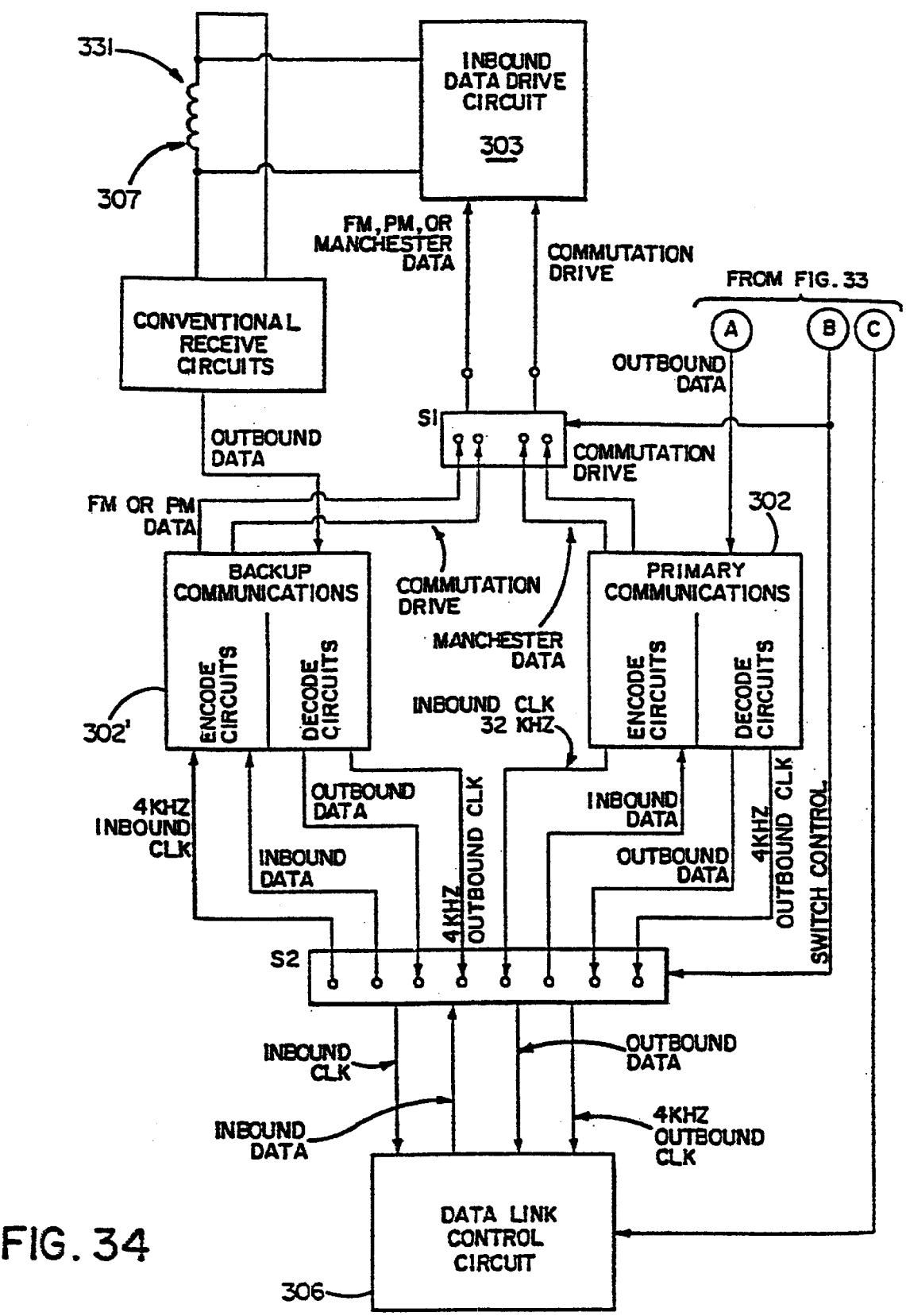

FIGS. 33 and 34 are block diagrams of an example of a control system which can be installed in an external device according to the present invention for controlling the operation of the external device. The control system includes a microprocessor 304 (such as a Motorola 68HC11 microcontroller) for overall control. It also includes a power supply 300 which receives electrical power from the external coil(s) 307 of the external device and possibly from a battery, if present in the external device. The external coils 307 generate AC power, whereas electrical components of the external device may require DC power. Therefore, the power supply 300 is preferably capable of converting AC power from the external coils 307 into regulated DC power. Any configuration capable of performing this function may be employed. In the illustrated embodiment, the power supply 300 includes a full-wave bridge rectifier 361 connected to the external coils 307 for rectifying the AC signal from the external coils 307 and a capacitor 365 for smoothing the rectified signal into a DC power signal (Vpwr). A power limiter may be connected to the power supply 300 to limit the power that can be drawn from the underwater cable via the external coils 307. The DC power signal may thereafter be regulated by, for example, a DC voltage regulator 310, such as a DC to DC converter, to provide operational power to the circuits contained in the external device.

When the external device includes one or more batteries 312, a battery charger 311 is preferably provided for recharging the battery 312. The battery 312 may be used to supply operational power in the event that power is not available via the external coils 307 from the underwater cable. The batteries 312 may be switched into an operating mode by, for example, a diode or an electronic switch 321. If an electronic switch 321 is utilized, the battery charger circuit 311 preferably includes a low voltage detector which outputs a low voltage signal to the microprocessor 304. The microprocessor 304 may then actuate the electronic switch 321 responsive to the low voltage detection signal. Alternatively, the microprocessor 304 may detect a low voltage directly via an A/D converter 314. As another alternative, the electronic switch 321 may be controlled directly by the voltage detector of the battery charger 311 in response to, for example, a low voltage condition.

The A/D converter 314 may receive a voltage from the input to the voltage regulator 310 and a separate voltage from the output of the voltage regulator 310. In this manner, the microprocessor 304 can monitor the voltage received from the underwater cable as well as the voltage supplied from the battery 312 (when present and active). The voltage regulator 310 preferably includes a shut-down mode which may be utilized to isolate the input from the output when power is inadequate at the input to the voltage regulator 310. The microprocessor 304 may control one or more circuits 400 within the external device based on the voltage values detected by the A/D converter 314.

The A/D converter 314 may be integral with the microprocessor 304 as, for example, with the Motorola 68HC11, or it may be a separate unit coupled to the microprocessor 304. As discussed in more detail below, the A/D converter 314 may be utilized by the microprocessor 304 to initiate various actions by one or more circuits 400 disposed within the external device.

A power-on reset circuit 313 may be utilized to reset the electrical device should operational power be lost from the underwater cable and should the battery be not present or present and inoperative.

The control system may also include outbound data receive circuits 301 and inbound data driver circuits 303 coupled to encode/decode circuits 302. The outbound data receive circuits 301 may include a voltage divider 362 and a comparator 363 which may operate to reform outbound data signals prior to decoding by the encode/decode circuits 302.

The inbound data driver circuits 303 may include any suitable driver circuit capable of driving an inbound data signal across any number of suitable coupling arrangements between the external device and the underwater cable. In the illustrated embodiment, the driver circuit 303 is configured to drive the one or more external coils 307 which are inductively coupled to the one or more internal coils in the underwater cable. Details of one example of the inbound data driver circuits 303, encode/decode circuits 302, and HDLC circuit 306 are disclosed in U.S. Provisional Application No. 60/004,203, filed Sep. 22, 1995, entitled Electrical Power Distribution and Communication System For an Underwater Cable, which is herein incorporated by reference.

The external device preferably includes backup communications circuits to communicate with the towing vessel when power in the cable is OFF. Backup communications circuits in the external device preferably include conventional receive circuits. An example of a conventional receive circuit which may be used within the external device is disclosed in U.S. Pat. No. 4,912,684. Backup communications circuits in the external device also preferably include encode/decode circuits 302' and switches S2, S3, which may be controlled by the microprocessor 304 to switch into and out of the backup communications circuits.

During inbound transmission of data from the external coils 307 to an internal coil within the cable, there may be a high leakage induce between the coils of about 70% or more, for example about 94% or more (i.e., a coupling coefficient of about 0.3 or less, for example about 0.06 or less). In this environment, the inbound driver 303 driving the exterior coils 307 may drive an inductive load where about 94% or more of the load is the leakage inductance. The inbound driver circuit 303 preferably drives the external coils 307 with a signal which enables the desired data signal (e.g., a Manchester signal) to be reproduced in the internal coil inside the cable.

The microprocessor 304 may be connected to one or more circuits such as a memory 320 and/or one or more circuits 400 being controlled within the external device. There may be one or more microprocessors 304 or other logic such as a Motorola 68HC11 and/or Motorola 56002.

The circuits 405 in the external device being controlled by the microprocessor 304 may include any of the electrical devices described above with respect to the previous embodiments, such as a heading sensor, a ranging device, an attitude sensor for sensing the attitude of the external device, a position sensor for sensing the position of the wings of a depth control device, a depth sensor, actuators for the depth control device, etc.

Figure 35:
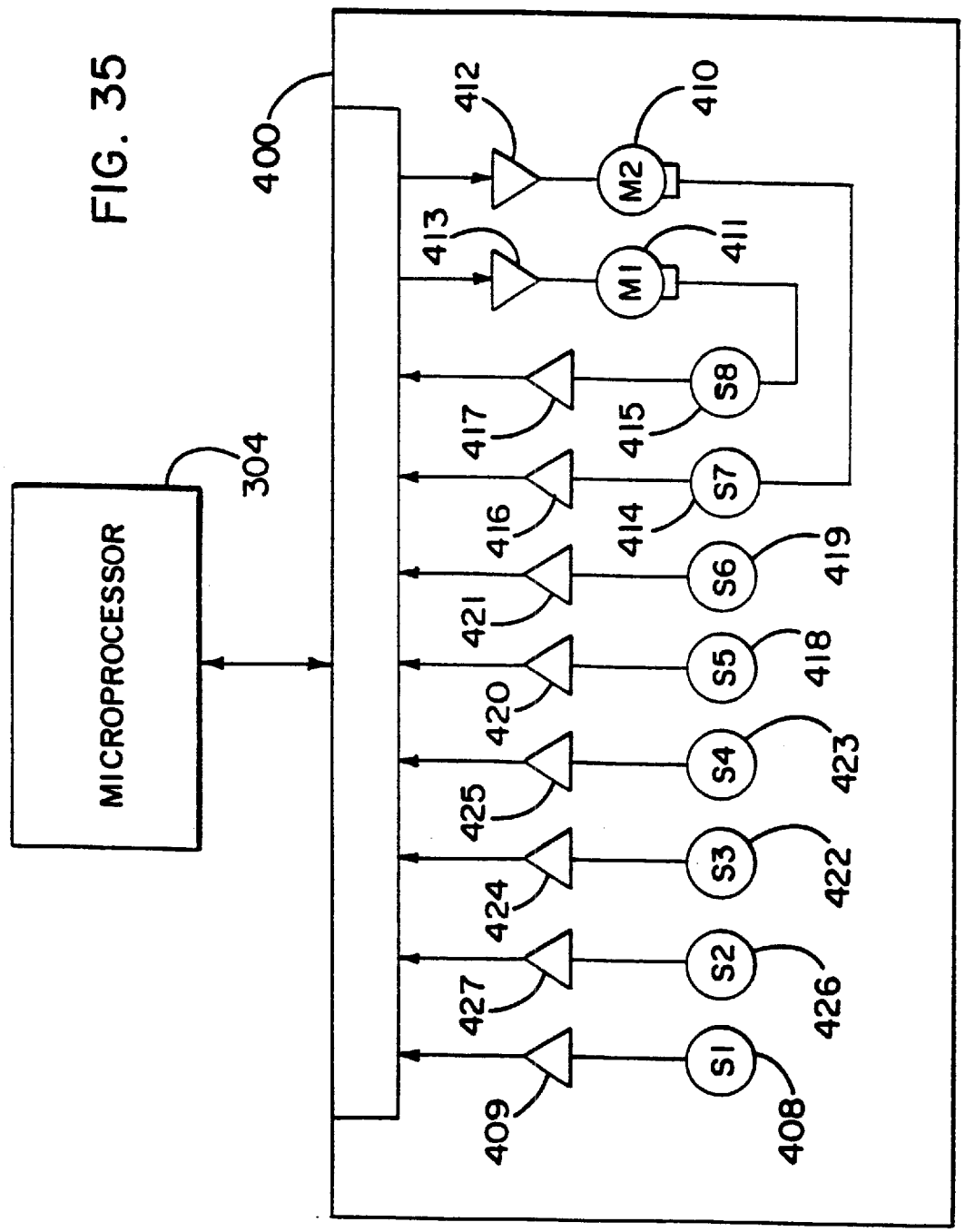
FIG. 35 is a block diagram illustrating a control arrangement for a depth control device.

FIG. 35 is a block diagram showing an example of a control arrangement for the circuits 400 being controlled in a depth control device, such as that illustrated in FIG. 7. A pressure transducer 408, such as one of those manufactured by Foxboro/ICT, Inc., provides a signal proportional to the underwater depth of the depth control device through a signal conditioning circuit 409 to the microprocessor 304. In a depth-keeping mode of operation, the microprocessor 304 executes a PID (proportional-integral-differential) or other control algorithm and determines whether the wing positions need to be changed. If so, the microprocessor 304 sends appropriate signals to the motors 410, 411 of the roll and/or pitch a or through buffers 412, 413 (possibly including D/A converters) which convert the low-level logic signals from the microprocessor into higher level motor signals sufficient to drive the motors. The motors drive the pitch shuttle and roll pinion appropriately to adjust the wings to maintain the desired depth. Encoders 414, 415 coupled to the motor shafts provide feedback to the microprocessor 304 through signal conditioners 416, 417. The microprocessor 304 uses the encoded position feedback to accurately position the wings. The encoders could be conventional devices, such as optical shaft encoders or potentiometers. For precise determination of wing position, reference sensors, such as Hall-effect devices 418, 419, may be positioned to detect the proximity of a magnetic field, such as provided by magnetic pellets embedded in known positions in the wing assembly. One such Hall effect device is the Allegro Model UGN3503. Signal conditioning units 420, 421 convert the reference sensor signals into signals compatible with the processor inputs. Two accelerometers 422, 423, such as Silicon Designs Model 1010 capacitive accelerometers, may be used to determine the direction of the gravitational vector for use in controlling the wings. The two accelerometers are mourned in quadrature about the pitch and yaw axes of the depth control device. Signal condition circuits 424, 425 convert the accelerometer outputs into processor-compatible inputs. Optionally, the depth control device may also include a conventional temperature sensor 426, used for reporting the temperature to the towing vessel or to the data reported by the other sensors. Signal conditioning circuitry 427 converts the raw temperature sensor signal into a signal to be input into the microprocessor. All of the signal conditioning circuits 409, 416, 417, 420, 421, 424, 425, 427 may be conventional combinations of operational amplifiers, A/D converters, or logic gates, as required by the associated sensor device and commonly described in published application notes for each sensor. It should also be recognized that, depending on the nature of the sensor and its associated conditioning circuit, the input into the microprocessor could be over a digital port line or into an internal analog A/D converter input.

FIGS. 36–41 illustrate another embodiment of a coil support device 270 according to the present invention. The overall structure of this embodiment is similar to that of the coil support device 160 shown in FIG. 20, and it can be used in conjunction with the same types of external devices as the preceding embodiments of coil support devices. It has a tubular body with a generally cylindrical outer periphery and a generally cylindrical inner periphery surrounding an axially extending central bore 271. A plurality of longitudinally extending pockets 272 are formed in the body around the central bore 271, each pocket 272 having a blind end and an open end which opens onto an end surface of the coil support device 270. Each pocket 272 can house an internal coil 170 in the same manner as described with respect to FIG. 20.

The coil support device 270 includes a plurality of axially extending holes 273, each of which receives a stress member 23 of an underwater cable. The illustrated embodiment is designed to engage with two stress members 23 disposed 180° apart around the circumference of the coil support device 270, but a larger or smaller number of stress members 23 may be employed, depending upon the design of the underwater cable. In contrast to the holes 162 for stress members 23 in the embodiment of FIG. 20, which extend to the end surfaces of the coil support device 270, the holes 273 in this embodiment stop short of the lengthwise end surfaces, and the regions between the ends of the holes 273 and the lengthwise end surface are partially cut away to produce cutaway portions 276 which permit the stress members 23 freedom of movement in the direction shown by the arrow in FIG. 36, which indicates bending in a plane parallel to the plane of the figure. The presence of the cutaway portions 276 reduces stress concentrations in the coil support device 270 when it is passing over a drum, a roller, or other object. Furthermore, the cutaway portions 276 enable the stress member 23 to assume a more gradual angle with respect to the axis of the coil sport device 270 when the coil support device 270 is passing over a curved surface compared to if the holes 273 ended to the lengthwise ends of the coil support device 270. As a result, sharp bends in the stress members 23 can be prevented, which is beneficial from the standpoint of the strength of the stress members 23, and a more gradual angle of the stress members 23 also reduces the bending moment applied to the coil support device 270 by a given tension in the stress members 23 when the coil support device is passing over a curved surface.

Figure 38:
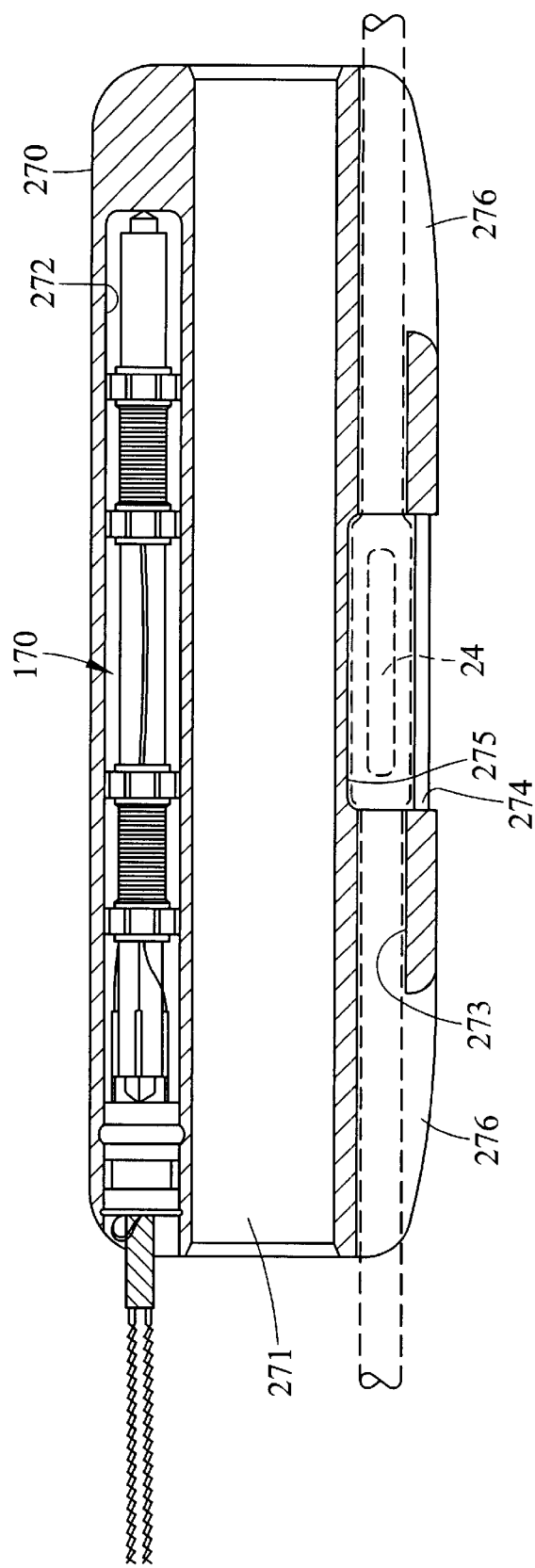
FIG. 38 is a longitudinal cross-sectional view of the coil support device of FIG. 37 taken along two intersecting planes passing through the central line of the coil support device.

The stress members 23 may be bonded to the inside of the holes 273 in the coil support device 270 as in the preceding embodiments. However, depending upon the materials of which the stress members 23 are made, bonding may produce embrittlement or other changes in the physical properties of the stress members 23 which may degrade their strength. Therefore, in the present embodiment, instead of bonding, an interference fit is used to prevent or limit the lengthwise movement of the stress members 23 relative to the coil support device 270 to which they are attached. As best shown in FIG. 38, which is a longitudinal cross-sectional view of the coil support device 270, each hole 273 for receiving one of the stress member 23 includes a region where it communicates with the outer periphery of the coil support device 270 through a slot 274 to define a pocket 275. The pocket 275 has a larger inner diameter than the regions of the hole 273 adjoining it in the lengthwise direction. A retaining member 24 is inserted into the portion of the stress member 23 within the pocket 275 so as to be held by the stress member 23. The retaining member 24 increases the outer diameter of the portion of the stress member 23 within the pocket 275 so that the stress member 23 has a larger diameter than the diameter of the hole 273 in the regions adjoining the pocket 275, thereby forming an interference fit between the stress member 23 and the ends of the pocket 275 and preventing the enlarged portion of the stress member 23 from being pulled out of the pocket 275 into the smaller regions of the hole 273 and limiting or preventing the relative axial movement of the stress members 23 and the coil support device 270.

The retaining members 24 can be any objects capable of being inserted into the stress members 23 to increase their outer diameter. In the illustrated embodiment, each retaining member 24 comprises a pin with a cylindrical outer periphery. The pin may be made of metal, plastic, or any other materials of suitable strength. Examples of other possible objects which can be used as retaining members 24 include football-shaped members and spherical members such as metal balls for use in bearings. A single retaining member 24 can be used for each stress member 23, or a plurality can be employed in series within each pocket 275.

When the stress member 23 is a braided or laid member comprising a plurality of strands which are braided to twisted together, a retaining member 24 can be readily inserted into the stress member 23 between the stands so that the strands surround and hold the retaining member 24 in place. Braided and laid stress members are extremely common in underwater cables and are particularly suitable for use with a coil support device according to the present invention. When the stress member 23 is a non-braided or non-laid member, the retaining member 24 can be inserted into the stress member 23 by forming a lengthwise slit in the stress member 23, if this can be done without unduly comprising the strength of the stress member 23.

Figure 39:
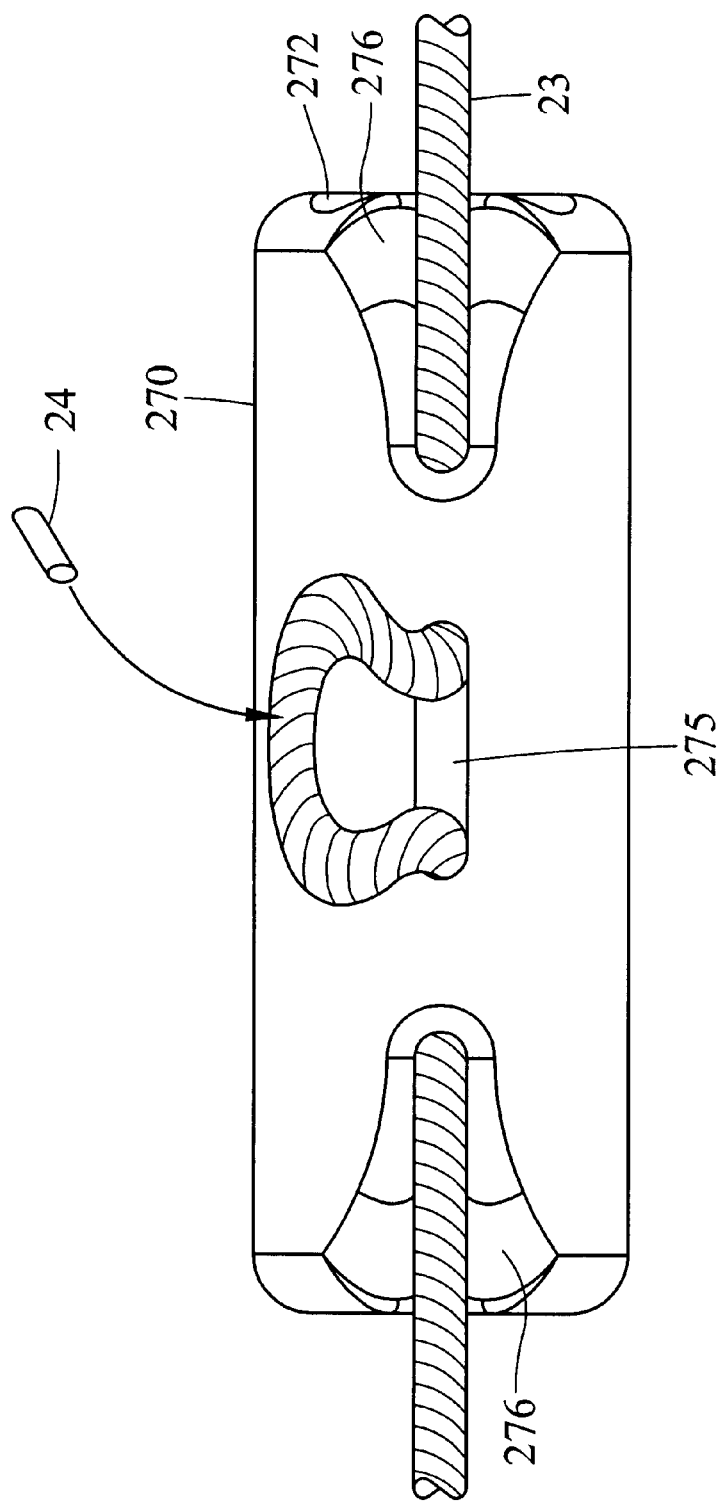
FIG. 39 is a side view of the embodiment of FIG. 36 illustrating a method of connecting a stress member to the coil support device.

FIG. 39 schematically illustrates a method of inserting a retaining member 24 into a stress member 23. The stress member 23 is first treaded through one of the lengthwise holes 273 in the coil support device 270. A portion of the stress member 23 is then pulled out of the pocket 275 in the hole 273, and a retaining member 24 is inserted into the interior of the stress member 23 between the strands thereof. The portion of the stress member 23 containing the retaining member 24 is then urged back into the pocket 275, and the stress member 23 is pulled axially until it extends in a straight line through the coil support device 270. A stress member 23 in an installed state is shown in phantom in FIG. 38. The outer diameter of the stress member 23 within the pocket 275 has increased due to the presence of the retaining member 24 to create an interference fit between the stress member 23 and the ends of the pocket 275, thereby restraining the stress member 23 against axial movement with respect to the coil support device 270.

Figure 36:
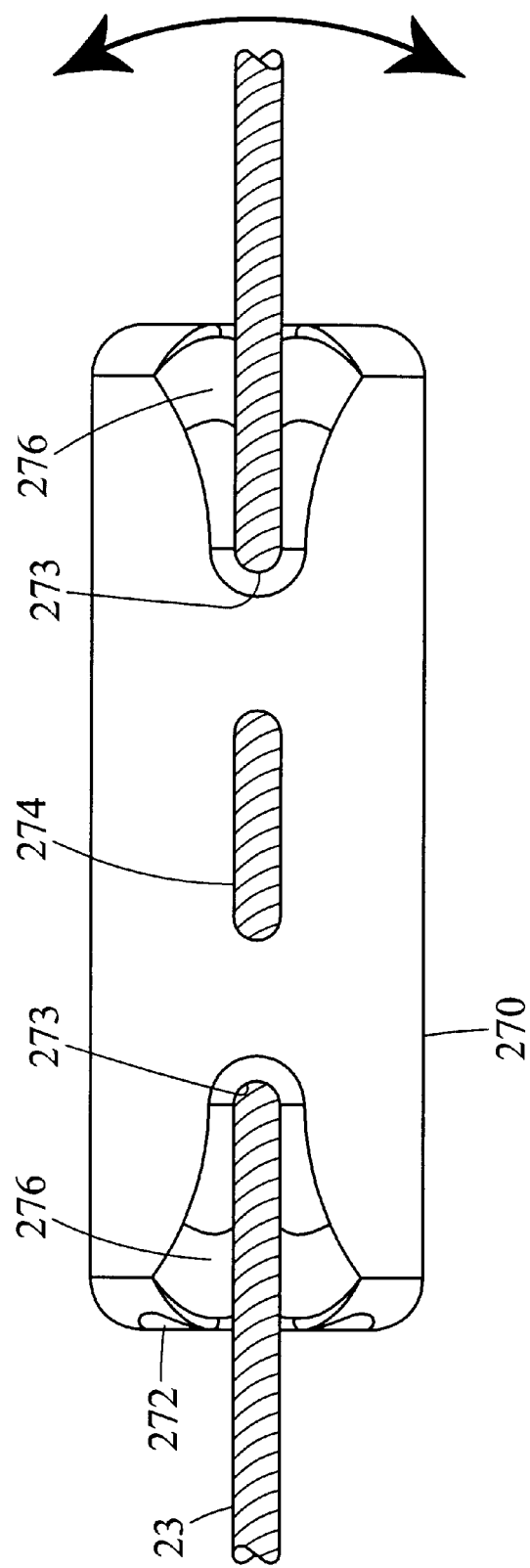
FIG. 36 is a side view of another of a coil support device according to the present invention.
Figure 37:
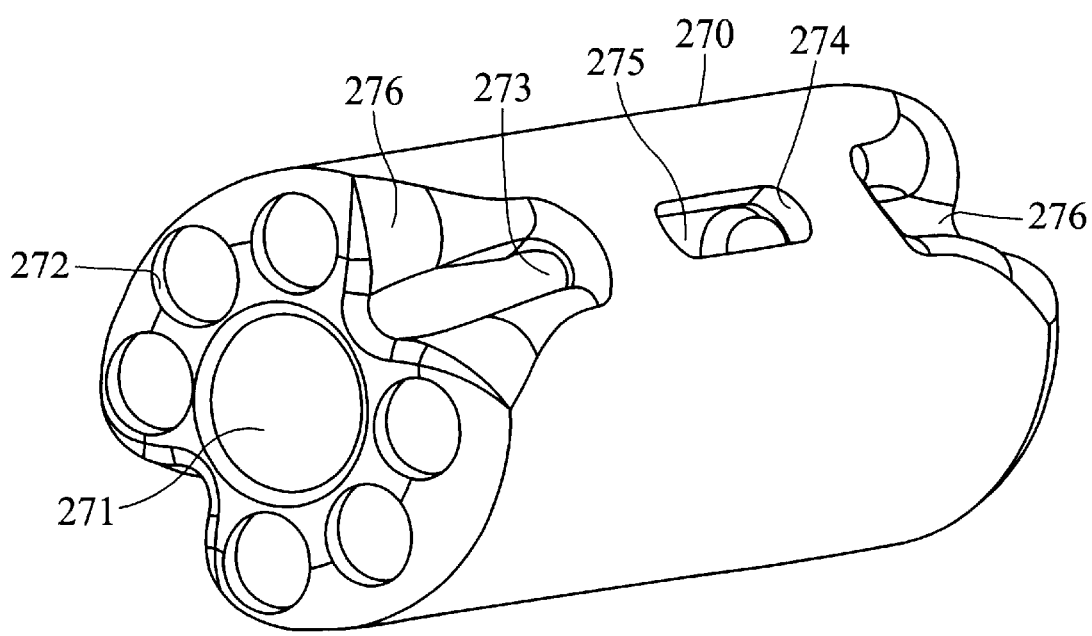
FIG. 37 is an isometric view of the coil support device of FIG. 36 with the stress members removed.
Figure 40:
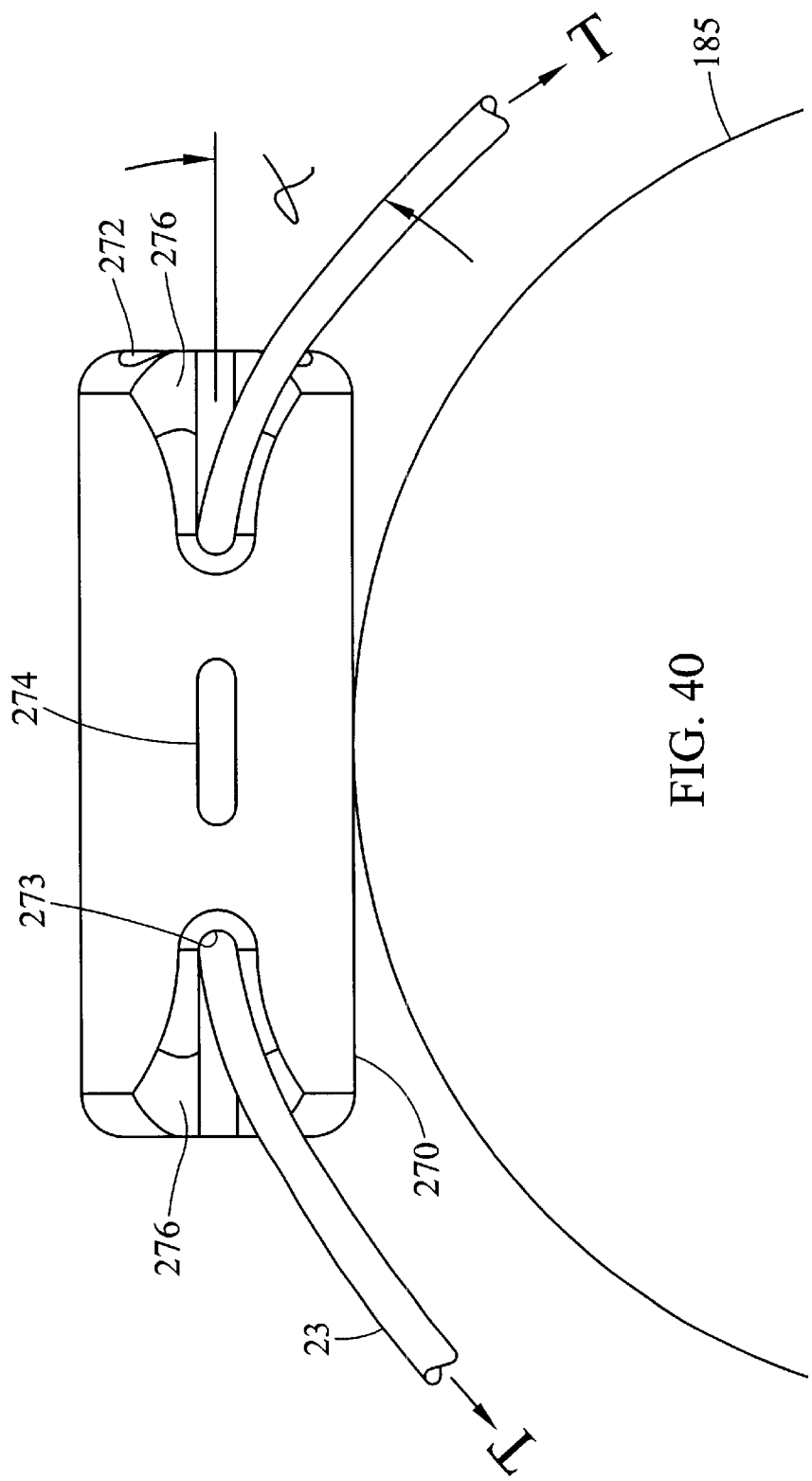
FIG. 40 is a schematic side view of the coil support device of FIG. 36 passing over a roller.
Figure 41:
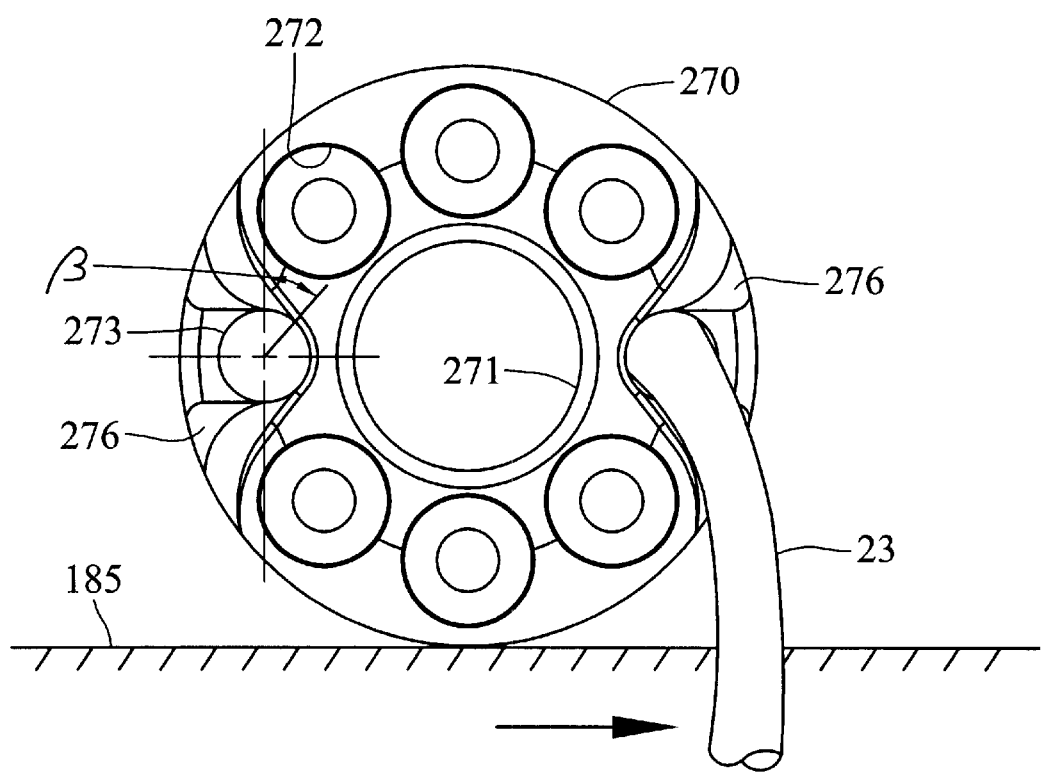
FIG. 41 is a schematic end view of the coil support device shown in FIG. 40.

FIGS. 40 and 41 are respectively a schematic side view and a schematic end view of the coil support device 270 of FIG. 36 when passing over a roller 185, a drum, or other curved surface with the stress members 23 under a tension T. For simplicity, only one stress member 23 is shown, although the coil support device 270 will typically be connected to two stress members. As shown in FIG. 40, the cutaway portions 276 are shaped so that when the stress members 23 outboard from the coil support device 270 are at a nonzero angle a with respect to the longitudinal axis of the coil support device 270, the portions of the stress members 23 situated in the cutaway portions 276 will be sloped with respect to the longitudinal axis of the coil support device 270. As a result, a force applied to the coil support device 270 by the stress members 23 in a direction transverse to the longitudinal axis of the coil support device (such as a vertical force in FIG. 40) will be distributed over a greater region of the coil support device 270 than if the holes 273 extended in a straight line to the lengthwise ends of the coil support device 270. Thus, for a given tension in the stress 23, the bending moment applied to the coil support device 270 by the stress members 23 will be lower in a coil support device 270 having cutaway portions 276. Furthermore, because of the cutaway portions 276, the angle α between the axis of the coil support 270 and the axis of the stress members 270 at the lengthwise ends of the coil support device 270 is less for the illustrated coil support device than for one having holes 273 extending along a straight line to the lengthwise ends of the coil support device. A decrease in this angle α contributes to lower bending stresses in the coil support device 270.

As shown in FIG. 41, in this embodiment, each cutaway portion 276 is essentially a slot which becomes wider as measured in the circumferential direction of the coil support device 270 towards the lengthwise ends of the coil support device 270. At any point along the length of a cutaway portion 276, the bottom of the cutaway portion 276 (the radially inner region) is an arc of a circle aligned with a portion of the periphery of one of the holes 273 for the stress members 23, with the central angle for which the arc is aligned with the periphery of the hole 273 decreasing towards the lengthwise ends of the coil support device 270. For example, in the region of each cutaway portion 276 adjoining an end of one of the holes 273, the bottom of the cutaway portion 276 is aligned with the periphery of the hole 273 for 180°, whereas at the lengthwise ends of the coil support device 270, the bottom of the cutaway portion 276 is aligned with the periphery of the hole 273 for approximately 90° (this being the angle of the arc measured between the points where the bottom is tangent to the periphery of the hole 273). In FIG. 41, the angle β between a vertical centerline of one of the holes 273 and the point of tangency of the bottom of the cutaway portion 276 with the periphery of the hole 273 is approximately 45°. With such a shape, when the coil support device 270 is passing over a roller 185 and the stress members 23 are at an angle with respect to the axis of the coil support device 270, the distance of the stress members 23 from the axis of the coil support device 270 (or from the vertical centerline of the coil support device 270 in FIG. 41) will increase towards the lengthwise ends of the coil support device 270, i.e., the illustrated stress member 23 will be forced away from the centerline in the direction of the arrow in FIG. 41. Depending upon the angle α of the stress members 23 with respect to the longitudinal axis of the coil support device 270, the stress members 23 may even separate from the surface of the coil support device 270 at a location between the ends of the holes 273 and the lengthwise ends of the coil support device 270, causing a reduction in the bending moment applied to the coil support device 270 relative to the bending moment which would be applied if the stress members 23 extended to the lengthwise ends of the coil support device 270.

FIGS. 40 and 41 show just one example of a possible shape of the cutaway portions 276, and many other shapes arc possible. For example, instead of having a varying width over its length, a cutaway portion 276 may have a constant width, which is preferably as great as strength considerations permit to allow a stress member 23 disposed in the cutaway portion 276 a large range of movement. However, giving the cutaway portions 276 a varying width such as shown in the drawings may be advantageous from the standpoint of reducing stress concentrations and lowering the stresses in the vicinity of the lengthwise ends of the holes 273 for the stress members 23.

Figure 42:
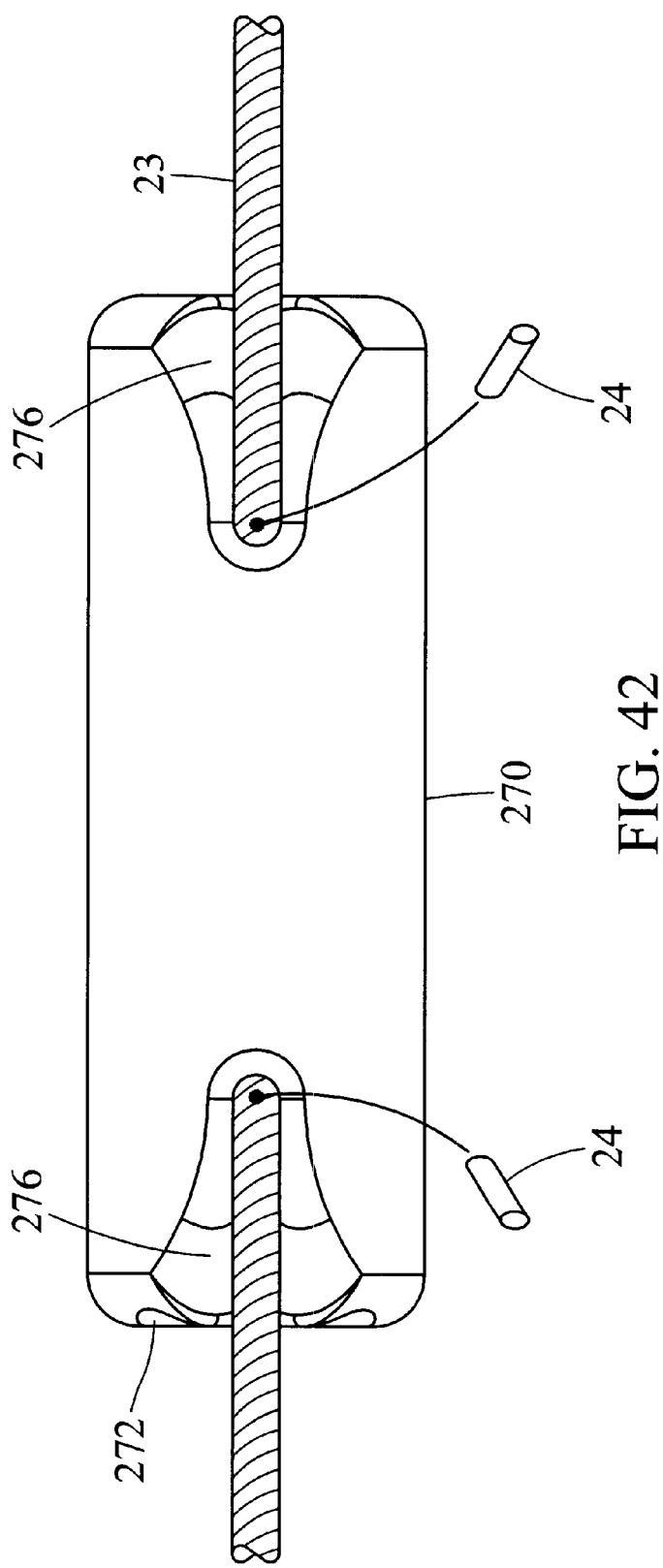
FIG. 42 is a side view of a modification of the embodiment of FIG. 36 in which retaining members are disposed on the exterior of the coil support device.

As shown in FIG. 42, which is a side view of a variation of the coil support device 270 of FIG. 36, an alternative or additional location for retaining members 24 is on the exterior of the coil support device 270 in the region of the stress members 23 immediately adjoining the outer ends of the holes 273. If two retaining members 24 are inserted into a stress member 23, one on each side of the hole 273, each retaining member 24 can form an interference fit between the stress member 23 and the external surface of the coil support device 270 adjoining the outer end of the hole 273, thereby preventing relative axial movement of the stress member 23 and the coil support device 270. If it is desired to employ retaining members 24 only on the exterior of the coil support device 270, the pocket 275 between the lengthwise ends of the hole 273 may be omitted.

The use of retaining members 24 to prevent relative axial movement of stress members 23 and the coil support device 270 is advantageous not only because it does not alter the physical properties of the stress member 23, but also because the coil support device 270 can be permitted to move with respect to the stress member 23 simply by removing the retaining members 24 from the stress members 23. This enables the coil support device 270 to be moved to a new location along the stress member 23 or to be completely removed from the stress members 23 for reuse with other equipment. In contrast, bonding forms a permanent connection between a stress member 23 and a coil support device 270, so the position of the coil support device 270 with respect to the stress members 23 cannot be adjusted, and if an underwater cable containing the coil support device 270 is damaged, it is difficult to salvage either the coil support device 270 or the stress members 23. Furthermore, installing a retaining member 24 is generally faster, easier, and safer than use of a bonding agent and permits correction of mistakes in installation.

Figure 43:
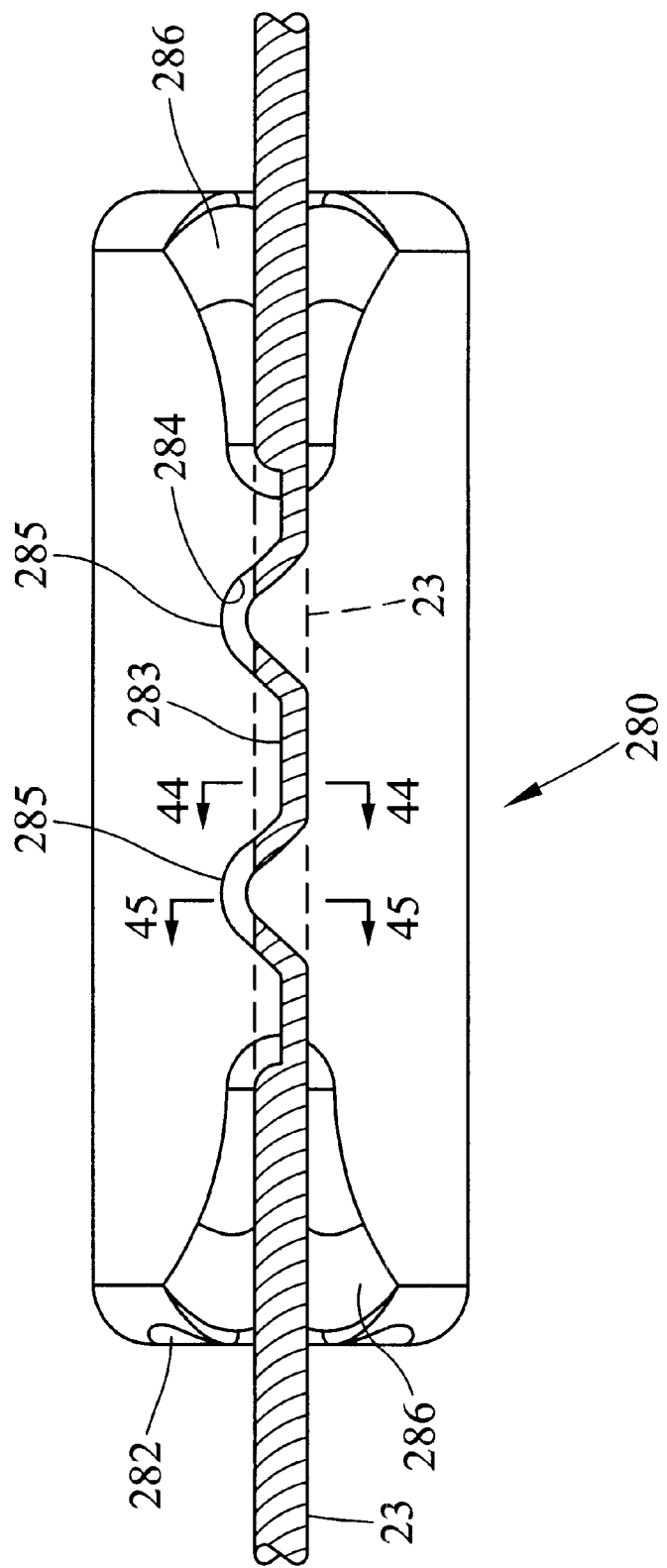
FIG. 43 is a side view of another embodiment a coil support device according to the present invention.
Figure 44:
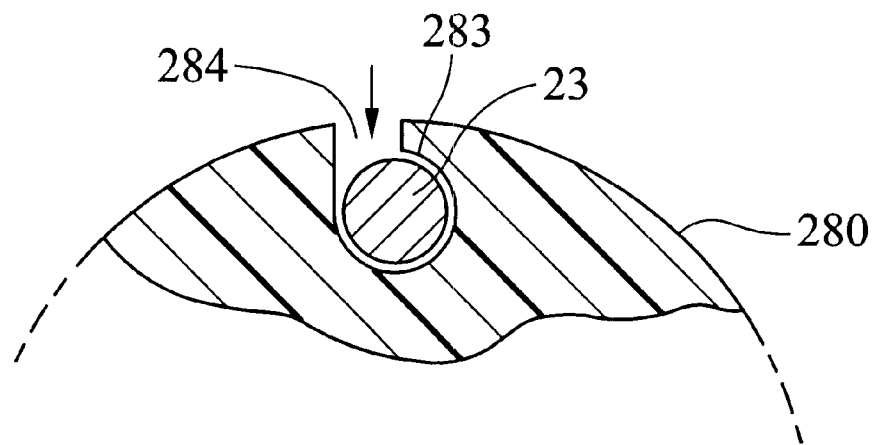
FIGS. 44 and 45 are transverse cross-sectional views taken along lines 44—44 and 45—45, respectively, of FIG. 43.
Figure 45:
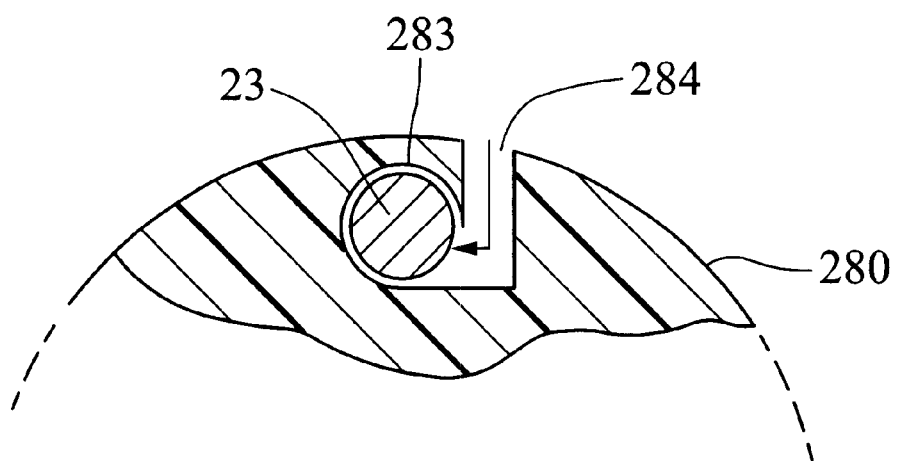

FIGS. 43–45 illustrate another embodiment of a coil support device 280 according to the present invention. FIG. 43 is a side view of the coil support device 280, and FIGS. 44 and 45 are transverse cross-sectional views taken along lines 44—44 and 45—45, respectively, of FIG. 43. In contrast to the previous embodiments in which a stress member 23 is threaded in the axial direction through a hole in the coil support device 270, in this embodiment, each stress member 23 is received in a slot 283 in the outer periphery of the coil support device 280 and into which the stress member 23 can be radially inserted, as shown by the arrows in FIGS. 44 and 45. The width of the radially outer end 284 of the slot 283 (where the slot 283 opens onto the outer periphery of the coil support device 280) is large enough for the stress member 23 to pass through it in the radial direction when the stress member 23 is being inserted into or removed from the slot 283, but it is narrower than the diameter of the stress member 23 so that once the stress member 23 is inserted into the slot 283, the radially outer end 284 of the slot 283 provides some resistance to radial force acting in a direction tending to force the stress member 23 out of the slot 283. The interior of the slot 283 includes a straight, axially extending portion in which the stress member 23 can extend in a straight line through the coil support device 280. However, preferably the radially outer end 284 of the slot 283 does not extend in a straight line over the entire length of the slot 283 but has one or more non-linear regions along its length. In the present embodiment, the radially outer end 284 of the slot 283 includes two curved regions 285 between the lengthwise ends of the slot 283. In order for the stress member 23 to be inserted into or removed from the slot 283, the stress member 23 must be bent around the curved regions 285. The stress member 23 can be easily bent around the curved regions 285 when it is relaxed, but when it is under tension, it cannot easily conform to the shape of the curved regions 285, so the curved regions 285 prevent the stress member 23 from being pulled out of the slot 283 by radial forces. The one or more non-linear regions of the slot 283 need not be curved. For example, they may instead have a rectangular or triangular outline. The slot 283 will generally not provide any substantial resistance to relative axial movement of the stress member 23 and the coil support device 280, so the stress member 23 may be secured to the coil support device 280 in any of the ways described with respect to the previous embodiments, such as by bonding or by an interference fit. For example, the slot 283 may include an enlarged pocket between the curved regions 285, and a retaining member, such as a pin, may be inserted into the portion of the stress member 23 disposed in the pocket to enlarge the outer diameter of the stress member 23 and form an interference fit against the ends of the pocket. Although FIG. 43 shows only one slot 283, a similar slot 283 for receiving another stress member 23 may be formed in the opposite side of the coil support device 280, or a plurality of additional slots may be spaced around the periphery of the coil support device.

As in the embodiment of FIG. 36, the outer periphery of the coil support device 280 may have cutaway portions 286 adjoining its lengthwise ends to permit greater movement of the stress members 23 and reduce stress concentrations.

Like the embodiment of FIG. 36, this embodiment provides the advantage that it can be easily connected to or disconnected from stress members 23, enabling the location of the coil support device 280 to be readily adjusted and allowing components to be salvaged if part of an underwater cable containing them is damaged. Furthermore, since the stress members 23 can be secured to the coil support device 280 from its exterior rather than having to be threaded through lengthwise holes in the coil support device 280, a single coil support device 280 can be replaced or added to an existing underwater cable without it being necessary to disconnect the stress members 23 from other components in the same cable.

Figure 46:
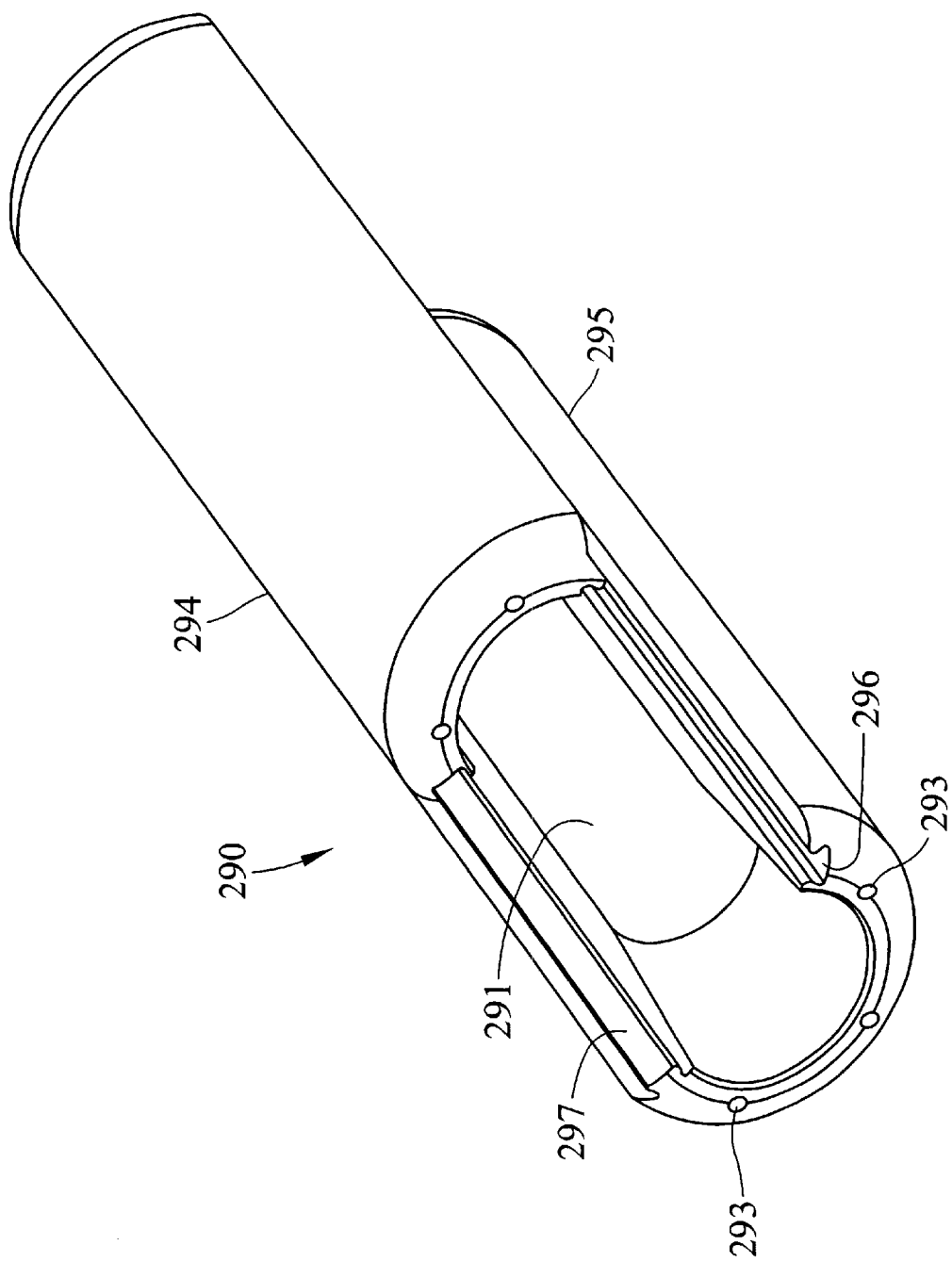
FIG. 46 is an isometric view of another embodiment of a coil support device according to the present invention in a partially assembled state.

FIG. 46 illustrates another embodiment of a coil support device 290 according to the present invention having a plurality of detachable sections 294, 295. The illustrated embodiment is intended for use with an underwater cable employing a single stress member which passes through the central bore 291 of the coil support device 290, but if suitable holes are formed in the coil support device 290, it can also be employed with an underwater cable having a plurality of stress members 23 located outside the central bore 281.

The number of arcuate sections forming the coil support device 290 is not restricted. However, as the number of sections increases, the strength of the coil support device 290 will usually decrease. Therefore, in the present embodiment, the coil support device 290 has only two arcuate sections 294, 295 which combine to form a cylinder. Each section 294, 295 includes one or more elongated pockets 293 similar to those of the embodiment of FIG. 38 for receiving an internal coil 170. The sections 294, 295 may but need not be of equal size. The present embodiment includes five evenly spaced pockets 293 for internal coils, so one section 294 extends around the circumference of the coil support device 290 for a smaller number of degrees than the other section 295 in order for the edge of each section to be approximately the same distance from the nearest pocket 293. However, depending upon the number of pockets 293, the spacing between them, or other considerations, the sections can be sized in many other ways.

The sections 294, 295 can be detachably connected to each other in a variety of manners. In the present embodiment, the sections 294, 295 are connected by two elongated dovetail joints extending in the lengthwise direction of the coil support device 290. Each dovetail joint comprises a mortise 296 formed in one of the sections and a tenon 297 formed on the opposing surface of the other section and shaped to engage with the mortise 296. The sections 294, 295 can slide with respect to each other in the lengthwise direction of the dovetail joints to engage with or disengage from each other. FIG. 46 shows the coil support device 290 in a partially assembled state. To completely assemble the coil support device 290, the two sections 294, 295 are made to slide until their lengthwise end surfaces are flush with each other. If the sections 294, 295 are sufficiently strong, one of the dovetail joints may be omitted so that only one of the circumferential end surfaces of each section is secured to the other section. When the coil support device 290 is used with a single stress member 23, the stress member 23 will typically be connected to the coil support device 290 by being molded in place to the stress member 23. In this case, the molded materials at each end of the coil support device 290 engages with the coil support device 290 to prevent the two sections 294, 295 from moving with respect to each other. However, if the coil support device 290 is used with an underwater cable having stress members 23 located outside the central bore 291 of the coil support device 290, the sections 294, 295 can be prevented from axial movement with respect to each other by a pin or other member inserted through the sections.

In the embodiments of FIGS. 36–46, coils are inserted axially into the pockets of the coil support devices, but the coil support devices may be equipped with other types of pockets, such as those illustrated in FIG. 25 or 28 in which coils are inserted radially into the corresponding pockets.

Although not shown in the drawings, the coil support devices of FIGS. 36–46 may further include various features of the other embodiments of coil support devices, such as an axially extending groove (like grooves 167 in FIG. 21) for providing fluid communication between opposite ends of the coil support device, or a recess (like recess 164 in FIG. 21) for engagement with some portion of an external device.

The various feature of the embodiments of FIGS. 36–46 are not limited to use with a coil support device and can be used with other internal devices disposed inside an underwater cable and connected to a stress member 23 within the cable. For example, an internal device according to the present invention may comprise a spacer which is inserted into an underwater cable at intervals to maintain the tubular shape of the cable as well as to maintain the position of the stress members with respect to the skin of the cable. The overall structure of a spacer can be similar to that of a coil support device, and a coil support device can in fact be used as a spacer, although to simplify its structure, a spacer will typically not be equipped with pockets for housing internal coils.

Figure 47:
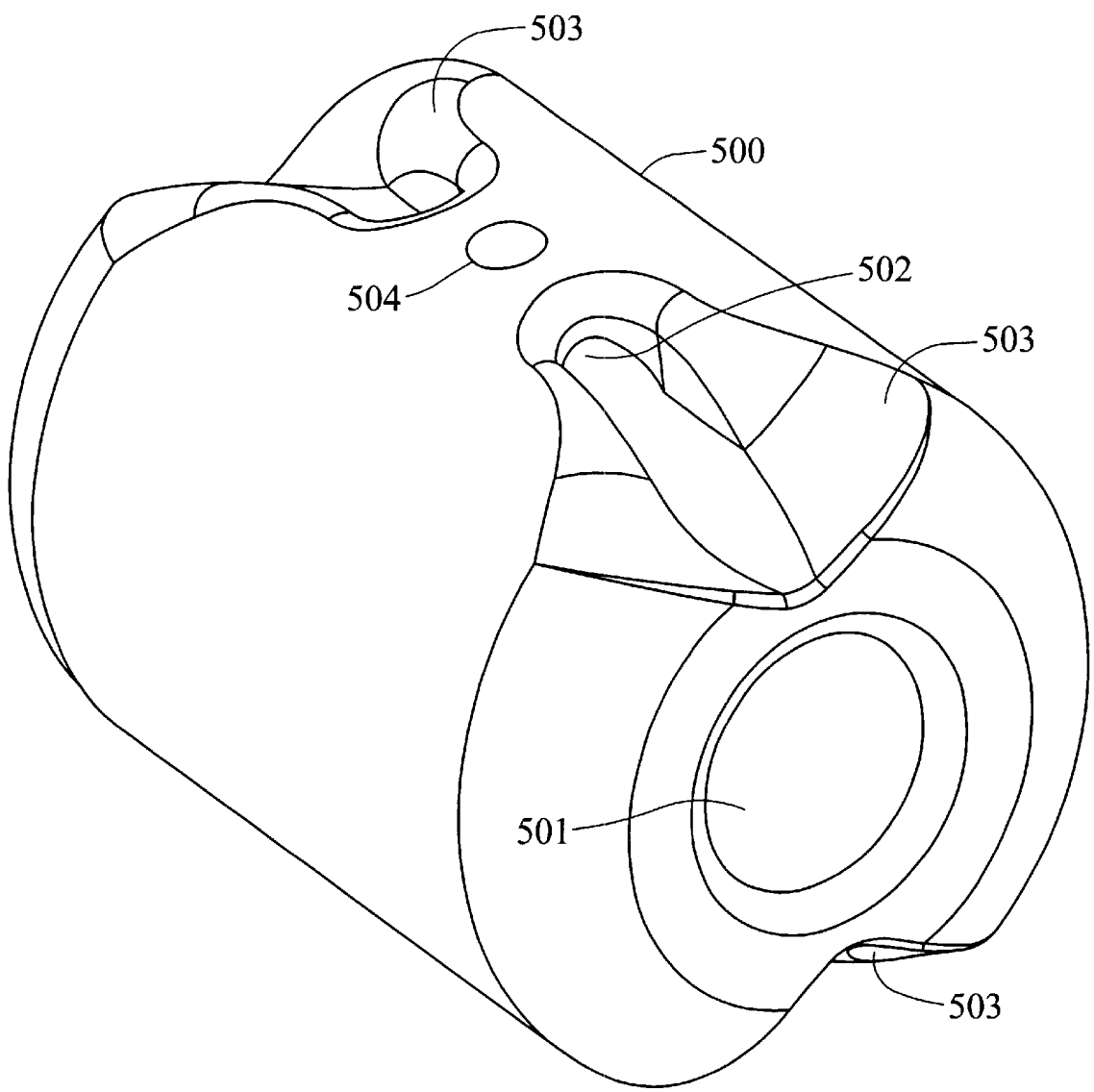
FIG. 47 is an isometric view of an embodiment of a spacer according to the present invention.

FIG. 47 illustrates an embodiment of a spacer 500 according to the present invention. It has a generally cylindrical body with a central bore 501 through which electrical wires can pass. It further includes two axially extending holes 502, each of which can receive a corresponding stress member. A cutaway portion 503 is formed in the outer periphery of the body adjoining the two ends of each hole 502 to permit freedom of movement of the stress members in the same manner as in the previous embodiments.

Stress members 23 can be secured to the spacer 500 in any of the manners described with respect to the previous embodiments. For example, a bonding agent can be inserted into the holes 502 through openings 504 formed between the exterior surface of the spacer 500 and the holes 502, or the stress members can be secured to the spacer 500 by an interference fit, as in the embodiment of FIGS. 36–41, for example. Furthermore, the axial holes 502 may be replaced by slots, as in the embodiments of FIG. 43–45. In addition, instead of the spacer 500 being a one piece member, it can be a multi-section member like the coil support device 290 of FIG. 46.

What is claimed is:

1. An internal device for use in an underwater cable having a stress member, the internal device comprising a body having an outer periphery, the body being mountable inside the cable with the cable surrounding the outer periphery of the body, the body further having a central bore, a passage extending in the lengthwise direction of the body outside the bore for receiving the stress member of the underwater cable, and a cutaway portion formed in the outer periphery of the body at each end of the body adjoining an end of the passage.

2. A device as claimed in claim 1 wherein the passage for the stress member comprises a hole extending in a lengthwise direction of the body.

3. A device as claimed in claim 1 wherein the passage for the stress member comprises a slot formed in the outer periphery of the body and extending in the lengthwise direction of the body.

4. A device as claimed in claim 1 wherein the body includes a pocket for receiving a coil for inductive coupling to a coil disposed outside an underwater cable.

5. An arrangement for use in an underwater cable comprising:
an underwater cable including a stress member extending in a lengthwise direction of the cable; and
an internal device having an outer periphery and a central bore, the internal device being disposed inside the cable with the skin of the cable surrounding the outer periphery of the internal device, and the stress member being disposed radially outward of the central bore and connected to the internal device by an interference fit.

6. An arrangement as claimed in claim 5 wherein the internal device includes a pocket opening onto an outer periphery of the internal device, and an interference fit is formed between the stress member and the pocket.

7. An arrangement as claimed in claim 6 including an object inserted into the stress member to increase a diameter of the stress member within the pocket and produce the interference fit.

8. An arrangement as claimed in claim 7 wherein the stress member is a braided or laid member having a plurality of strands, and the object is disposed between stands of the stress member.

9. An internal device for use in an underwater cable having a stress member, the internal device comprising:
a body having an outer periphery, the body being mountable inside the cable with the cable surrounding the outer periphery of the body; and
a slot formed in the outer periphery of the body for receiving the stress member of the underwater cable, the slot having first and second lengthwise ends and a non-linear region between the ends.

10. An underwater cable arrangement comprising:
an underwater cable including a stress member extending in a lengthwise direction of the cable; and
an internal device having an outer periphery and disposed in the cable with the cable surrounding the outer periphery of the device, the internal device further having a slot formed in the outer periphery and receiving the stress member, the slot having first and second lengthwise ends and a non-linear region between the ends.

11. An underwater cable arrangement as claimed in claim 10 wherein the non-linear region is curved.

12. An underwater cable arrangement as claimed in claim 10 including first and second non-linear regions disposed between the lengthwise ends of the slot.

13. An internal device for use in an underwater cable, the internal device comprising a tubular body including an outer periphery, the body being mountable inside the cable with the cable surrounding the outer periphery of the body, the tubular body further including first and second arcuate sections and a dovetail joint extending in a lengthwise direction of the sections, the sections being detachably connected to each other by the dovetail joint.

14. An internal device as claimed in claim 13 including a pair of dovetail joints extending in the lengthwise direction of the sections and connecting the section to each other.

15. A method of connecting a stress member of an underwater cable to an internal device for use in the cable comprising:

inserting an object into a stress member of the underwater cable to create a region of increased diameter in the stress member;

forming an interference fit between the region of increased diameter of the stress member and the internal device; and disposing the internal device inside the cable with the cable surrounding the outer periphery of the internal device.

16. A method as claimed in claim 15 including inserting the region of increased diameter into a pocket of the internal device.

17. A method as claimed in claim 15 wherein the stress member is a braided or laid member having a plurality of strands, including inserting the object between strands of the stress member to create the region of increased diameter.

* * * * *